United States Patent
Mendolia et al.

(10) Patent No.: US 7,183,922 B2
(45) Date of Patent: Feb. 27, 2007

(54) TRACKING APPARATUS, SYSTEM AND METHOD

(75) Inventors: Greg Mendolia, Hollis, NH (US); John Kvarnstrand, Columbia, MD (US); Bing Foo, Rockville, MD (US); Cornelis du Toit, Ellicott City, MD (US); Nicolaas du Toit, Columbia, MD (US)

(73) Assignee: Paratek Microwave, Inc., Columbia, MD (US)

( * ) Notice: Subject to any disclaimer, the term of this patent is extended or adjusted under 35 U.S.C. 154(b) by 237 days.

(21) Appl. No.: 10/959,562

(22) Filed: Oct. 6, 2004

(65) Prior Publication Data

US 2005/0110674 A1 May 26, 2005

Related U.S. Application Data

(63) Continuation-in-part of application No. 10/858,016, filed on Jun. 1, 2004, which is a continuation-in-part of application No. 10/716,147, filed on May 17, 2004, which is a continuation-in-part of application No. 10/388,788, filed on Mar. 14, 2003.

(60) Provisional application No. 60/365,383, filed on Mar. 18, 2002.

(51) Int. Cl.
*G08B 13/14* (2006.01)
(52) U.S. Cl. .................. 340/572.1; 340/572.7
(58) Field of Classification Search .. 340/572.1–572.9, 340/505, 506, 539.13; 343/911 R, 726, 748, 343/855, 866–872; 700/213–244; 705/22; 235/375–385

See application file for complete search history.

(56) References Cited

U.S. PATENT DOCUMENTS

| | | | |
|---|---|---|---|
| 5,061,941 A | 10/1991 | Lizzi et al. | 343/742 |
| 5,312,790 A | 5/1994 | Sengupta et al. | 501/137 |
| 5,427,988 A | 6/1995 | Sengupta et al. | 501/137 |
| 5,486,491 A | 1/1996 | Sengupta et al. | 501/137 |
| 5,593,495 A | 1/1997 | Masuda et al. | 117/4 |
| 5,635,433 A | 6/1997 | Sengupta | 501/137 |
| 5,635,434 A | 6/1997 | Sengupta | 501/138 |
| 5,640,042 A | 6/1997 | Koscica et al. | 257/595 |
| 5,693,429 A | 12/1997 | Sengupta et al. | 428/699 |
| 5,694,134 A | 12/1997 | Barnes | 343/700 |
| 5,766,697 A | 6/1998 | Sengupta et al. | 427/585 |
| 5,830,591 A | 11/1998 | Sengupta et al. | 428/701 |
| 5,846,893 A | 12/1998 | Sengupta et al. | 501/137 |
| 5,886,867 A | 3/1999 | Chivukula et al. | 361/311 |
| 5,990,766 A | 11/1999 | Zhang et al. | 333/205 |
| 6,074,971 A | 6/2000 | Chiu et al. | 501/139 |
| 6,377,142 B1 | 4/2002 | Chiu et al. | 333/238 |
| 6,377,217 B1 | 4/2002 | Zhu et al. | 343/700 |

(Continued)

*Primary Examiner*—Daniel Wu
*Assistant Examiner*—Jennifer Mehmood
(74) *Attorney, Agent, or Firm*—James S. Finn

(57) ABSTRACT

An apparatus capable of tracking a target, comprising at least one near-field focused antenna comprising an array of elements and a phase shifter to form multiple fixed beams in the near-field, a sensor capable of sensing the location of the target, and a controller capable of accepting position information and capable of activating the proper fixed beam along a course so as to enable the near-field focused beams to track the target. The array of elements may be substantially linear and the sensor may be optical, mechanical, thermal, or sonic position detection subsystems.

21 Claims, 43 Drawing Sheets

U.S. PATENT DOCUMENTS

| | | |
|---|---|---|
| 6,377,440 B1 | 4/2002 | Zhu et al. .................... 361/311 |
| 6,404,614 B1 | 6/2002 | Zhu et al. .................... 361/277 |
| 6,492,883 B2 | 12/2002 | Liang et al. ................. 333/132 |
| 6,514,895 B1 | 2/2003 | Chiu et al. ................... 501/137 |
| 6,525,630 B1 | 2/2003 | Zhu et al. .................... 333/205 |
| 6,531,936 B1 | 3/2003 | Chiu et al. ................... 333/164 |
| 6,535,076 B2 | 3/2003 | Partridge et al. .......... 333/17.1 |
| 6,538,603 B1 | 3/2003 | Chen et al. .................. 342/372 |
| 6,556,102 B1 | 4/2003 | Sengupta et al. ............ 333/161 |
| 6,590,468 B2 | 7/2003 | du Toit et al. ............. 333/17.3 |
| 6,597,265 B2 | 7/2003 | Liang et al. ................. 333/204 |
| 6,677,852 B1 * | 1/2004 | Landt ......................... 340/10.1 |
| 6,750,771 B1 * | 6/2004 | Brand ...................... 340/572.7 |
| 6,765,484 B2 * | 7/2004 | Eagleson et al. ............ 340/505 |
| 2002/0070900 A1 * | 6/2002 | Phelan ................ 343/700 MS |
| 2002/0175805 A9 * | 11/2002 | Armstrong et al. ...... 340/10.31 |

\* cited by examiner

ID TAG READER UTILIZING A SCANNING ANTENNA SYSTEM AND METHOD", by Mendolia et al., filed Jun. 1, 2004 which was a continuation in part of patent application Ser. No. 10/716,147, entitled, "RF ID TAG READER UTLIZING A SCANNING ANTENNA SYSTEM AND METHOD" "filed May 17, 2004, by Jaynesh Patel et al, which was a continuation in part of patent application Ser. No. 10/388,788, entitled, "WIRELESS LOCAL AREA NETWORK AND ANTENNA USED THEREIN" "filed Mar. 14, 2003, by Hersey et al., which claimed the benefit of priority under 35 U.S.C Section 119 from U.S. Provisional Application Ser. No. 60/365,383, filed Mar. 18, 2002.

BACKGROUND OF THE INVENTION

1. Field of the Invention

This invention relates generally to position determination and tracking systems. More specifically, this invention relates to radio frequency identification (RFID) tag systems, methods and readers. Still more specifically, the present invention relates to RFID tags and tag readers that may utilize a scanning antenna or an electronically steerable passive array antenna and environmental enhancements for significant system improvements.

2. Background Art

Many product-related and service-related industries entail the use and/or sale of large numbers of useful items. In such industries, it may be advantageous to have the ability to monitor the items that are located within a particular range. For example, within a particular store, it may be desirable to determine the presence and position of inventory items located on the shelf, and that are otherwise located in the store.

A device known as an RFID "tag" may be affixed to each item that is to be monitored. The presence of a tag, and therefore the presence of the item to which the tag is affixed, may be checked and monitored by devices known as "readers." A reader may monitor the existence and location of the items having tags affixed thereto through one or more wired or wireless interrogations. Typically, each tag has a unique identification number that the reader uses to identify the particular tag and item.

Currently, available tags and readers have many disadvantages. For instance, currently available tags are relatively expensive compared to many grocery store items. Because large numbers of items may need to be monitored, many tags may be required to track the items. Hence, the cost of each individual tag needs to be minimized. Furthermore, currently available tags consume large amounts of power. These inefficient power schemes also lead to reduced ranges over which readers may communicate with tags in a wireless fashion. Conventional passive RFID tags work by backscattering the incident RF energy with modulation to encode information stored in the tag's memory. Although passive tags are currently used at lower frequencies such as 1.25 MHz and 13 MHz, the inventions described in this application are most relevant to higher frequency tags operating at 433 MHz, 860–950 MHz, or even 2.4 GHz. The reason is simply that directed beams require a large radiating aperture size, typically a minimum of 5 to 10 free-space wavelengths long. One wavelength at 13 MHz is about 75 feet long! However, at 900 MHz, a free-space wavelength is only 13 inches in length, and a practical 900 MHz near field array can occupy a length of less than 8 feet.

As the antennas used with RFID tags readers are typically fixed beam and manually directed, positioning information can be obtained if the tag's position is known, stored in memory, and then relayed to the reader. However, if the tags are moved or are moving or do not possess their position information, their angular position cannot be determined. Thus, there is a need in the art for an RF ID tag system and method that can determine the angular position of the tag relative to the reader.

Conventional UHF frequency (433 MHz and 915 MHz) RFID tags are forward link limited. This means that the forward RF link, from transmit antenna to RFID chip, is the weak link. The receive link, from RFID chip back to the receive antenna, usually has enough margin to work well if the forward link is adequate. So the challenge is to illuminate the RFID tag with adequate power such that its internal charge pump can achieve a given minimum voltage to turn on the tag and begin the handshaking process with the reader. The power supply voltage stored by the tag is the product of incident power level and the dwell time, or time that such incident RF power is available. Hence the longer a tag is illuminated by a reader antenna, the greater is the probability of successfully reading that tag. Consequently, one of many important characteristics of a tracking RFID antenna system is to increase the dwell time that a tag is illuminated by having the reader's transmit beam follow the target tag through its field of view.

Also, when water or other types of liquids are present in the RF environment, the process of reading tags becomes even more exacerbated. High dielectric liquids such as pure water will detune tags that lie in close proximity so that the tag resonates at a lower frequency. Unless the tag is compensated by design, it will become much less efficient when detuned. Also, tagged consumer products that have a high DC conductivity ue to the presence of salts, such as ketchup, soap, or shampoo, will absorb a significant portion of the incident RF power and simply generate heat. In fact, due to the inefficiencies mentioned above, the electromagnetic energy radiated from conventional antennas may not reach the tag's RFID chip with sufficient level, and therefore the tag will not be read.

Thus, among other things, what is needed is a system, method or apparatus capable of increasing the probability of reading RFID tags when such tags are located in hostile environments such as inside cases and inside pallet stacks of RF attenuating consumer product goods.

SUMMARY OF THE INVENTION

An embodiment of the present invention provides an apparatus capable of tracking a target, comprising at least one near-field focused antenna comprising an array of elements and a phase shifter to form multiple fixed beams in the near-field, a sensor capable of sensing the location of the target, and a controller capable of accepting position information and capable of activating the proper fixed beam along a course so as to enable the near-field focused beams to track the target. The array of elements may be substantially linear and the sensor may be optical, mechanical, or sonic position detection subsystems. In an embodiment of the present invention the target may be at least one RFID tag and the phase shifter may include a voltage tunable dielectric, a switched delay line, or other conventional means of achieving a phase shift. The controller may control a plurality of switches which activate at least one beam forming network. Further, the tracking may occur along a predetermined course, and the predetermined course may be along a conveyor line or passing through a doorway such as a shipping dock door.

Another embodiment of the present invention provides an apparatus capable of tracking a target, comprising an array of elements, a phase shifter capable of forming a continuously scanned beam in the near-field, a sensor capable of sensing the location of the target, and a controller capable of accepting position information and activating the proper fixed beam so as to enable near-field focused beams to track the target.

Further, an embodiment of the present invention provides a system capable of tracking a target comprising at least one near-field focused antenna comprising a set of transmit arrays, wherein each array may include a set of elements arranged substantially in an arc, wherein the arc may lie in a plane substantially normal to the direction of motion of the target, a beamformer for each transmit array capable of forming at least one fixed beam in its near-field, a sensor capable of determining the location of the target, and a controller capable of accepting position information and capable of activating the proper fixed beam so as to enable the near-field focused beams to track the target.

An embodiment of the present invention also provides a method of tracking a target, comprising, forming multiple fixed beams in the near-field with at least one near-field focused antenna comprising an array of elements and a beamformer network, sensing the location of the target with a sensor, and accepting position information by a controller capable of activating the proper fixed beam along a course so as to enable the near-field focused beams to track the target. The present method may further comprise placing the array of elements in a substantially linear manner and selecting the sensor from the following group: optical, mechanical, sonic, thermal or other position detection subsystems.

The present method provides that the target may be at least one RFID tag and the beamformer network may include a voltage tunable dielectric. Further the present method may provide controlling by the controller a plurality of switches which activate at least one beam forming network.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DESCRIPTION OF THE PREFERRED EMBODIMENT

The present invention serves as an internal or external antenna for a RF ID TAG reader application as well as a position determination and tracking system and method. The antenna interfaces with an RFID reader that can be used in a RF ID tag system for significant performance advantages. The antennas described herein can operate in any one, all or part of the following frequencies: the 2.4 GHz GHz Industrial, Scientific and Medical (ISM) band; the 5.1 to 5.8 GHz band; the 860–960 MHz band; or the 433 MHz band; although it is understood that they can operate in other bands as well. A software driver functions to control the antenna azimuth scan angle to maximize the received wireless signal from a tag associated with a reader. In a first embodiment, the key performance requirement to steer a beam with 6 dBi of gain throughout a 360° azimuth, or any segmentation of 360 degrees, scan is enabled Existing RF ID TAG READERS currently use fixed antennas. For lower frequency systems up to 13 MHz, omni-directional antennas are used, which are typically integrated into the RF ID TAG READER card or exist as an integral monopole antenna. External medium gain antennas exist for UHF and higher frequency systems; however, these have a fixed beam that the user must manipulate by hand. The present invention requires no user intervention and ensures the interrogating beam follows the target.

The basic components of the present invention include a RF ID tag and an RF ID reader, with the scanning antenna of the present invention associated with the reader and functioning in several different embodiments as described below.

Figure 1A:
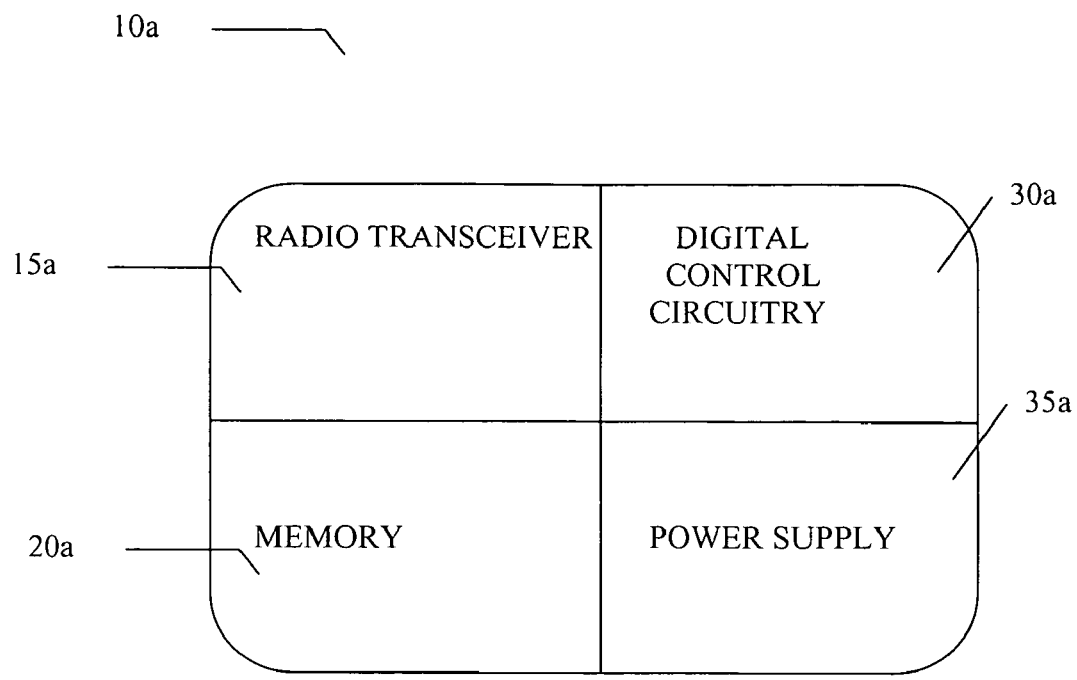
FIG. 1a is a block diagram of the basic sections of an RF ID tag.
Figure 1B:
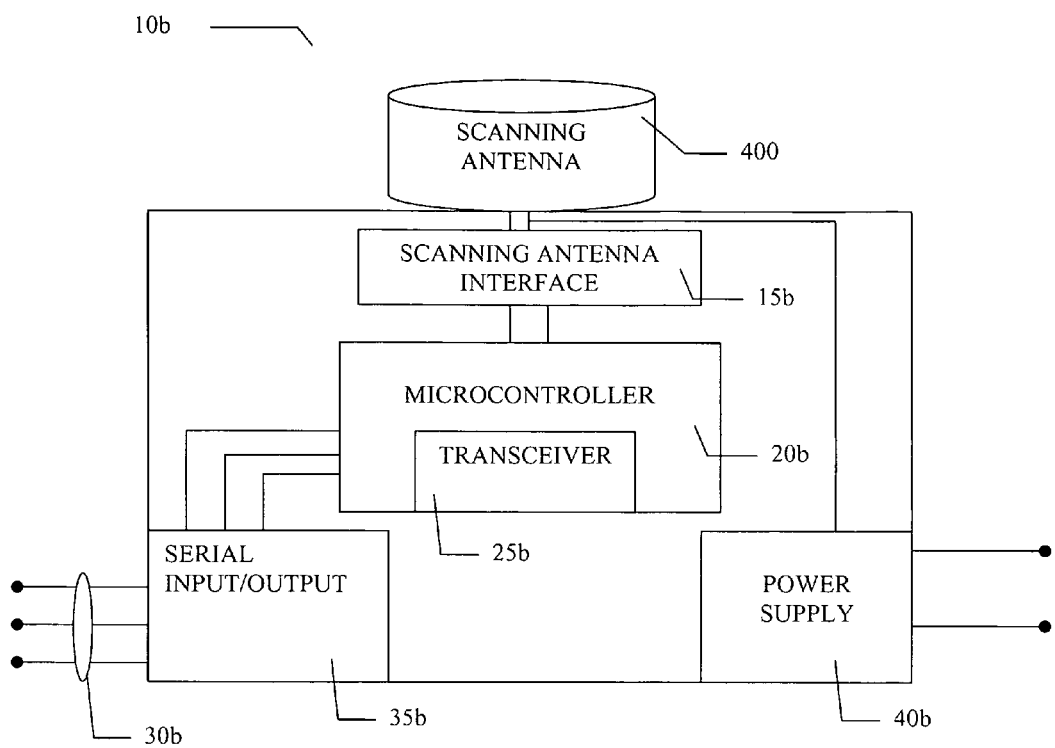
FIG. 1b is a block diagram of the basic sections of an RF ID tag reader.

Referring now the figures, FIG. 1a shows a block diagram of a typical RF ID tag or transponder circuit. Such RF ID tag systems are commercially available from Disys Inc. in Toronto, Canada as their 90 Series RF ID tags and from Hughes ID Corporation in Mission Viejo, Calif. Dysis publishes a "90 Series RF/ID System Applications Manual for CRM-90 Readers and 90 Series Tags, the details of which are hereby incorporated by reference. RF ID tag reader/writer circuits suitable for use as interface with the scanning antenna are also commercially available from these two sources. RF ID tags are also currently commercially available from Atmel Corporation of Colorado Springs, Colo. and Eurosil, a Division of Daimler Benz located in Munich. Reader/writer systems are also available from Indala, a division of Motorola located in San Jose, and as two integrated circuit sets (one transceiver and one digital section) are commercially available from another division of Daimler Benz called AEG Telefunken. The details of these commercially available RF ID tags and RF ID tag readers are hereby incorporated by reference. A block diagram of a typical circuit that may be used for the RF ID tag reader 10b is shown in FIG. 1b.

An RF ID tag, 10a shown in FIG. 1a, is a small circuit which includes a radio transceiver 15a which is powered by power derived from rectification of incoming RF signals, the process of deriving suitable power from the incoming RF being performed by power supply section 35a. The RF ID tag also has on-board nonvolatile memory 20a for storing data such as an identifier code which identifies the type of person, object of things that the tag is attached to and a serial number identifying the particular tag. The memory is non-volatile and may be both written and read by RF communication to the chip in the preferred embodiment, but in alternative embodiments, the memory may be fixed and unalterable such as ROM or even hardwired connections. Typically, the nonvolatile memory is of the ROM, EEPROM or anti-fuse variety. Several U.S. patents naming inventor Bruce Rosener and assigned to Unisys Corporation and Instant Circuit exist describing the structure of nonvolatile antifuze memory in an RF ID tag with no independent power source. These patents are: U.S. Pat. Nos. 4,442,507; 5,296,722; 5,407,851; 4,796,074; and 5,095,362. Further, recent advancements in RF Tag technology are described in U.S. Pat. No. 5,550,547 entitled, "Multiple item radio frequency tag identification protocol"; U.S. Pat. No. 5,995,006 entitled, "Radio Frequency Tag"; and U.S. Pat. No. 5,883,575 entitled, "RF-tags utilizing thin film bulk wave acoustic resonators". The details of these patents are hereby incorporated by reference and it is understood that future advancements in RF ID tag technology can be utilized in the novel scanning antenna feature in the reader of the present invention.

The RF ID tag also includes digital control circuitry 30a which controls switching of the antenna connection, whether the tag is sending or receiving, and reading and writing the memory section. Typical instruction sets for the more sophisticated RF ID tags currently available include commands to Read Word n, Write Word n, Read Delayed and Turn Off such that the RF ID tag does not respond to interrogations.

The function of the RF ID tag is to receive an excitation signal from the reader, modify it in some way which is indicative of data identifying the particular tag that did the modification, thereby identifying the particular item to which the tag is attached, and then transmitting back to the reader. In the absence of stimulus from the reader, the tag is dormant and will not transmit data of its own volition.

Typically, the low frequency RF ID tags are very small and are affixed to a substrate upon which a coiled conductive trace serving as an antenna is formed by integrated circuit or printed circuit technology. The digital control circuitry also keeps the tag "locked" so that it cannot alter data in the memory or read and transmit data from the memory until the digital circuitry detects reception of the unlock sequence. The RF ID reader/writer unit knows the unlock sequence for the RF ID tags to be unlocked for interrogation or writing data thereto, and transmits that sequence plus interrogation or other commands to the RF ID tags.

FIG. 1b illustrates a first embodiment of the reader as used in the present invention. However, it is understood that the novel scanning antenna can be used with any reader that can benefit from the use of a scanning antenna as described below. FIG. 1b depicts a block diagram of a typical RF ID tag reader 10b from the class of devices that can be used as the RF ID tag reader 10b of the present invention (hereafter referred to as the reader). The reader 10b has a range of from a few millimeters to several meters and more depending upon size of the RF ID tag (hereafter may also be referred to as a transponder), the directionality of the beam of the scanning antenna, the operating frequency, and whether the transponder is a passive or active type. The reader 10b can contain a microcontroller 20b for controlling reader functionality and programming and is connected to a scanning antenna 400 via interface 15b. A transceiver 25b can be associated with said microcontroller for generation and reception of RF signals to be passed to scanning antenna 400 via interface 15b.

Power is provided by power supply 40b and a serial input/out 35b is provided to provide information to microcontroller 20b via serial communications link 30b. This enables external programming and functionality control of microcontroller 20b.

Transponders of a passive variety are those discussed above which generate power to operate the circuits therein from an excitation signal transmitted from the reader. There is another class of transponder however of an active class which some form of energy source independent of the reader such as a small primary cell such as a lithium battery.

Figure 1C:
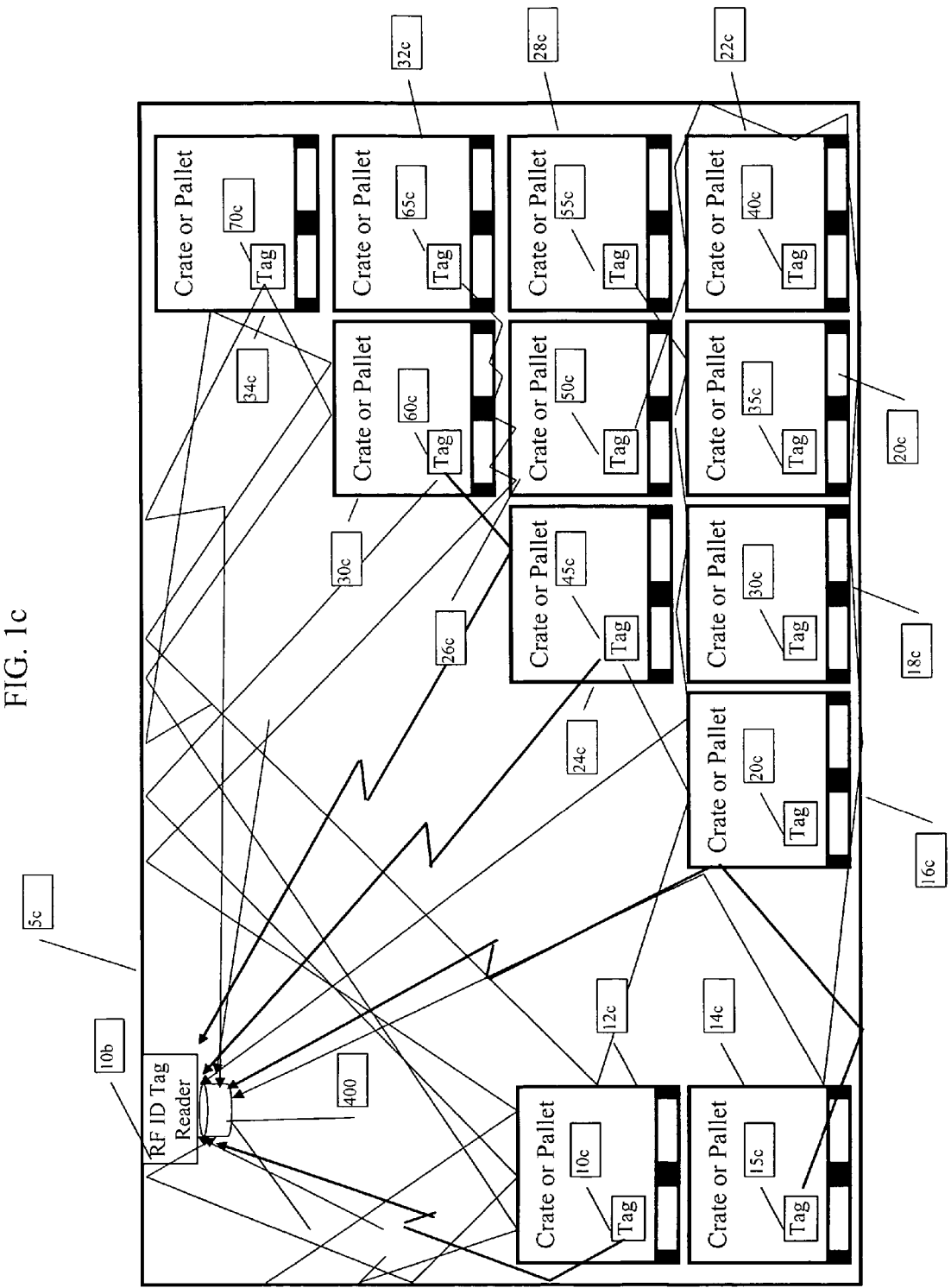
FIG. 1c is a depiction of the method of tracking an object, further depicting the directionality capability and the scanning capability of the scanning antenna of the present invention as well a multipath environment which is improved by the directional ability of the present invention.

FIG. 1c is a depiction of the method of tracking an object and further depicting the directionality capability and the scanning capability of the scanning antenna 400 of the present invention; as well a multipath environment which is improved by the directional ability of the present invention. A warehouse 5c is represented in FIG. 1c with an RF ID tag system implemented therein. Crates 12c, 14c, 16c, 18c, 20c, 22c, 24c, 26c, 28c, 30c, 32c and 34c are shown as typical crates might be stored in a typical warehouse 5c. In a typical metal warehouse, a great amount of multipath is created while communicating with the tags associated with a large plurality of items to be tracked. In this case, tags 10c, 15c, 20c, 30c, 35c, 40c, 45c, 50c, 55c, 60c, 65c and 70c are associated with crates 12c, 14c, 16c, 18c, 20c, 22c, 24c, 26c, 28c, 30c, 32c and 34c respectively. Because scanning antenna 400 is associated with reader 10b, the reader can scan narrow beam widths for tag transmissions and can transmit to the tags in narrow beam widths. This greatly diminishes the effects of multipath, improves range, decreases power requirements, improves data rate and overall provides for a much improved RF ID tag tracking system. The method used in this embodiment includes the steps of associating an RF ID tag with said object, person or thing (a crate in the embodiment of FIG. 1c); providing an RF ID tag reader 10b with a scanning antenna 400 for transmitting information to, and receiving information from, said RF ID tag(s) 10c, 15c, 20c, 30c, 35c, 40c, 45c, 50c, 55c, 60c, 65c and 70c, said RF ID tag containing information about crates 12c, 14c, 16c, 18c, 20c, 22c, 24c, 26c, 28c, 30c, 32c and 34c; wherein said scanning antenna comprises at least one RF module (which can be multi-layered), said at least one RF module further comprising at least one RF connection for receipt of at least one RF signal and at least one tunable or switchable device; an RF motherboard for acceptance of RF signals and distribution of the transmit energy to said RF module at the appropriate phases to generate a beam in the commanded direction and width; and a controller for determining the correct voltage signal to send to said at least one multi-layered RF module. Further, and as described in more detail below, the aforementioned RF ID tag system can be implemented wherein said antenna is an array antenna, and wherein said array antenna comprises a radiating antenna element; at least one parasitic antenna element; at least one voltage-tunable capacitor connected to said at least one parasitic antenna element; and a controller for applying a voltage to each voltage-tunable capacitor to change the capacitance of each voltage-tunable capacitor and thus control the directions of maximum radiation beams and minimum radiation beams of a radio signal emitted from said radiating antenna element and said at least one parasitic antenna element.

Figure 1D:
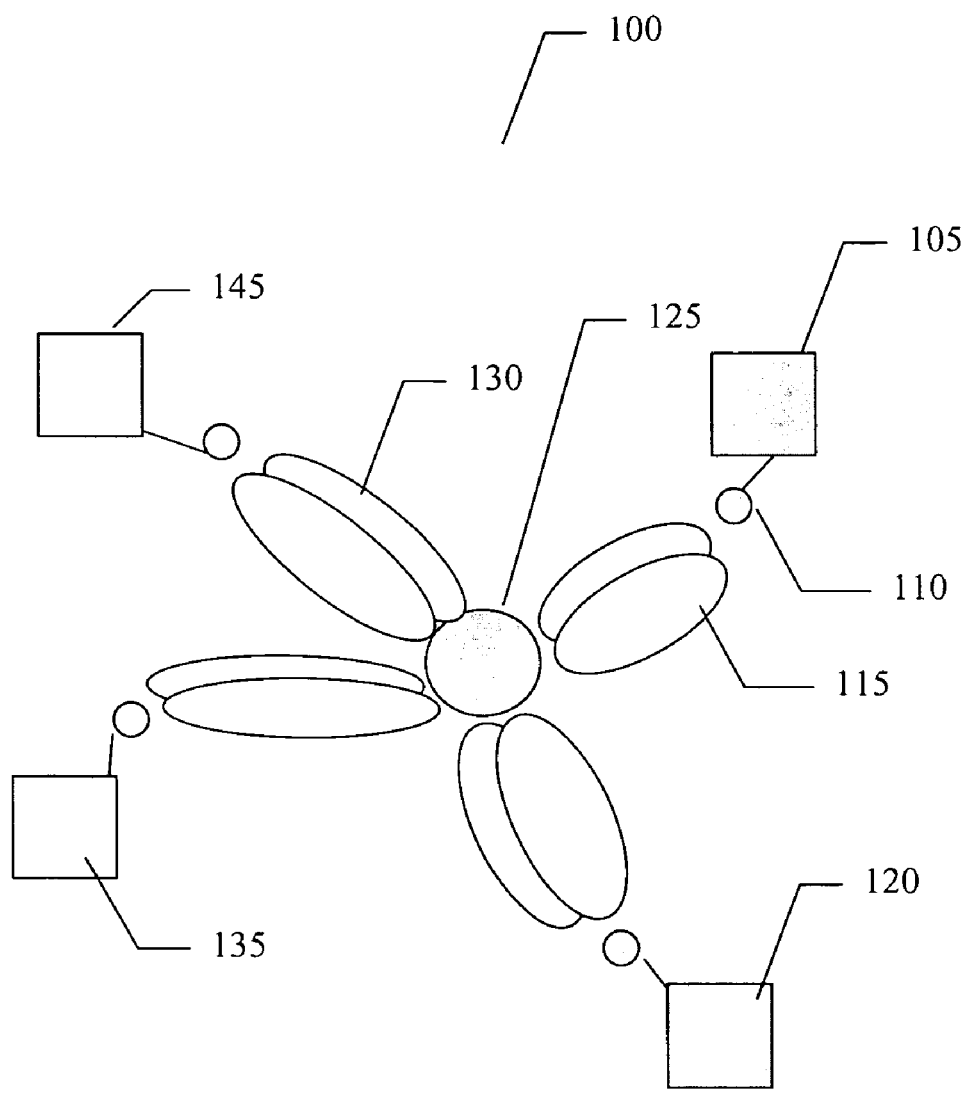
FIG. 1d is an illustration of an example RF ID tag environment with a single carrier version of the present invention.

The present invention can be implemented in several networking embodiments which benefit from the scanning antenna 400 incorporated herein. FIG. 1d depicts a single carrier version wherein network 100 has reader 125 and tags 105, 120, 135 and 145; such as a tag associated with anything for which tracking information is desired. In FIG. 1d this is depicted as 110 and is understood that it can be anything from pallets in a warehouse to people in an amusement park. In this single carrier solution, multiple channels are possible using the tunable technology of the present invention. In this example, the multiple channels 115 and 130 allow for communication with many tags and, if desired communication at high data rates with the tags of at least 11 Mbps bandwidth using only 22 MHz of spectrum and in a narrow transmission beam for greater range or data throughput and less multipath interference.

Figure 2:
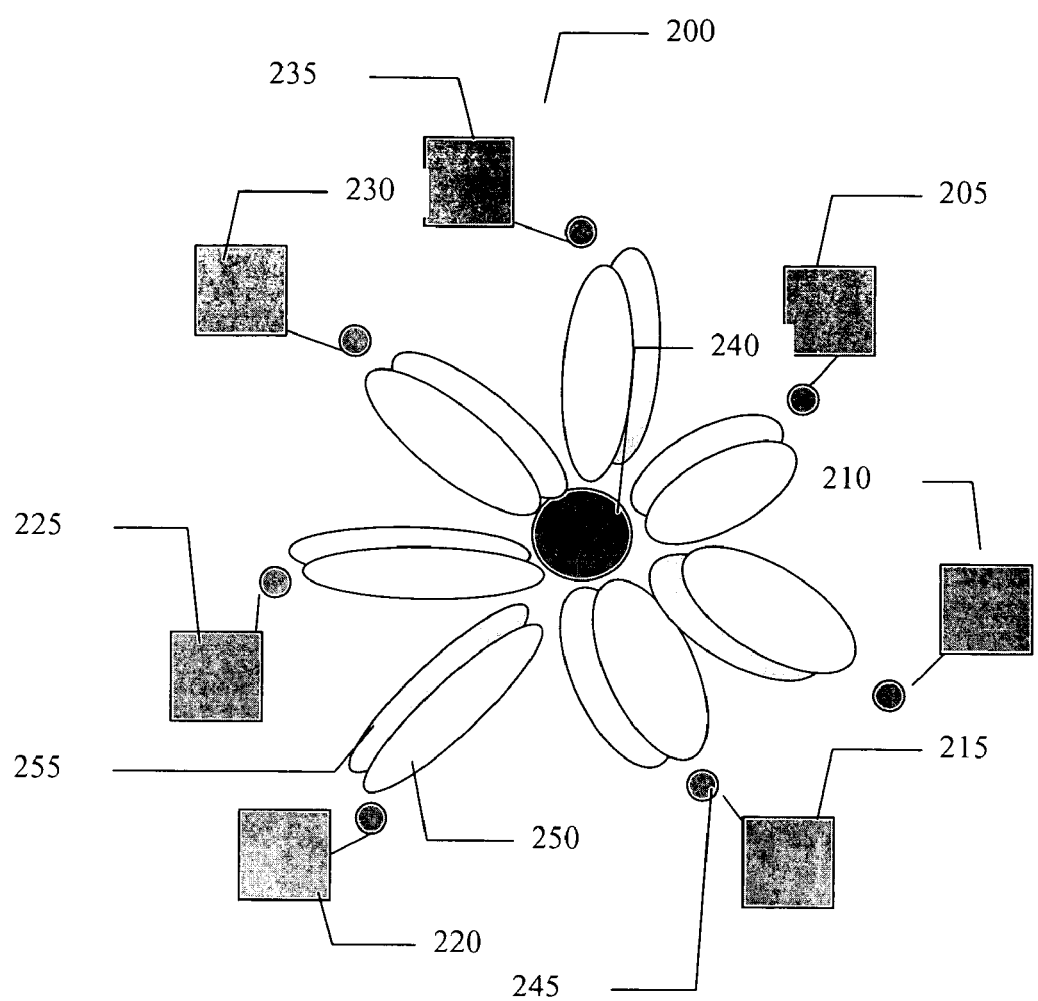
FIG. 2 is an illustration of an example RF ID tag environment with the multi-beam embodiment of the present invention.

FIG. 2 depicts the multi-beam embodiment wherein RF ID tag system 200 has RF ID tag reader 240 and tags 205–235 which can be associated with items to be tracked 245. In this multi-carrier solution multiple beams 250 and 255 are used with one beam for each channel. In this embodiment, at least 22 Mbps is achieved with 44 MHz of spectrum, which enables tracking and position determination of many tags.

Figure 3:
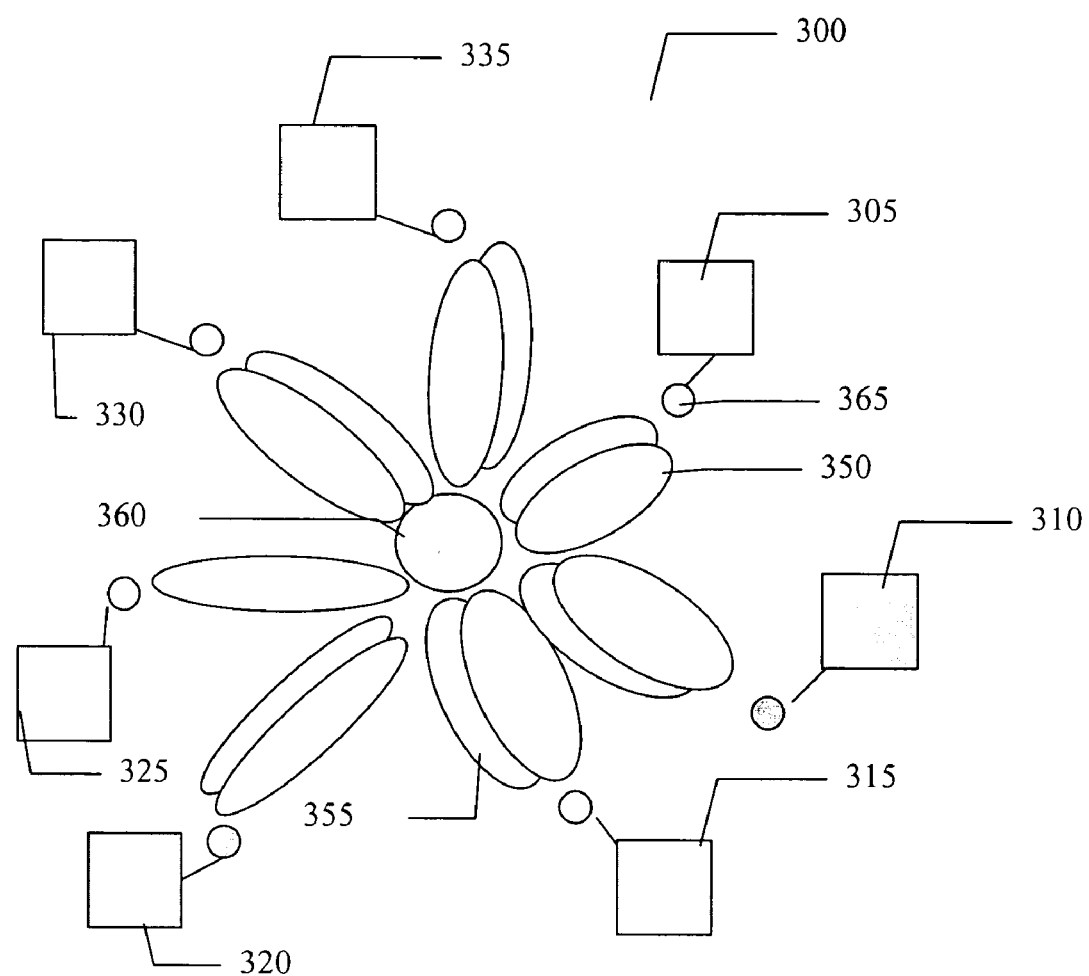
FIG. 3 is an illustration of an example RF ID environment with the multiple beams, frequency reuse embodiment of the present invention.

FIG. 3 depicts the multiple beams, frequency reuse embodiment of the present invention. Herein RF ID tag system 300 has RF ID tag reader 360 and tags 305–335 for tracking and position determination. In this multiple-beam, frequency reuse embodiment individual channels 350 and 355 for all beams are used. An item to be tracked associated with tag 305 is illustrated at 365. It is understood that all tags will have a reception antenna and in this embodiment at least 22 Mbps using 22 Mhz is achieved and a large number of tags can be tracked and positioned determined. Tags are well known in this art and it is understood that many different type of tags can be used with the present invention including the tag described above in FIG. 1a.

As will be shown in the figures to follow, the scanning antenna used with the reader 10b of the preferred embodiment of the present invention may contain the following subassemblies in antenna 400, with exploded view shown as 500: RF Modules 515, RF Motherboard 545, controller connector 915 (with connector screws 910 and 920), base 410, radome 405, external RF cables [MMCX to transceiver card] (not shown), external control cables (not shown), external power supply connector 905 and a software driver. The external RF and control cables connect the antenna 400 to the RF ID tag reader 10b via interface 15b.

The power supply cable connects between an AC outlet and the antenna 400; although, it is understood that any power supply can be utilized in the present invention. Further, power can be supplied by reader 10b, through interface 15b and by power supply 40b. Mating MMCX jacks (or any similar RF connectors now known or later developed) 415 and 420, DB-25 female, and DC power jack connectors 905 are located on the side of the base 410 and can facilitate connection with interface 15b. The DC power jack 905 and DB-25 connector 915 are right angle connectors integral to the controller Printed Circuit Board (PCB), with the mating portions 415, 420 exposed through the base 410, again to facilitate interconnection with interface 15b. Once inside the housing, the RF signals are transferred to the RF motherboard 545 via flexible coaxial cables (not shown) to a surface mount interface 535.

The controller determines the correct voltage signals to send to the motherboard 545, as requested by the received software command and the current internal temperature sensed at the phase shift modules. These voltages are sent across a ribbon cable (not shown) to the switches and phase shifters located on the motherboard 545. The controller also provides feedback to the reader circuitry via interface 15b so that the software can determine if the antenna is present or not. The controller mounts rigidly to the inside bottom of the base 410 with its main connector 915 exposed.

The motherboard distributes the RF signals to the nine RF modules 515 via RF connectors 510 and 520. The dual RF input allows for either single or dual polarization which can be either linear or circular. Simply horizontal or vertical polarization is also enabled. The signal from the main connectors 595 and 535 are divided three ways, each to a phase shifter and then an SP3T switch. The outputs of the switch terminate in nine places, one for each RF module. This permits any of three consecutive RF modules 515 to be active and properly phased at any time. The motherboard (not shown) mounts rigidly to the top side of the base 410, which is stiffened to ensure that the phase shift and power divider modules will not shatter under expected environmental conditions. Cutouts 575 exist in the top of the base for connector pins and cable access features.

The RF modules consist of a multilayer antenna for broad bandwidth. They are connected to the motherboard via a flex microstrip circuit. The modules are mounted perpendicular to the motherboard, and are secured to the base via vertical triangular posts 525.

The radome 405 fits over the product and is fused to the base 410, both at the bottom of the radome 405 and top of the base 410 intersection, and at the base posts to the inside top of the radome 405.

SUBASSEMBLY DESCRIPTIONS

RF Modules 515

Figure 8:
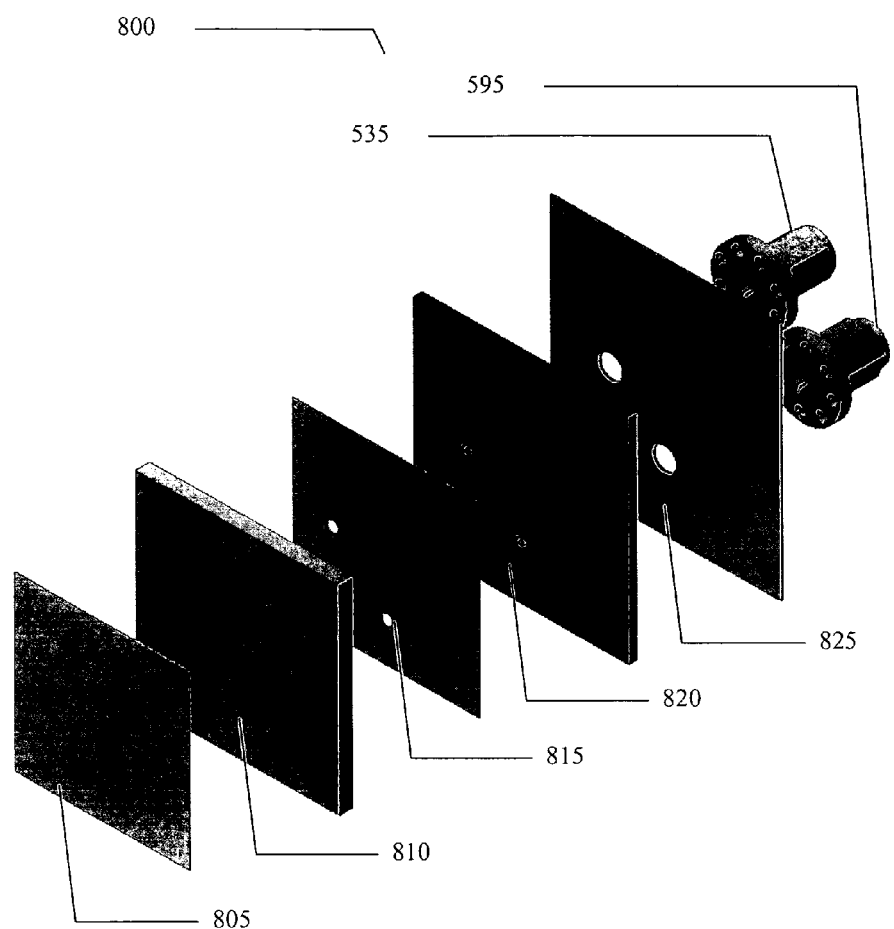
FIG. 8 is a more detailed exploded view of the RF Module construction of the RF ID tag reader antenna of the present invention.

In the preferred embodiment of the present invention, nine RF modules 515 are required for the assembly of each antenna. As shown in FIG. 8, 800, each module is a multilayer bonded structure consisting of alternating metal 805, 815, 825 and dielectric 810, 820 layers. Although, nine RF modules 515 are depicted in this preferred embodiment, it is understood that one skilled in the art can vary the number of RF modules according to performance parameters and design choice—such as the number of tags to be tracked and the distance anticipated from the reader to the tags.

The outer layer 825 of the subassembly 515 can be a stamped brass element about 1.4"±0.002" square. This brass element is bonded to a block of dielectric 1.5"±0.01" square 820. A target material can be polystyrene if cost is a consideration, where the requirements are a dielectric constant between 2.6 and 3.0. Once established in the design, the dielectric constant should be maintained at frequency within 2%. The loss tangent of this dielectric should not exceed 0.002 at 2.5 GHz. The above assembly is bonded to an inner metal layer of stamped copper element 815 plated with immersion nickel-gold and is about 1.4"±0.002" square. The above assembly is then bonded to another block of identical dielectric 1.7"×1.8"±0.01" square 805. This subassembly is completed with a bonded flex circuit described below in the interconnection section.

RF Motherboard 545

The RF motherboard 545 consists of a 9-sided shaped microwave 4-layer PCB. Although it is understood that the shape of the motherboard and the number of sides can be modified to alternate shapes and sides without falling outside the scope of the present invention. In the present invention, the inscribed circular dimension is 4.800±0.005". Rogers RO4003 material with ½ ounce copper plating is used for each of the three 0.020" dielectric layers. This stack up permits a microstrip top layer and an internal stripline layer. All copper traces can be protected with immersion nickel-gold plating. Alternate substrate materials can be considered for cost reduction, but should have a dielectric constant between 2.2 and 3.5, and a loss tangent not exceeding 0.003 at 2.5 GHz.

The motherboard functions to accept two signals from the MMCX connectors 415, 420 (although MMCX connectors are used, it is understood than any similar RF connectors now known or later developed can also be used) from individual coaxial cables and properly distribute the transmit energy to the appropriate elements at the appropriate phases to generate a beam in the commanded direction. The coaxial cables have a snap-on surface mount connection to the motherboard. Each of these cables feed a 3-way power divider module, described below. The output of each power divider connects to a 90°-phase shifter module, also described below. The output of each phase shifter feeds a SP3T switch. In the preferred embodiment, a Hittite HMC241QS16 SP4T MMIC switch was selected, although a multitude of other switches can be utilized. Three of the switched outputs connect go to the module connection landings, in alternating threes; that is, switch #1 connects to modules 1, 4, and 7, etc. It is the alternating nature that requires the motherboard to be multilayer, to permit cross-over connections in the stripline layer. Thus, one skilled in the art can utilize design choice regarding the number of layers and switch to module connections. At the output of each switched line is a 10 V DC blocking capacitor; and, at each end of the phase shifter is a 100 V DC blocking capacitor. These fixed capacitors should have a minimum Q of 200 at frequency, and are nominally 100 pF.

Three-Way Divider

The three-way divider can be a 1"×1"×0.020" 96% Alumina SMD part. Copper traces are on the top side and a mostly solid copper ground plane is on the bottom side, except for a few relief features at the port interfaces. All copper is protected with immersion nickel-gold plating. There are no internal vias on this preferred embodiment of the present invention. Provisions can be made to enable the SMD nature of this inherently microstrip four-port device.

90° Phase Shifter

The 90° phase shifter is a 1"×1"×0.020" 96% Alumina SMD part. Copper traces are on the top side and a mostly solid copper ground plane is on the bottom side, except for a few relief features at the port interfaces. All copper is protected with immersion nickel-gold plating. There are two internal vias to ground on the device. Two thin film SMD Parascan varactors are SMT mounted to the top side of this device. Some provisions can be made to enable the SMD nature of this inherently microstrip two-port device. Parascan is a trademarked tunable dielectric material developed by Paratek Microwave, Inc., the assignee of the present invention. Tunable dielectric materials are the materials whose permittivity (more commonly called dielectric constant) can be varied by varying the strength of an electric field to which the materials are subjected or immersed. Examples of such materials can be found in U.S. Pat. Nos. 5,312,790, 5,427,988, 5,486,491, 5,693,429 and 6,514,895. These materials show low dielectric loss and high tunability. Tunability is defined as the fractional change in the dielectric constant with applied voltage. The patents above are incorporated into the present application by reference in their entirety.

Controller

The controller consists of a 3"×5"×0.031" 4-layer FR-4 PCB. It has SMD parts on the top side only, as is mounted to the bottom of the base 410. The controller has two right angle PCB-mount external connectors 415, 420 that can be accessed through the base 410. A DB-25 female connector 915 is used for the command and a DC power jack 905 is used to receive the DC power. It is, of course, understood that any connector can be used for command and power connection.

The controller contains a microprocessor and memory to receive commands and act on them. Based upon the command, the controller sends the proper TTL signals to the SP3T switches and the proper 10 to 50 V (6-bit resolution) signals to the phase shifters. To send these high voltage signals, a high voltage supply, regulator, and high voltage semiconductor signal distribution methods are used.

Base 410

The design choice for this preferred embodiment has a base formed from black Acrylonitrile Butadiene Styrene (ABS) and measures 6.5" round in diameter and 0.5" in main height. The bottom is solid to accommodate the controller board, and the side has one flat surface for the connectors. The top side at the 0.5" height is reinforced in thickness to achieve the rigidity to protect the Alumina modules; or, a thin 0.1" aluminum sheet could be used in addition at the top if needed.

Extending from the main top side level are nine vertical triangular posts 525 that make the overall height 3.0 inches, minus the thickness of the radome 405. This ensures that the radome 405 inside surface contacts the base posts. These posts 525 provide alignment and centering for the RF modules that connect to the RF motherboard via flex circuit sections. The RF modules are bonded in place to these posts. At the lower portion of base 410 are openings 555 and 590, whereat RF connectors 420 and 415 protrude.

Internal Interconnect and Distribution

The RF MMCX bulkhead jacks 415, 420 are connected to the RF motherboard 545 via thin coaxial cables. These cables are integral to the bulkhead connector 595 and 535 and have surface mount compatible snap-on features to attach to the motherboard. The controller sends its voltage signals to the RF motherboard 545 via a ribbon cable. Mating pins are provided on the controller and motherboard to accept the ribbon cable connectors.

The RF modules 515 are connected to the motherboard using a flex circuit. This flex circuit is made of 0.015" thick Kapton and has a matching footprint of the lower dielectric spacer (1.7"×1.8") and has an additional 0.375" extension that hangs off the 1.7" wide edge. The side of the circuit bonded at the dielectric spacer is completely copper except for a cross-shaped aperture, centered on the spacer. The exterior side of the circuit has two microstrip lines that cross the aperture and proceed down to the extension, plus the copper extends past the Kapton to allow a ribbon-type connection to the motherboards 545. At the bottom of the spacers 560 and throughout the extension there are coplanar ground pads around these lines. These ground pads 570 are connected to the reverse side ground through vias. These ground pads also extend slightly past the Kapton. Each module extension 530 can be laid on top of the motherboard and is soldered in place, both ground and main trace. All copper traces are protected by immersion nickel-gold plating.

End User Interconnect and Interfaces

The two coaxial cables carry the RF signals between the scanning antenna 400 and the reader 10b via interface 15b. One cable is used to carry each linear polarization, horizontal and vertical, for diversity. Both cables have an MMCX plug on one end and a connector which mates to the card on the other. This mating connector may be an MMCX, SMA, or a proprietary connector, depending upon the configuration of interface 15b.

The digital cable carries the command interface, and is a standard bi-directional IEEE-1284 parallel cable with male DB-25 connectors, and made in identical lengths as the RF cable. The DC power supply is a wall-mount transformer with integral cable that terminates in a DC power plug. This cable plugs into the antenna's DC power jack. However, as mentioned above the power supply 1115 of reader 10b can also power scanning antenna 400 vi interface 15b.

Radome Housing

A formed black ABS radome encloses the present invention and protects the internal components. It is understood that this housing is but one of any number of potential housings for the present invention. The outer diameter matches the base at 6.5", and the height aligns to the base vertical posts, for a part height of 2.5". Thus the antenna is 3.0" in total height. The radome has a nominal wall thickness of 0.063" and a 1° draft angle. The top of the radome is nominally 0.125" thick.

Fabrication

The controller can be screwed to the bottom of the base. The internal coaxial cable bulkheads are secured to the base. The copper ribbon extensions of the RF modules are soldered in a flat orientation to the RF motherboard. The snap-on ends of the coaxial cables are attached to the motherboard/module assembly, which is lowered in place between the base vertical posts. The RF modules are secured to the posts, perpendicular to the motherboard. The radome is fused to the base at its bottom and at the upper vertical posts.

Figure 4:
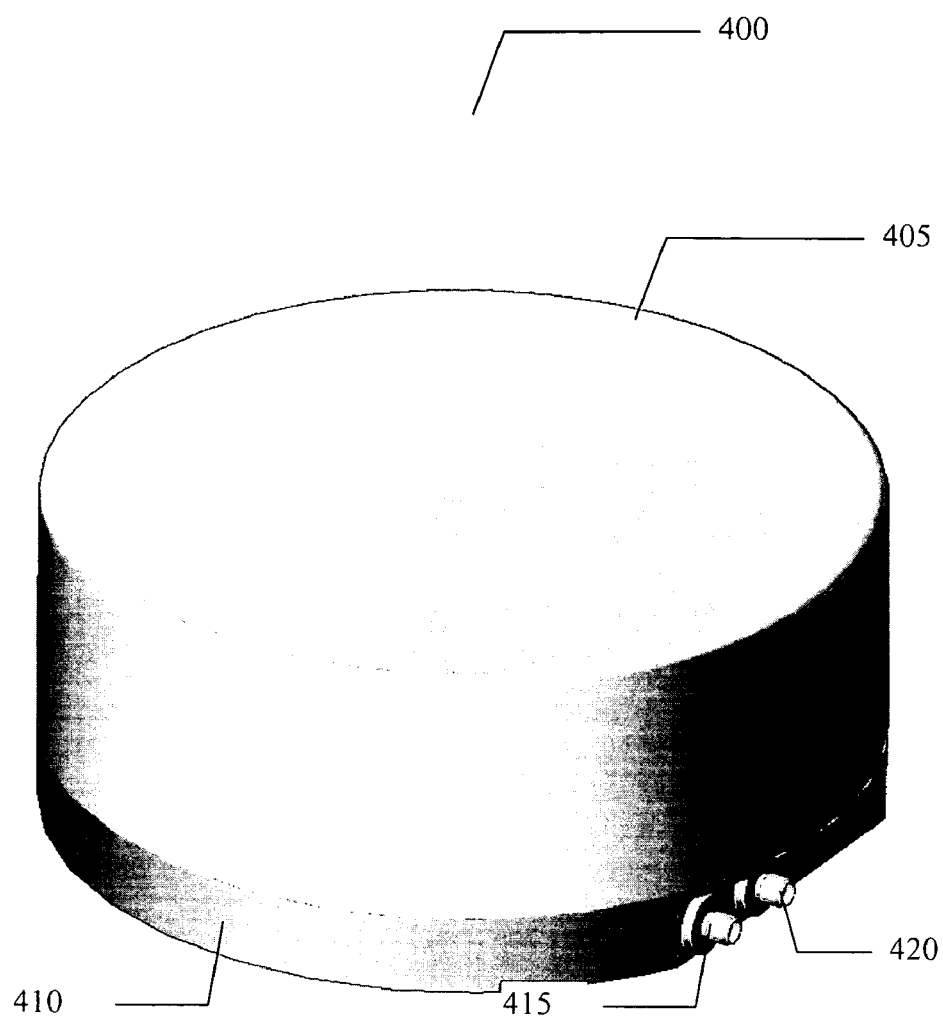
FIG. 4 depicts the RF ID tag reader antenna of the present invention.

For further elaboration of the fabrication of the present invention, FIGS. 4, 5, 6, 7 and 8 depict the present invention with various levels of expansion. FIG. 4 depicts the scanning antenna 400 of the present invention in a completely fabricated view with the Radome 405 placed on top of base 410 with RF connectors 415 and 420 protruding from base 410.

Figure 5:
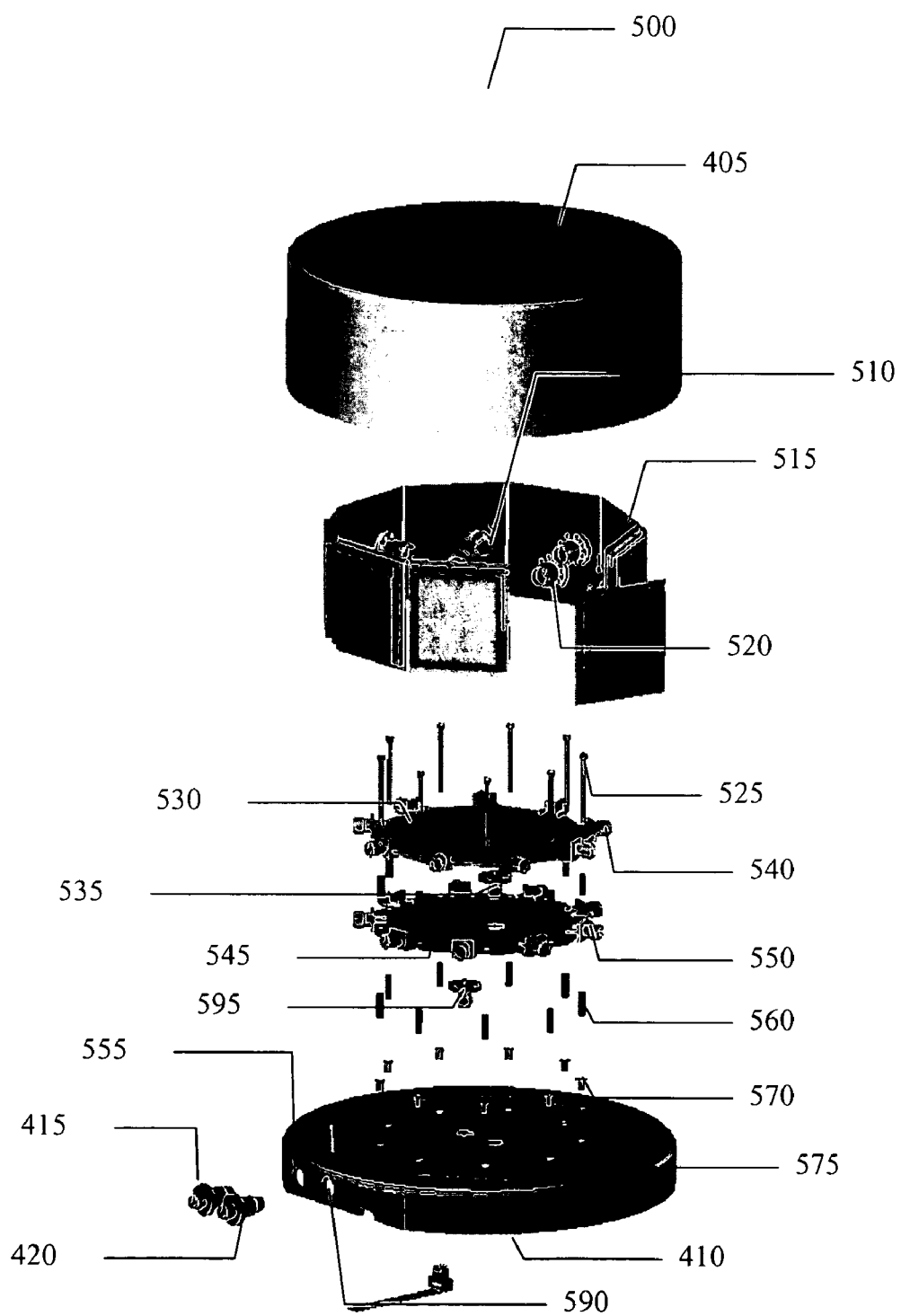
FIG. 5 is an exploded view of the RF ID tag antenna of the present invention.

FIG. 5 is an exploded view of the scanning antenna 400 of the present invention wherein all of the internal components of scanning antenna 400 can be seen. These include radome 405 and base 410 with representative RF module 515 and RF connectors 510 and 520 located within said RF module 515. Expansion module 530 also has RF connectors represented by 540. Posts for securing are depicted at 525 and spaces at 560. As described above, RF motherboard is shown at 545 immediately above base 410 and attached by screws 570. Main connectors 595 and 535 are shown connected to RF motherboard 545 and expansion module 530. Also connected to RF motherboard 545 is RF connector 550.

Figure 6:
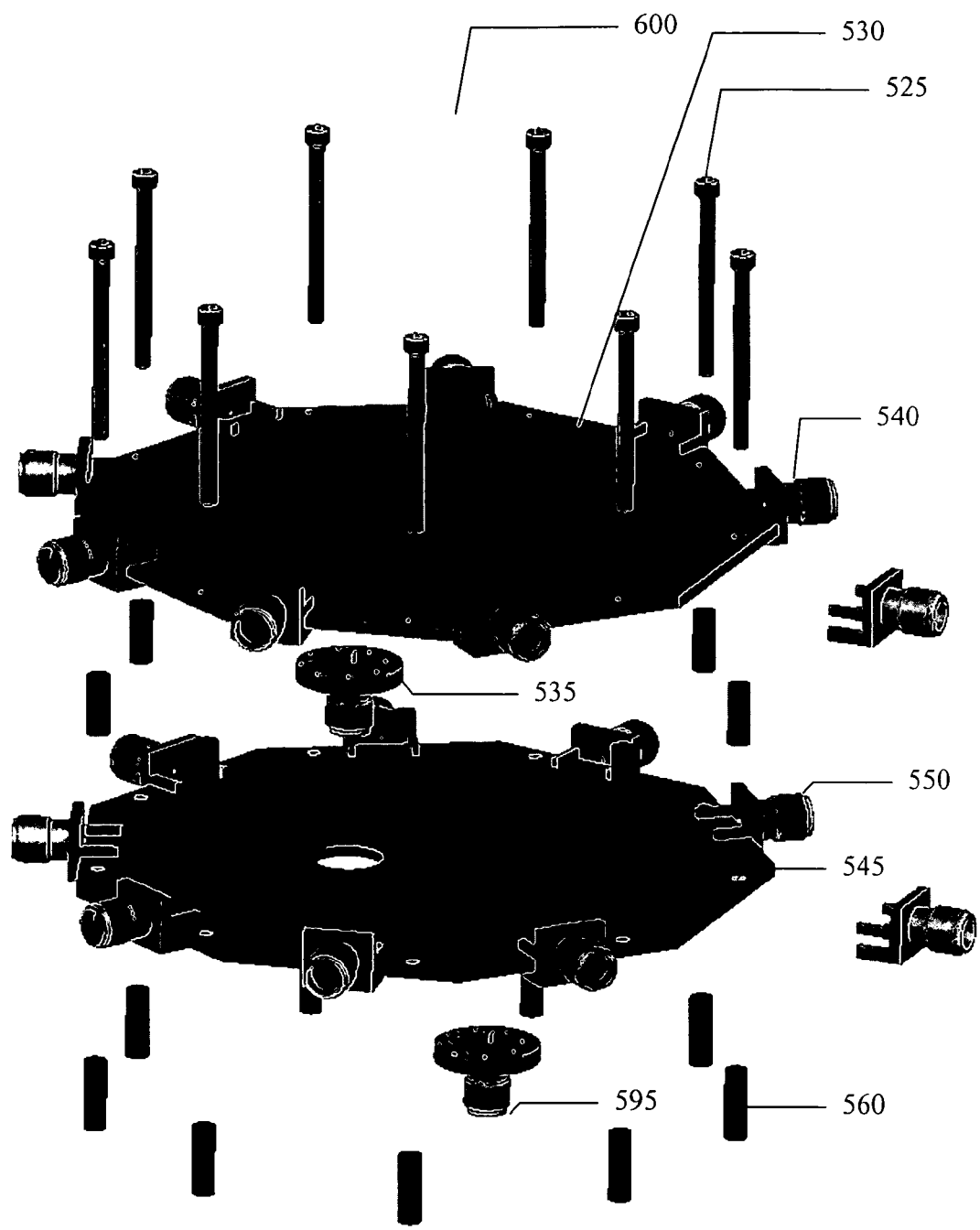
FIG. 6 is a more detailed exploded view of the RF Boards construction of the RFID tag antenna of the present invention.
Figure 7:
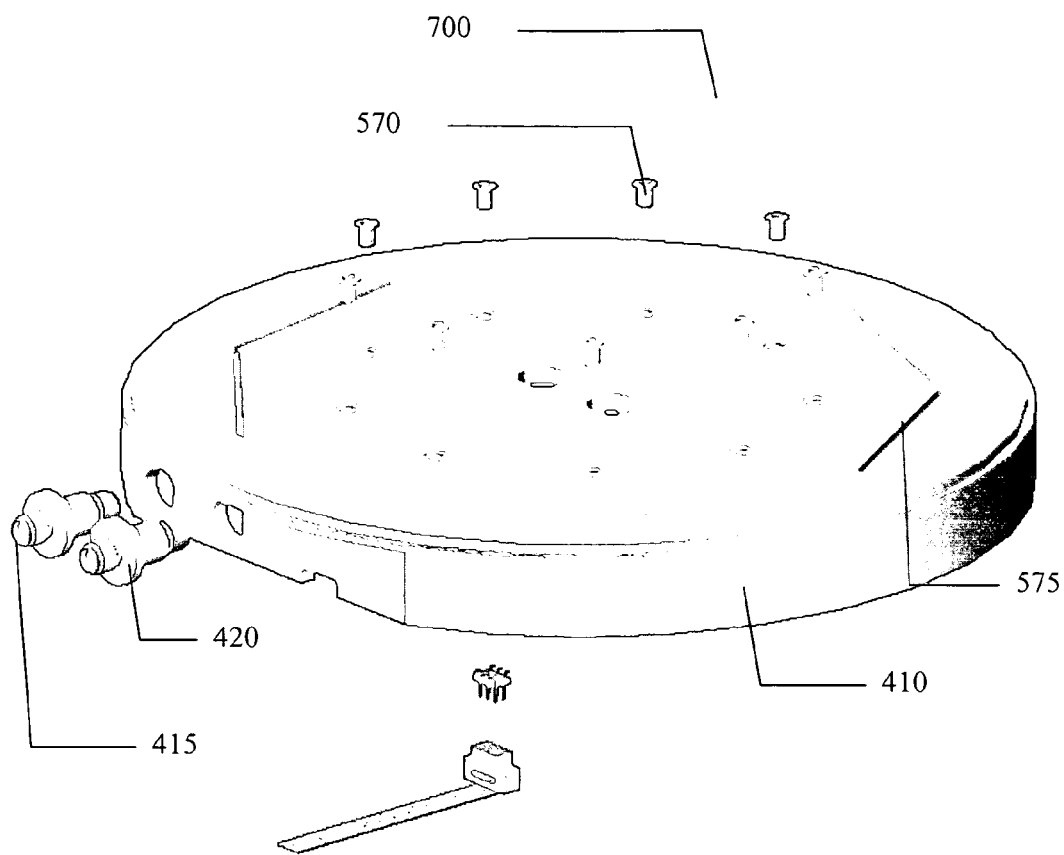
FIG. 7 is a more detailed exploded view of the base construction of the RF ID tag antenna of the present invention.

To more clearly depict the construction, FIG. 6 is a more detailed exploded view of the RF Boards construction of the scanning antenna of the present invention showing the construction of expansion module 515 and RF motherboard 545. Further, FIG. 7 is a more detailed exploded view of the base 410 construction of the scanning antenna of the present invention.

FIG. 8 is a more detailed exploded view of the RF Module construction of the scanning antenna of the present invention. This includes the placement of the dielectric material 810 and 820 adjacent to metal 805, 815 and 825. Although, the present depiction shows two dielectric layers and three metal layers, different layers can be used based on design choices and performance requirements.

Figure 9:
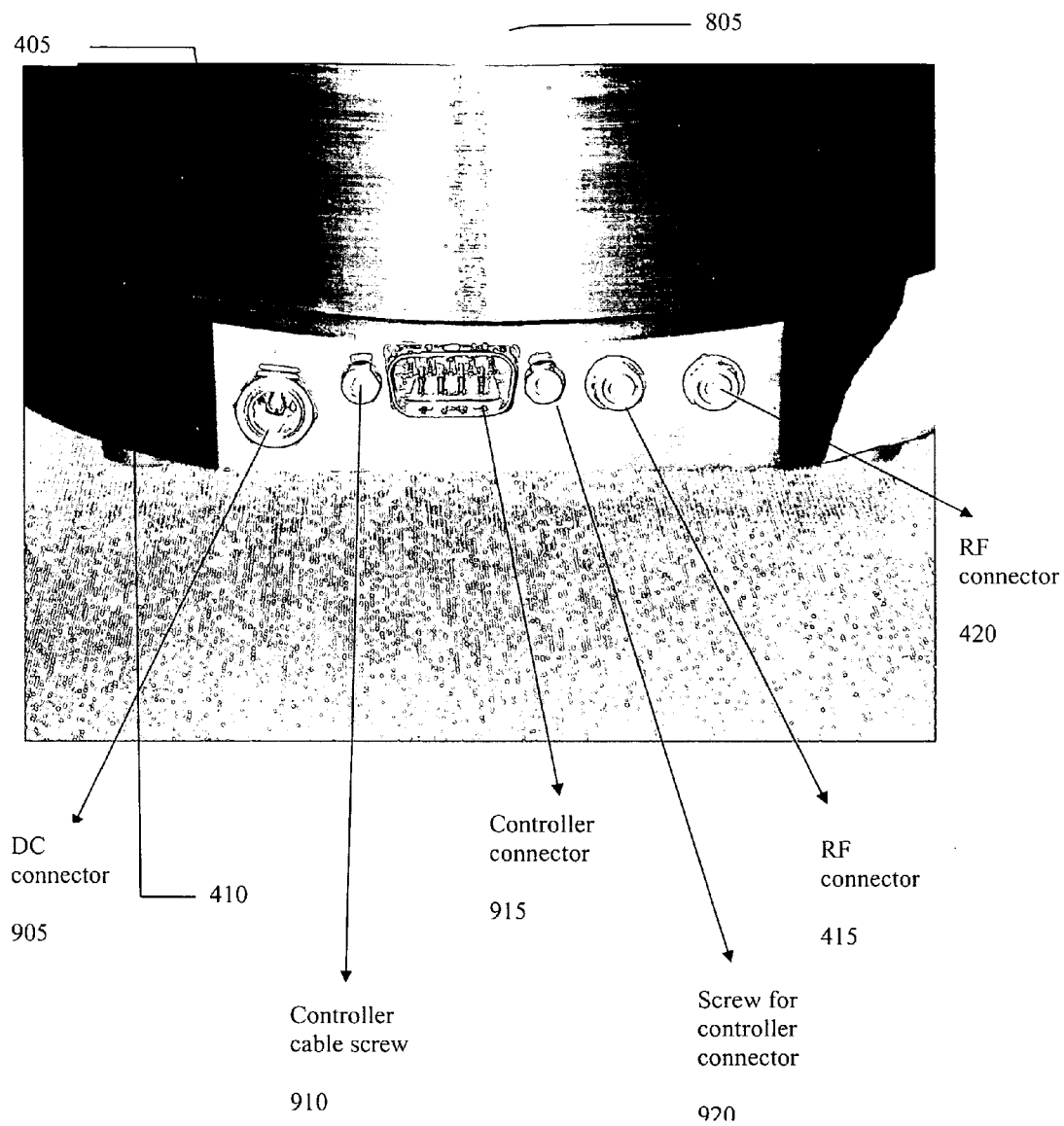
FIG. 9 is a depiction of a detailed view of the various inputs into the base of the RF ID tag reader antenna of the present invention.

FIG. 9 shows an actual representation of the invention herein described with base 410 allowing for RF connectors 420 and 415 and DC connector 905 and controller connector 915 with screws 910 and 920 for securing said controller connector.

Figure 10:
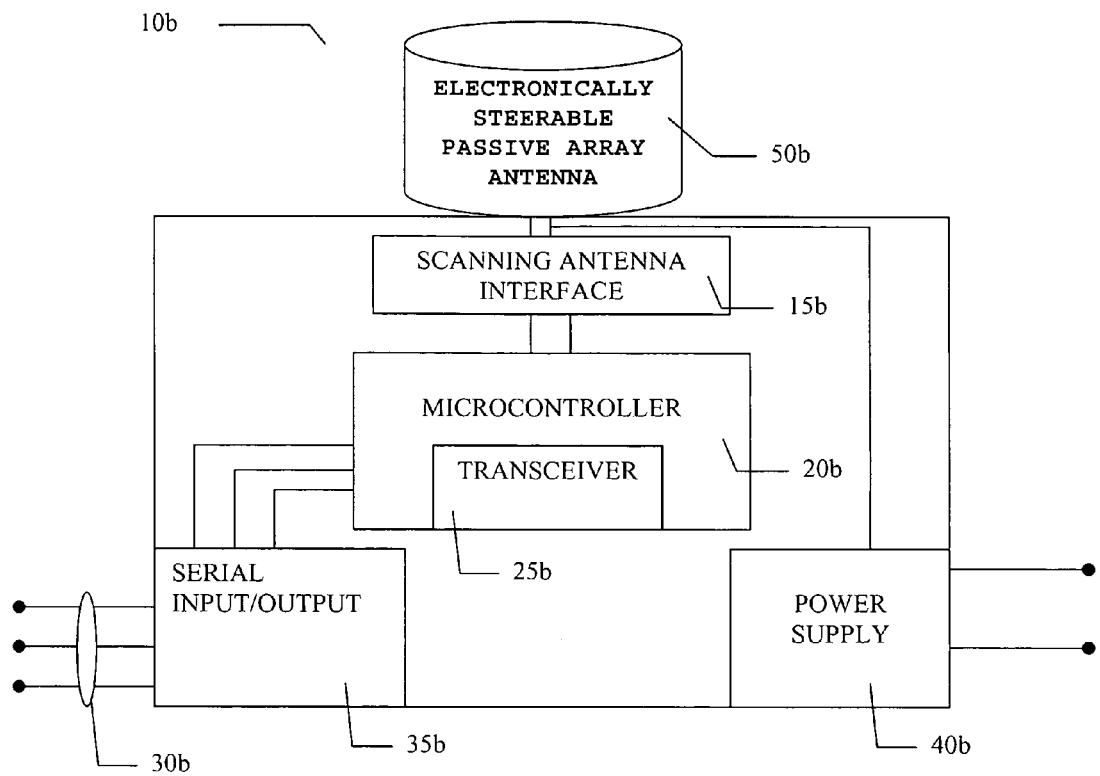
FIG. 10 is a block diagram of the basic sections of an RF ID tag reader with the electronically steerable passive array antenna incorporated therein.

FIG. 10 shows an alternate embodiment of the present invention which utilizes an electronically steerable passive array antenna in lieu of the scanning antenna set forth above. The electronically steerable passive array antenna is described in detail below and in a patent application filed by an inventor of the present invention on Aug. 14, 2003, and is entitled, "ELECTRONICALLY STEERABLE PASSIVE ARRAY ANTENNA", with attorney docket no. WJT08-0065, Ser. No. 10/413,317. FIG. 10 depicts a block diagram of a typical RF ID tag reader 10b as described above of the present invention. Again, the reader has a range of from a few millimeters to several meters and more depending upon size of the RF ID tag, the directionality of the beam of the scanning antenna, the operating frequency, and whether the transponder is a passive or active type. The reader 10b can contain a microcontroller 20b for controlling reader functionality and programming and in this embodiment is connected to an array antenna 90b, via interface 15b. As above, a transceiver 25b can be associated with said microcontroller 20b for generation and reception of RF signals to be passed to array antenna 50b via interface 15b.

As above, power is provided by power supply 40b and a serial input/out 35b is provided to provide information to microcontroller 20b via serial communications link 30b. This enables external programming and functionality control of microcontroller 20b.

Figure 11:
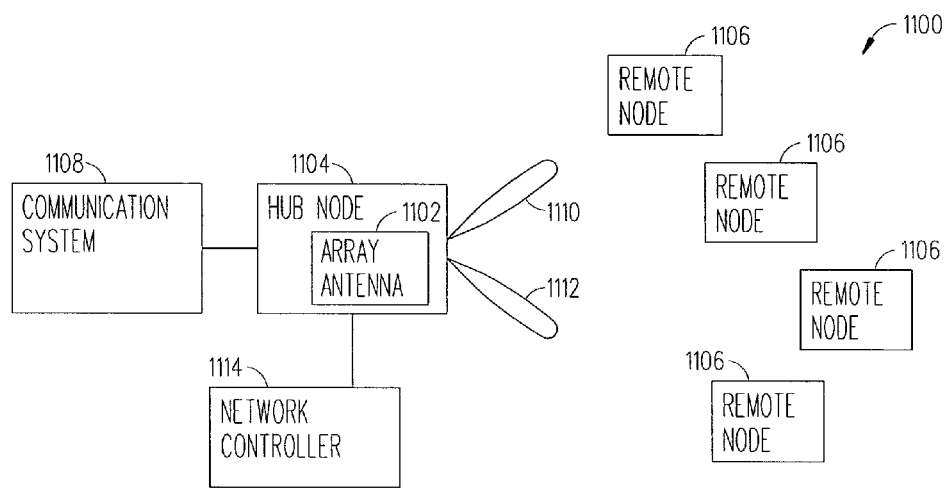
FIG. 11 is a block diagram of a wireless communications network capable of incorporating an array antenna in an RF ID tag system of the present invention.

Referring to the drawings which incorporate the electronically steerable passive array antenna embodiment of the present invention, FIG. 11 is a block diagram of a wireless communications network 1100 that can incorporate an array antenna 1102. Although the array antenna 1102 is described below as being incorporated within a hub type wireless communication network 1100 and within the RF ID tag system, it should be understood that many other types of networks can incorporate the array antenna 1102 to be incorporated into the RF ID tag system. For instance, the array antenna 1102 can be incorporated within a mesh type wireless communication network, a 24–42 GHz point-to-point microwave network, 24–42 GHz point-to-multipoint microwave network or a 2.1–2.7 GHz multipoint distribution system. Accordingly, the array antenna 1102 of the present invention should not be construed in a limited manner.

Referring to FIG. 11, there is a block diagram of a hub type wireless communications network 1100 that utilizes the array antenna 1102 of the present invention. The hub type wireless communications network 1100 includes a hub node 1104 and one or more remote nodes 1106 (four shown). The remote nodes 1106 of the present invention may represent tags as described above.

The hub node 1104 incorporates the electronically steerable passive array antenna 1102 that produces one or more steerable radiation beams 1110 and 1112 which are used to establish communications links with particular remote nodes 1106 (such as tags). A network controller 1114 directs the hub node 1104 and in particular the array antenna 1102 to establish a communications link with a desired remote node 1106 by outputting a steerable beam having a maximum radiation beam pointed in the direction of the desired remote node 1106 and a minimum radiation beam (null) pointed away from that remote node 1106. The network controller 1114 may obtain its adaptive beam steering commands from a variety of sources like the combined use of an initial calibration algorithm and a wide beam which is used to detect new remote nodes 1106 and moving remote nodes 1106. The wide beam enables all new or moved remote nodes 1106 to be updated in its algorithm. The algorithm then can determine the positions of the remote nodes 1106 and calculate the appropriate DC voltage for each of the voltage-tunable capacitors 1206 (described below) in the array antenna 1102.

A more detailed discussion about one way the network controller 1114 can keep up-to-date with its current communication links is provided in a co-owned U.S. patent application Ser. No. 09/620,776 entitled "Dynamically Reconfigurable Wireless Networks (DRWiN) and Methods for Operating such Networks". The contents of this patent application are incorporated by reference herein.

It should be appreciated that the hub node 1104 can also be connected to a backbone communications system 1108 (e.g., Internet, private networks, public switched telephone network, wide area network). It should also be appreciated that the remote nodes 1106 can incorporate an electronically steerable passive array antenna 1102.

Figure 12:
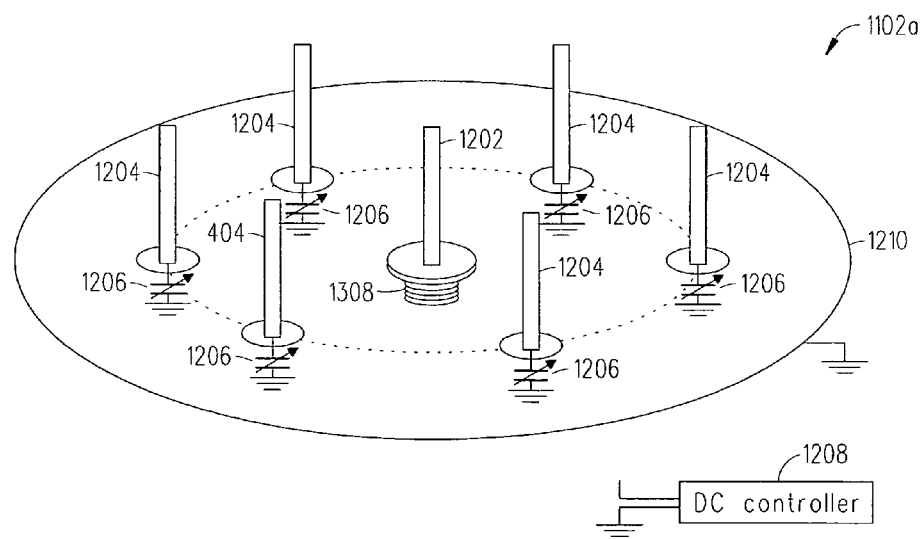
FIG. 12 is a perspective view that illustrates the basic components of a first embodiment of the array antenna shown in FIG. 11.

Referring to FIG. 12, there is a perspective view that illustrates the basic components of a first embodiment of the array antenna 1102a. The array antenna 1102a includes a radiating antenna element 1202 capable of transmitting and receiving radio signals and one or more parasitic antenna elements 1204 that are incapable of transmitting or receiving radio signals. Each parasitic antenna element 1204 (six shown) is located a predetermined distance away from the radiating antenna element 1202. A voltage-tunable capacitor 1206 (six shown) is connected to each parasitic antenna element 1204. A controller 1208 is used to apply a predetermined DC voltage to each one of the voltage-tunable capacitors 1206 in order to change the capacitance of each voltage-tunable capacitor 1206 and thus enable one to control the directions of the maximum radiation beams and the minimum radiation beams (nulls) of a radio signal emitted from the array antenna 1102. The controller 1208 may be part of or interface with the network controller 1114 (see FIG. 11).

In the particular embodiment shown in FIG. 12, the array antenna 1102a includes one radiating antenna element 1202 and six parasitic antenna elements 1204 all of which are configured as monopole elements. The antenna elements 1202 and 1204 are electrically insulated from a grounding plate 1210. The grounding plate 1210 has an area large enough to accommodate all of the antenna elements 1202 and 1204. In the preferred embodiment, each parasitic antenna element 1204 is arranged on a circumference of a predetermined circle around the radiating antenna element 1202. For example, the radiating antenna element 1202 and the parasitic antenna elements 1204 can be separated from one another by about $0.2\lambda0–0.5\lambda0$ where $\lambda0$ is the working free space wavelength of the radio signal.

Figure 13:
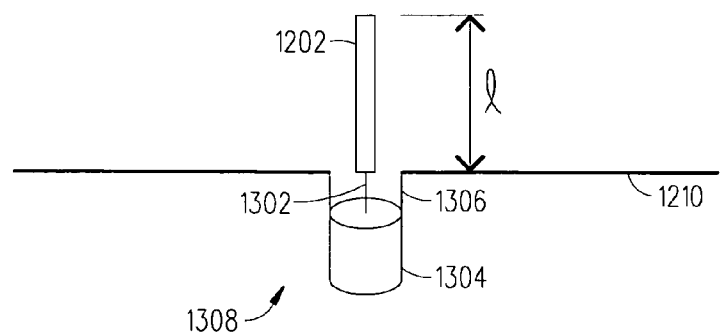
FIG. 13 is a side view of a RF feed antenna element located in the array antenna shown in FIG. 12.

Referring to FIG. 13, there is a side view of the RF feed antenna element 1202. In this embodiment, the feeding antenna element 1202 comprises a cylindrical element that is electrically insulated from the grounding plate 1210. The feeding antenna element 1202 typically has a length of $0.2\lambda0–0.3\lambda0$ where $\lambda0$ is the working free space wavelength of the radio signal. As shown, a central conductor 1302 of a coaxial cable 1304 that transmits a radio signal fed from a radio apparatus (not shown) is connected to one end of the radiating antenna element 1202. And, an outer conductor 1306 of the coaxial cable 1304 is connected to the grounding plate 1210. The elements 1302, 1304 and 1306 collectively are referred to as an RF input 1308 (see FIG. 12). Thus, the radio apparatus (not shown) feeds a radio signal to the feeding antenna element 1202 through the coaxial cable 1304, and then, the radio signal is radiated by the feeding antenna element 1202.

Figure 14:
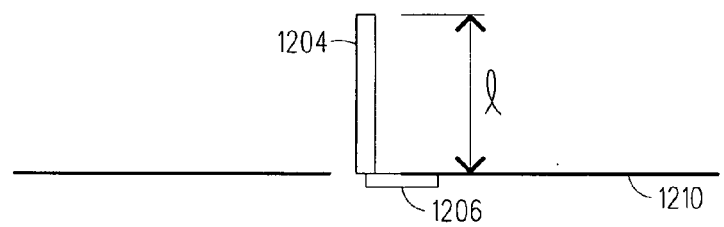
FIG. 14 is a side view of a parasitic antenna element and a voltage-tunable capacitor located in the array antenna shown in FIG. 12.

Referring to FIG. 14, there is a side view of one parasitic antenna element 1204 and one voltage-tunable capacitor 1206. In this embodiment, each parasitic antenna element 1204 has a similar structure comprising a cylindrical element that is electrically insulated from the grounding plate 1210. The parasitic antenna elements 1204 typically have the same length as the radiating antenna element 1202. The voltage-tunable capacitor 1206 is supplied a DC voltage as shown in FIG. 12 which causes a change in the capacitance of the voltage-tunable capacitor 1206 and thus enables one to the control of the directions of the maximum radiation beams and the minimum radiation beams (nulls) of a radio signal emitted from the array antenna 1102. A more detailed discussion about the components and advantages of the voltage-tunable capacitor 1206 are provided below with respect to FIGS. 15A and 15B.

Figures 15A, 15B:
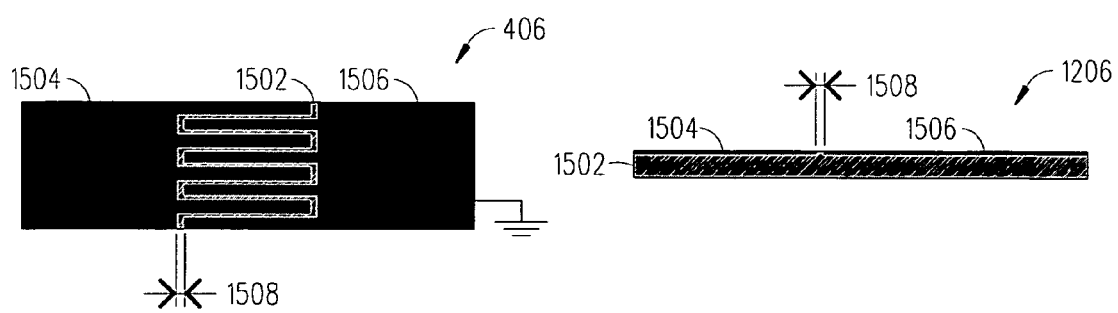
FIGS. 15A and 15B respectively show a top view and a cross-sectional side view of the voltage-tunable capacitor shown in FIG. 14.

Referring to FIGS. 15A and 15B, there are respectively shown a top view and a cross-sectional side view of an exemplary voltage-tunable capacitor 1206. The voltage-tunable capacitor 1206 includes a tunable ferroelectric layer 1502 and a pair of metal electrodes 1504 and 1506 positioned on top of the ferroelectric layer 1502. As shown in FIG. 14, one metal electrode 1504 is attached to one end of the parasitic antenna element 1204. And, the other metal electrode 1504 is attached to the grounding plate 1210. The controller 1208 applies the DC voltage to both of the metal electrodes 1504 and 1506 (see FIG. 12). A substrate (not shown) may be positioned on the bottom of the ferroelectric layer 1502. The substrate may be any type of material that has a relatively low permittivity (e.g., less than about 30) such as MgO, Alumina, LaAlO3, Sapphire, or ceramic.

The tunable ferroelectric layer 1502 is a material that has a permittivity in a range from about 20 to about 2000, and has a tunability in the range from about 10% to about 80% at a bias voltage of about 10 V/μm. In an embodiment this layer may include Barium-Strontium Titanate, $Ba_xSr_{1-x}TiO_3$ (BSTO), where x can range from zero to one, or BSTO-composite ceramics. Examples of such BSTO composites include, but are not limited to: BSTO—MgO, BSTO—MgAl2O4, BSTO—CaTiO3, BSTO—MgTiO3, BSTO—MgSrZrTiO6, and combinations thereof. The tunable ferroelectric layer 1502 in one preferred embodiment has a dielectric permittivity greater than 100 when subjected to typical DC bias voltages, for example, voltages ranging from about 5 volts to about 300 volts. And, the thickness of the ferroelectric layer can range from about 0.1 μm to about 20 μm. Following is a list of some of the patents which discuss different aspects and capabilities of the tunable ferroelectric layer 1502 all of which are incorporated herein by reference: U.S. Pat. Nos. 5,312,790; 5,427,988; 5,486,491; 5,635,434; 5,830,591; 5,846,893; 5,766,697; 5,693,429 and 5,635,433. Again, the tunable dielectric layer may include, but is not required to be, Parascan® tunable dielectric. The term Parascan® as used herein is a trademarked term indicating a tunable dielectric material developed by the assignee of the present invention. Parascan® tunable dielectric materials have been described in several patents. Barium strontium titanate (BaTiO3-SrTiO3), also referred to as BSTO, is used for its high dielectric constant (200-6,000) and large change in dielectric constant with applied voltage (25-75 percent with a field of 2 Volts/micron). Tunable dielectric materials including barium strontium titanate are disclosed in U.S. Pat. No. 5,312,790 to Sengupta, et al. entitled "Ceramic Ferroelectric Material"; U.S. Pat. No. 5,427,988 by Sengupta, et al. entitled "Ceramic Ferroelectric Composite Material-BSTO-MgO"; U.S. Pat. No. 5,486,491 to Sengupta, et al. entitled "Ceramic Ferroelectric Composite Material—BSTO-ZrO2"; U.S. Pat. No. 5,635,434 by Sengupta, et al. entitled "Ceramic Ferroelectric Composite Material-BSTO-Magnesium Based Compound"; U.S. Pat. No. 5,830,591 by Sengupta, et al. entitled "Multilayered Ferroelectric Composite Waveguides"; U.S. Pat. No. 5,846,893 by Sengupta, et al. entitled "Thin Film Ferroelectric Composites and Method of Making"; U.S. Pat. No. 5,766,697 by Sengupta, et al. entitled "Method of Making Thin Film Composites"; U.S. Pat. No. 5,693,429 by Sengupta, et al. entitled "Electronically Graded Multilayer Ferroelectric Composites"; U.S. Pat. No. 5,635,433 by Sengupta entitled "Ceramic Ferroelectric Composite Material BSTO-ZnO"; U.S. Pat. No. 6,074,971 by Chiu et al. entitled "Ceramic Ferroelectric Composite Materials with Enhanced Electronic Properties BSTO Mg Based Compound-Rare Earth Oxide". These patents are incorporated herein by reference.

The materials shown in these patents, especially BSTO-MgO composites, show low dielectric loss and high tunability. Tunability is defined as the fractional change in the dielectric constant with applied voltage.

Barium strontium titanate of the formula BaxSr1-xTiO3 is a preferred electronically tunable dielectric material due to its favorable tuning characteristics, low Curie temperatures and low microwave loss properties. In the formula BaxSr1-xTiO3, x can be any value from 0 to 1, preferably from about 0.15 to about 0.6. More preferably, x is from 0.3 to 0.6.

Other electronically tunable dielectric materials may be used partially or entirely in place of barium strontium titanate. An example is BaxCa1-xTiO3, where x is in a range from about 0.2 to about 0.8, preferably from about 0.4 to about 0.6. Additional electronically tunable ferroelectrics include PbxZr1-xTiO3 (PZT) where x ranges from about 0.0 to about 1.0, PbxZr1-xSrTiO3 where x ranges from about 0.05 to about 0.4, KTaxNb1-xO3 where x ranges from about 0.0 to about 1.0, lead lanthanum zirconium titanate (PLZT), PbTiO3, BaCaZrTiO3, NaNO3, KNbO3, LiNbO3, LiTaO3, PbNb2O6, PbTa2O6, KSr(NbO3) and NaBa2(NbO3) 5KH2PO4, and mixtures and compositions thereof. Also, these materials can be combined with low loss dielectric materials, such as magnesium oxide (MgO), aluminum oxide (Al2O3), and zirconium oxide (ZrO2), and/or with additional doping elements, such as manganese (MN), iron (Fe), and tungsten (W), or with other alkali earth metal oxides (i.e. calcium oxide, etc.), transition metal oxides, silicates, niobates, tantalates, aluminates, zirconnates, and titanates to further reduce the dielectric loss.

In addition, the following U.S. patent applications, assigned to the assignee of this application, disclose additional examples of tunable dielectric materials: U.S. application Ser. No. 09/594,837 filed Jun. 15, 2000, entitled "Electronically Tunable Ceramic Materials Including Tunable Dielectric and Metal Silicate Phases"; U.S. application Ser. No. 09/768,690 filed Jan. 24, 2001, entitled "Electronically Tunable, Low-Loss Ceramic Materials Including a Tunable Dielectric Phase and Multiple Metal Oxide Phases"; U.S. application Ser. No. 09/882,605 filed Jun. 15, 2001, entitled "Electronically Tunable Dielectric Composite Thick Films And Methods Of Making Same"; U.S. application Ser. No. 09/834,327 filed Apr. 13, 2001, entitled "Strain-Relieved Tunable Dielectric Thin Films"; and U.S. Provisional Application Ser. No. 60/295,046 filed Jun. 1, 2001 entitled "Tunable Dielectric Compositions Including Low Loss Glass Frits". These patent applications are incorporated herein by reference.

The tunable dielectric materials can also be combined with one or more non-tunable dielectric materials. The non-tunable phase(s) may include MgO, MgAl2O4, MgTiO3, Mg2SiO4, CaSiO3, MgSrZrTiO6, CaTiO3, Al2O3, SiO2 and/or other metal silicates such as BaSiO3 and SrSiO3. The non-tunable dielectric phases may be any combination of the above, e.g., MgO combined with MgTiO3, MgO combined with MgSrZrTiO6, MgO combined with Mg2SiO4, MgO combined with Mg2SiO4, Mg2SiO4 combined with CaTiO3 and the like.

Additional minor additives in amounts of from about 0.1 to about 5 weight percent can be added to the composites to additionally improve the electronic properties of the films. These minor additives include oxides such as zirconnates, tannates, rare earths, niobates and tantalates. For example, the minor additives may include CaZrO3, BaZrO3, SrZrO3, BaSnO3, CaSnO3, MgSnO3, Bi2O3/2SnO2, Nd2O3, Pr7O11, Yb2O3, Ho2O3, La2O3, MgNb2O6, SrNb2O6, BaNb2O6, MgTa2O6, BaTa2O6 and Ta2O3.

Thick films of tunable dielectric composites may comprise Ba1-xSrxTiO3, where x is from 0.3 to 0.7 in combination with at least one non-tunable dielectric phase selected from MgO, MgTiO3, MgZrO3, MgSrZrTiO6, Mg2SiO4, CaSiO3, MgAl2O4, CaTiO3, Al2O3, SiO2, BaSiO3 and SrSiO3. These compositions can be BSTO and one of these components, or two or more of these components in quantities from 0.25 weight percent to 80 weight percent with BSTO weight ratios of 99.75 weight percent to 20 weight percent.

The electronically tunable materials may also include at least one metal silicate phase. The metal silicates may include metals from Group 2A of the Periodic Table, i.e., Be, Mg, Ca, Sr, Ba and Ra, preferably Mg, Ca, Sr and Ba. Preferred metal silicates include Mg2SiO4, CaSiO3, BaSiO3 and SrSiO3. In addition to Group 2A metals, the present metal silicates may include metals from Group 1A, i.e., Li, Na, K, Rb, Cs and Fr, preferably Li, Na and K. For example, such metal silicates may include sodium silicates such as Na2SiO3 and NaSiO3-5H$_2$O, and lithium-containing silicates such as LiAlSiO4, Li2SiO3 and Li4SiO4. Metals from Groups 3A, 4A and some transition metals of the Periodic Table may also be suitable constituents of the metal silicate phase. Additional metal silicates may include Al2Si2O7, ZrSiO4, KalSi3O8, NaAlSi3O8, CaAl2Si2O8, CaMgSi2O6, BaTiSi3O9 and Zn2SiO4. The above tunable materials can be tuned at room temperature by controlling an electric field that is applied across the materials.

In addition to the electronically tunable dielectric phase, the electronically tunable materials can include at least two additional metal oxide phases. The additional metal oxides may include metals from Group 2A of the Periodic Table, i.e., Mg, Ca, Sr, Ba, Be and Ra, preferably Mg, Ca, Sr and Ba. The additional metal oxides may also include metals from Group 1A, i.e., Li, Na, K, Rb, Cs and Fr, preferably Li, Na and K. Metals from other Groups of the Periodic Table may also be suitable constituents of the metal oxide phases. For example, refractory metals such as Ti, V, Cr, Mn, Zr, Nb, Mo, Hf, Ta and W may be used. Furthermore, metals such as Al, Si, Sn, Pb and Bi may be used. In addition, the metal oxide phases may comprise rare earth metals such as Sc, Y, La, Ce, Pr, Nd and the like.

The additional metal oxides may include, for example, zirconnates, silicates, titanates, aluminates, stannates, niobates, tantalates and rare earth oxides. Preferred additional metal oxides include Mg2SiO4, MgO, CaTiO3, MgZrSrTiO6, MgTiO3, MgAl2O4, WO3, SnTiO4, ZrTiO4, CaSiO3, CaSnO3, CaWO4, CaZrO3, MgTa2O6, MgZrO3, MnO2, PbO, Bi2O3 and La2O3. Particularly preferred additional metal oxides include Mg2SiO4, MgO, CaTiO3, MgZrSrTiO6, MgTiO3, MgAl2O4, MgTa2O6 and MgZrO3.

The additional metal oxide phases are typically present in total amounts of from about 1 to about 80 weight percent of the material, preferably from about 3 to about 65 weight percent, and more preferably from about 5 to about 60 weight percent. In one preferred embodiment, the additional metal oxides comprise from about 10 to about 50 total weight percent of the material. The individual amount of each additional metal oxide may be adjusted to provide the desired properties. Where two additional metal oxides are used, their weight ratios may vary, for example, from about 1:100 to about 100:1, typically from about 1:10 to about 10:1 or from about 1:5 to about 5:1. Although metal oxides in total amounts of from 1 to 80 weight percent are typically used, smaller additive amounts of from 0.01 to 1 weight percent may be used for some applications.

The additional metal oxide phases can include at least two Mg-containing compounds. In addition to the multiple Mg-containing compounds, the material may optionally include Mg-free compounds, for example, oxides of metals selected from Si, Ca, Zr, Ti, Al and/or rare earths.

The varactor of one embodiment of the present invention may provide that any or all of the bottom electrode 140, the tunable dielectric 125, the top electrode 130, the interconnect 120, 145 or the interlayer dielectric 115 are encapsulated. As mentioned above, an interlayer dielectric 115 may be in contact with the top electrode 130, the tunable dielectric 125 and the interconnect 120, 145.

The tunable dielectric layer may comprises one of: barium strontium titanate, barium calcium titanate, lead zirconium titanate, lead lanthanum zirconium titanate, lead titanate, barium calcium zirconium titanate, sodium nitrate, $KNbO_3$, $LiNbO_3$, $LiTaO_3$, $PbNb_2O_6$, $PbTa_2O_6$, $KSr(NbO_3)$, $NaBa_2(NbO_3)_5$, $KH_2PO_4$, and composites thereof. Further, the tunable dielectric layer may comprises a barium strontium titanate (BSTO) composite selected from the group of: BSTO—MgO, BSTO—$MgAl_2O_4$, BSTO—$CaTiO_3$, BSTO—$MgTiO_3$, BSTO—$MgSrZrTiO_6$, and combinations thereof.

The voltage-tunable capacitor 1206 has a gap 1508 formed between the electrodes 1504 and 1506. The width of the gap 1508 is optimized to increase ratio of the maximum capacitance Cmax to the minimum capacitance Cmin (Cmax/Cmin) and to increase the quality factor (O) of the device. The width of the gap 1508 has a strong influence on the Cmax/Cmin parameters of the voltage-tunable capacitor 1206. The optimal width, g, is typically the width at which the voltage-tunable capacitor 1206 has a maximum Cmax/Cmin and minimal loss tangent. In some applications, the voltage-tunable capacitor 1206 may have a gap 1508 in the range of 5–50 μm.

The thickness of the tunable ferroelectric layer 1502 also has a strong influence on the Cmax/Cmin parameters of the voltage-tunable capacitor 1206. The desired thickness of the ferroelectric layer 1502 is typically the thickness at which the voltage-tunable capacitor 1206 has a maximum Cmax/Cmin and minimal loss tangent. For example, an antenna array 1102a operating at frequencies ranging from about 1.0 GHz to about 10 GHz, the loss tangent would range from about 0.0001 to about 0.001. For an antenna array 1102a operating at frequencies ranging from about 10 GHz to about 20 GHz, the loss tangent would range from about 0.001 to about 0.01. And, for an antenna array 1102a operating frequencies ranging from about 20 GHz to about 30 GHz, the loss tangent would range from about 0.005 to about 0.02.

The length of the gap 1508 is another dimension that strongly influences the design and functionality of the voltage-tunable capacitor 1206. In other words, variations in the length of the gap 1508 have a strong effect on the capacitance of the voltage-tunable capacitor 1206. For a desired capacitance, the length can be determined experimentally, or through computer simulation.

The electrodes 1504 and 1506 may be fabricated in any geometry or shape containing a gap 1508 of predetermined width and length. In the preferred embodiment, the electrode material is gold which is resistant to corrosion. However, other conductors such as copper, silver or aluminum, may also be used. Copper provides high conductivity, and would typically be coated with gold for bonding or nickel for soldering.

Figure 16A:
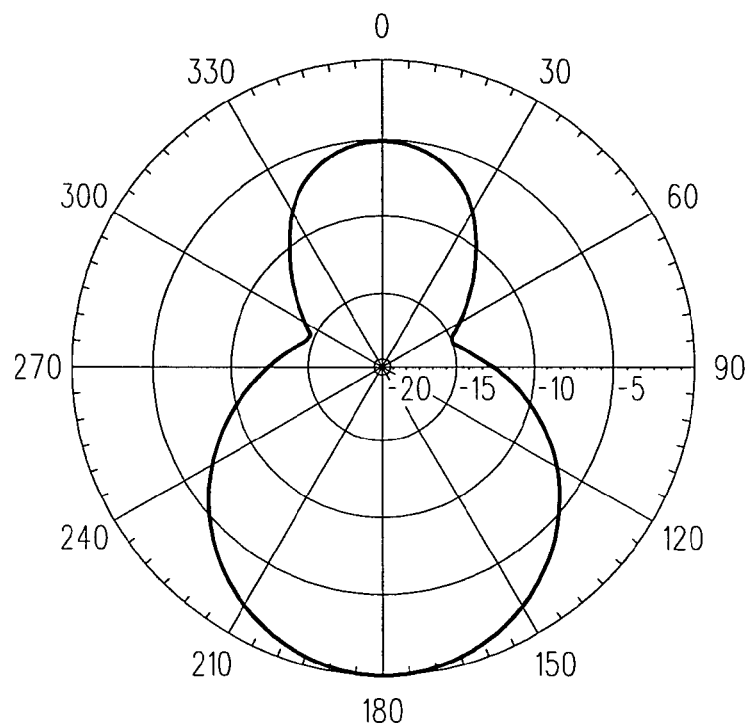
FIGS. 16A and 16B respectively show simulation patterns in a horizontal plane and in a vertical plane that were obtained to indicate the performance of an exemplary array antenna configured like the array antenna shown in FIG. 12 and used in the RF ID tag system of the present invention.
Figure 16B:
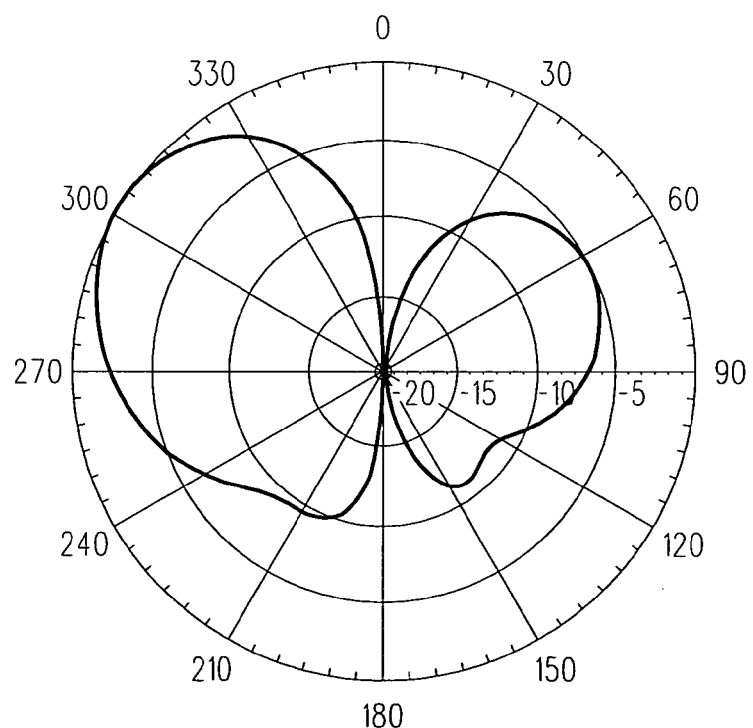

Referring to FIGS. 16A and 16B, there are respectively shown two simulation patterns one in a horizontal plane and the other in a vertical plane that where obtained to indicate the performance of an exemplary array antenna 1102. The exemplary array antenna 1102 has a configuration similar to the array antenna 1102a shown in FIG. 12 where each parasitic antenna element 1204 is arranged on a circumference of a predetermined circle around the radiating antenna element 1202. In this simulation, the radiating antenna element 1202 and the parasitic antenna elements 1204 were separated from one another by 0.25λ0.

Referring again to FIG. 12, the antenna array 1102a operates by exciting the radiating antenna element 1202 with the radio frequency energy of a radio signal. Thereafter, the radio frequency energy of the radio signal emitted from the radiating antenna element 1202 is received by the parasitic antenna elements 1204 which then re-radiate the radio frequency energy after it has been reflected and phase changed by the voltage-tunable capacitors 1206. The controller 1208 changes the phase of the radio frequency energy at each parasitic antenna element 1204 by applying a predetermined DC voltage to each voltage-tunable capacitor 1206 which changes the capacitance of each voltage-tunable capacitor 1206. This mutual coupling between the radiating antenna element 1202 and the parasitic antenna elements 1204 enables one to steer the radiation beams and nulls of the radio signal that is emitted from the antenna array 1102a.

Figure 17:
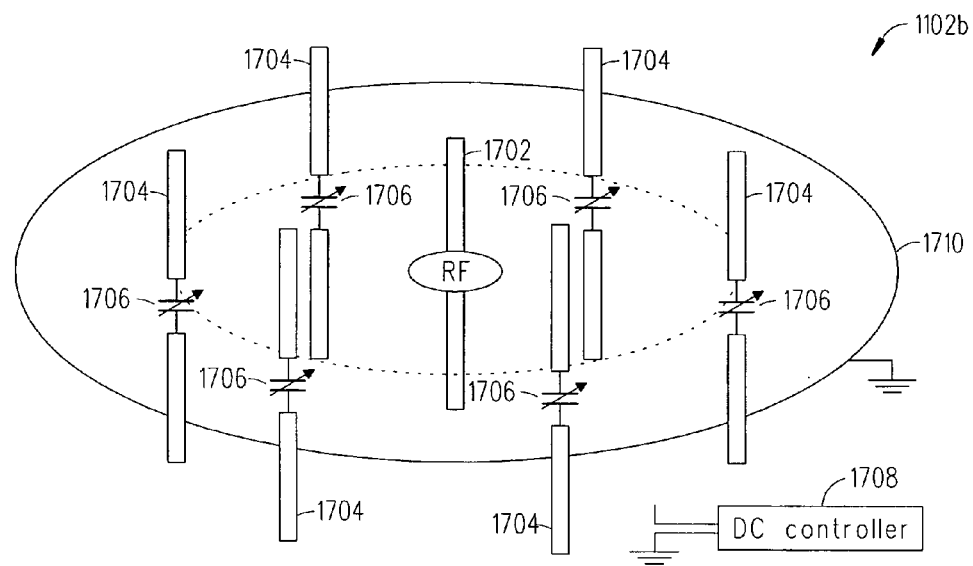
FIG. 17 is a perspective view that illustrates the basic components of a second embodiment of the array antenna shown in FIG. 11.

Referring to FIG. 17, there is a perspective view that illustrates the basic components of a second embodiment of the array antenna 1102b. The array antenna 1102b has a similar structure and functionality to array antenna 1102a except that the antenna elements 1702 and 1704 are configured as dipole elements instead of a monopole elements as shown in FIG. 12. The array antenna 1102b includes a radiating antenna element 1702 capable of transmitting and receiving radio signals and one or more parasitic antenna elements 1704 that are incapable of transmitting or receiving radio signals. Each parasitic antenna element 1704 (six shown) is located a predetermined distance away from the radiating antenna element 1702. A voltage-tunable capacitor 1706 (six shown) is connected to each parasitic element 1704. A controller 1708 is used to apply a predetermined DC voltage to each one of the voltage-tunable capacitors 1706 in order to change the capacitance of each voltage-tunable capacitor 1706 and thus enable one to control the directions of the maximum radiation beams and the minimum radiation beams (nulls) of a radio signal emitted from the array antenna 1102b. The controller 1708 may be part of or interface with the network controller 1114 (see FIG. 11).

In the particular embodiment shown in FIG. 17, the array antenna 1102b includes one radiating antenna element 1702 and six parasitic antenna elements 1704 all of which are configured as dipole elements. The antenna elements 1702 and 1704 are electrically insulated from a grounding plate 1710. The grounding plate 1710 has an area large enough to accommodate all of the antenna elements 1702 and 1704. In the preferred embodiment, each parasitic antenna element 1704 is located on a circumference of a predetermined circle around the radiating antenna element 1702. For example, the radiating antenna element 1702 and the parasitic antenna elements 1704 can be separated from one another by about 0.2λ0–0.5λ0 where λ0 is the working free space wavelength of the radio signal.

Figure 18:
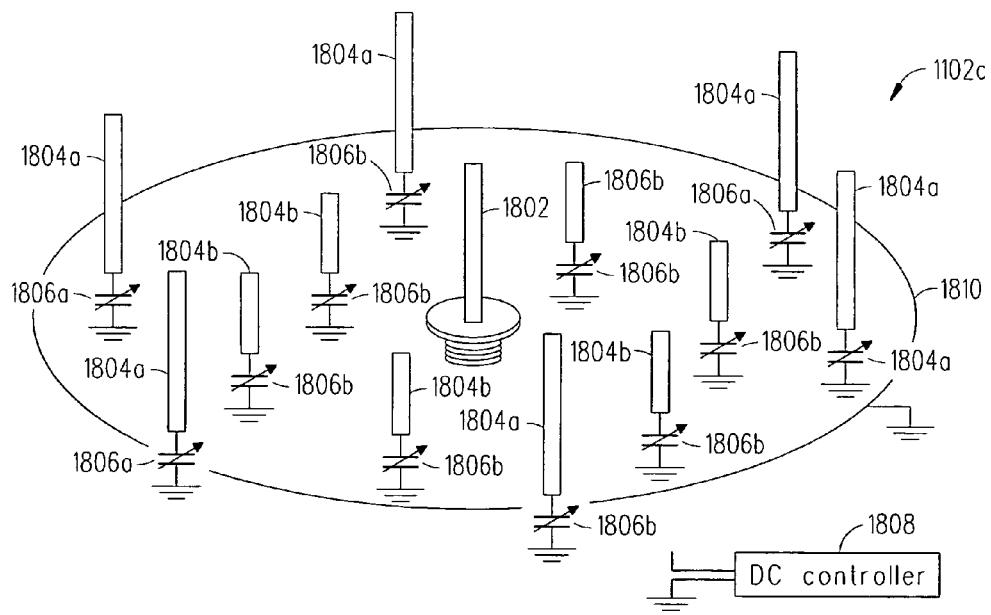
FIG. 18 is a perspective view that illustrates the basic components of a third embodiment of the array antenna shown in FIG. 11.

Referring to FIG. 18, there is a perspective view that illustrates the basic components of a third embodiment of the array antenna 1102c. The array antenna 1102c includes a radiating antenna element 1002 capable of transmitting and receiving dual band radio signals. The array antenna 1102c also includes one or more low frequency parasitic antenna elements 1804a (six shown) and one or more high frequency parasitic antenna elements 1804b (six shown). The parasitic antenna elements 1804a and 1804b are incapable of transmitting or receiving radio signals. Each of the parasitic antenna elements 1804a and 1804b are locate a predetermined distance away from the radiating antenna element 1802. As shown, the low frequency parasitic antenna elements 1804a are located on a circumference of a "large" circle around both the radiating antenna element 1802 and the high frequency parasitic antenna elements 1804b. And, the high frequency parasitic antenna elements 1804b are located on a circumference of a "small" circle around the radiating antenna element 1802. In this embodiment, the low frequency parasitic antenna elements 1804a are the same height as the radiating antenna element 1802. And, the high frequency parasitic antenna elements 1804b are shorter than the low frequency parasitic antenna elements 1804a and the radiating antenna element 1802.

The array antenna 1102c also includes one or more low frequency voltage-tunable capacitors 1806a (six shown) which are connected to each of the low frequency parasitic elements 1804a. In addition, the array antenna 1102c includes one or more high frequency voltage-tunable capacitors 1806b (six shown) which are connected to each of the high frequency parasitic elements 1804b. A controller 1008 is used to apply a predetermined DC voltage to each one of the voltage-tunable capacitors 1806a and 1806b in order to change the capacitance of each voltage-tunable capacitor 1806a and 1806b and thus enable one to control the directions of the maximum radiation beams and the minimum radiation beams (nulls) of a dual band radio signal that is emitted from the array antenna 1102c. The controller 1808 may be part of or interface with the network controller 1114 (see FIG. 11).

In the particular embodiment shown in FIG. 18, the array antenna 1102c includes one radiating antenna element 1802 and twelve parasitic antenna elements 1804a and 1804b all of which are configured as monopole elements. The antenna elements 1802, 1804a and 1804b are electrically insulated from a grounding plate 1810. The grounding plate 1810 has an area large enough to accommodate all of the antenna elements 1802, 1804a and 1804b. It should be understood that the low frequency parasitic antenna elements 1804a do not affect the high frequency parasitic antenna elements 1804b and vice versa.

The antenna array 1102c operates by exciting the radiating antenna element 1802 with the high and low radio frequency energy of a dual band radio signal. Thereafter, the low frequency radio energy of the dual band radio signal emitted from the radiating antenna element 1802 is received by the low frequency parasitic antenna elements 1804a which then re-radiate the low frequency radio frequency energy after it has been reflected and phase changed by the low frequency voltage-tunable capacitors 1806a. Likewise, the high frequency radio energy of the dual band radio signal emitted from the radiating antenna element 1802 is received by the high frequency parasitic antenna elements 1804b which then re-radiate the high frequency radio frequency energy after it has been reflected and phase changed by the high frequency voltage-tunable capacitors 1806b. The controller 1808 changes the phase of the radio frequency energy at each parasitic antenna element 1804a and 1804b by applying a predetermined DC voltage to each voltage-tunable capacitor 1806a and 1806b which changes the capacitance of each voltage-tunable capacitor 1806a and 1806b. This mutual coupling between the radiating antenna element 1802 and the parasitic antenna elements 1804a and 1804b enables one to steer the radiation beams and nulls of the dual band radio signal that is emitted from the antenna array 1102c. The array antenna 1102c configured as described above can be called a dual band, endfire, phased array antenna 1102c.

Although the array antennas described above have radiating antenna elements and parasitic antenna elements that are configured as either a monopole element or dipole element, it should be understood that these antenna elements can have different configurations. For instance, these antenna elements can be a planar microstrip antenna, a patch antenna, a ring antenna or a helix antenna.

In the above description, it should be understood that the features of the array antennas apply whether it is used for transmitting or receiving. For a passive array antenna the properties are the same for both the receive and transmit modes. Therefore, no confusion should result from a description that is made in terms of one or the other mode of operation and it is well understood by those skilled in the art that the invention is not limited to one or the other mode.

Following are some of the different advantages and features of the array antenna 1102 of the present invention:

The array antenna 1102 has a simple configuration.

The array antenna 1102 is relatively inexpensive.

The array antenna 1102 has a high RF power handling parameter of up to 20 W. In contrast, the traditional array antenna 200 has a RF power handling parameter that is less than 1 W.

The array antenna 1102 has a low linearity distortion represented by IP3 of upto +65 dBm. In contrast, the traditional array antenna 200 has a linearity distortion represented by IP3 of about +30 dBm.

The array antenna 1102 has a low voltage-tunable capacitor loss.

The dual band array antenna 1102c has two bands each of which works upto 20% of frequency. In particular, there are two center frequency points for the dual band antenna f0 each of which has a bandwidth of about 10%~20% [(f1+f2)/2=f0, Bandwidth=(f2−f1)/f0*100%] where f1 and f2 are the start and end frequency points for one frequency band. Whereas the single band antenna 1102a and 302b works in the f1 to f2 frequency range. The dual band antenna 1102c works in one f1 to f2 frequency range and another f1 to f2 frequency range. The two center frequency points are apart from each other, such as more than 10%. For example, 1.6 GHz~1.7 GHz and 2.4 GHz~2.5 GHz, etc. The traditional array antenna 200 cannot support a dual band radio signal.

Figure 19:
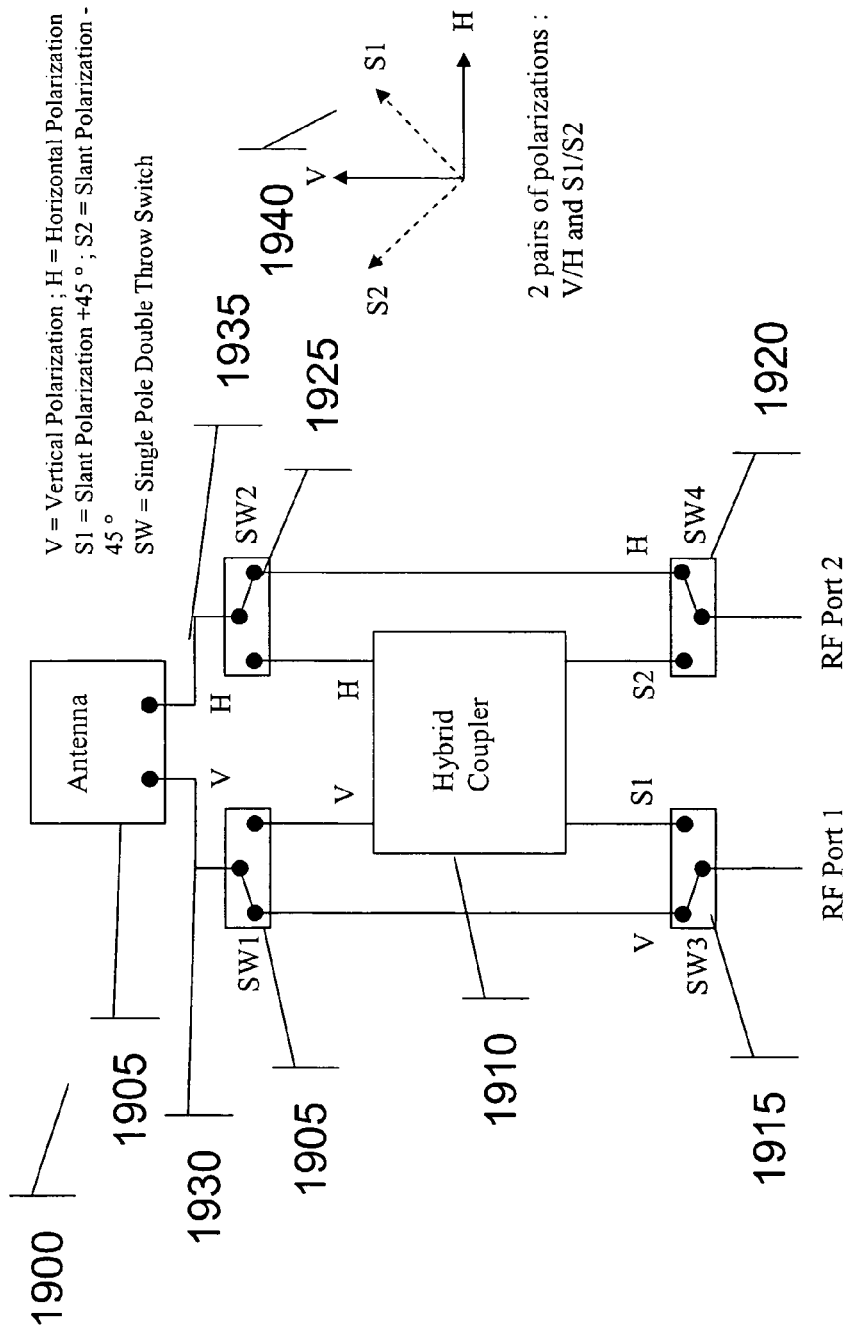
FIG. 19 is a block diagram of the switched polarization antenna that can be used in the RF ID tag system of the present invention.

As mentioned above and described in more detail below, the antennas of the present invention can have switchable polarizations to improve performance. As shown in FIG. 19 generally as 1900, the antenna 1905 provides two RF signals 1930 and 1935, one with Vertical polarization 1930 and one with Horizontal polarization 1935. Each RF signal will then pass through a single pole double throw switch. Vertically polarized signal 1930 will pass through single pole double throw switch SW1, 1905, and horizontally polarized signal 1935 will pass through single pole double throw switch SW2, 1925.

For both single pole double throw switches SW1, 1905, and SW2, 1925, one position of the switches outputs the signal unchanged, i.e., with the same polarization, and the other position will pass the signal through the hybrid coupler 1910. The function of hybrid coupler 1910 is to convert vertical/horizontal polarizations into two slant polarizations at +45° and −45° as shown at 1940.

Switches SW3, 1915, and SW4, 1920, select the desired set of polarizations, namely Vertical/Horizontal or +45° and −45° slant. This polarization diversity provided by antenna 1905 will greatly enhance the performance of the present RFID system, especially in presence of multi-path fading.

Not meant to be exhaustive or exclusive, the following table shows some of the specific different frequency bands used in this embodiment of the present invention.

| Frequency band | Applications |
| --- | --- |
| 868–870 MHz. | SRD (Short Range Devices, RFID) in CEPT countries Most devices use 869 MHz for RFID up to 500 mW |
| 902–928 MHz | ISM and RFID applications in Region 2 covers North America, most devices use 915 MHz for RFID 4 W in North America/Canada |
| 918–926 MHz | RFID in Australia. Most devices use 923 MHz |
| 950–956 MHz | RFID in Japan, just allocated |

With any of the aforementioned embodiments, because of the unique capabilities of the RF ID tag readers and RF ID tags with the novel scanning, stearable and array antennas provided herein, position information can be readily obtained. This is accomplished with the present invention by associating at least one RF ID tag with anything where position information or tracking information is desired from, such as any object, person or thing. Then communication is established between at least one RF ID tag reader and said at least one RF ID tag. In a first embodiment, at least one RF ID tag reader includes at least two electronically steerable scanning antennas.

At this point one can determine the location of said at least one RF ID tag relative to said at least one RF ID tag reader by triangulating the angular information between said at least one RF ID tag and said at least two electronically steerable scanning antennas associated with said at least one RF ID tag reader.

Improved accuracy of the position information can be obtained by determining the signal strength of the communication between said at least one RF ID tag and said at least one RF ID tag reader. Also, improved accuracy is provided by determining the time of flight of RF signals between said at least one RF ID tag and said at least one RF ID tag reader to improve accuracy of said position information.

In a second embodiment multiple RF tag readers are used instead of multiple antennas with at least one RF ID tag reader. Hence, the position of an object, person or thing, is determined by associating at least one RF ID tag with said object, person or thing and establishing communication between at least two RF ID tag readers and said at least one RF ID tag, said at least two RF ID tag readers including at least one electronically steerable scanning antenna. Then the location of said at least one RF ID tag relative to said at least two RF ID tag readers is determined by triangulating the angular information between said at least one RF ID tag and said at least two RF ID tag reader using said at least one electronically steerable scanning antennas.

As above, the accuracy can be improved by determining the signal strength of the communication between said at least one RF ID tag and said at least two RF ID tag readers and/or by determining the time of flight of RF signals between said at least one RF ID tag and said at least two RF ID tag readers to improve accuracy of said position information.

The aforementioned method of determining the position of an object, person or thing is accomplished by the following system, wherein at least one RF ID tag is associated with said object, person or thing and at least one RF ID tag reader establishes communication with said at least one RF ID tag. The at least one RF ID tag reader includes at least two electronically steerable scanning antennas and determines the relative location of said at least one RF ID tag by triangulating the angular information between said at least one RF ID tag and said at least two electronically steerable scanning antennas which are associated with said at least one RF ID tag reader.

Again, the accuracy can be improved by including in the system a means for determining the signal strength of the communication between said at least one RF ID tag and said at least one RF ID tag reader. There are a number of methods known to enable this signal strength determination and well known to those of ordinary skill in the art and thus is not elaborated on herein.

Further, the accuracy can be improved by providing a means for determining the time of flight of RF signals between said at least one RF ID tag and said at least one RF ID tag reader.

The system can include multiple antennas with at least one RF ID card reader as above or can include multiple RF ID tag readers associated with at least one electronically steerable scanning antenna as set forth below, wherein the object, person or thing position determination system comprises at least one RF ID tag associated with said object, person or thing and in the embodiment at least two RF ID tag readers which establish communication with said at least one RF ID tag. The at least two RF ID tag readers include at least one electronically steerable scanning antenna.

The at least two RF ID tag readers determine the relative location of said at least one RF ID tag by triangulating the angular information between said at least one RF ID tag and said at least one electronically steerable scanning antennas associated with said at least two RF ID tag readers.

With the at least two RF ID tag reader embodiment, accuracy can be improved by providing a means for determining the signal strength of the communication between said at least one RF ID tag and said at least two RF ID tag readers to improve accuracy of said position information. It can be further improved by providing a means for determining the time of flight of RF signals between said at least one RF ID tag and said at least two RF ID tag readers to improve accuracy of said position information.

An antenna system with high intensity and a narrow beam in its near-field region may deliver more electromagnetic energy to the tag and may improve the probability of a successful reading. Furthermore, when an antenna system such as described above is capable of dynamically steering such high intensity, narrow beam in the near field and focusing the beam at different points within a pallet, further improvement can be achieved. This solution can also be applied to reading tags on cartons moving on a conveyer belt.

Figure 20:
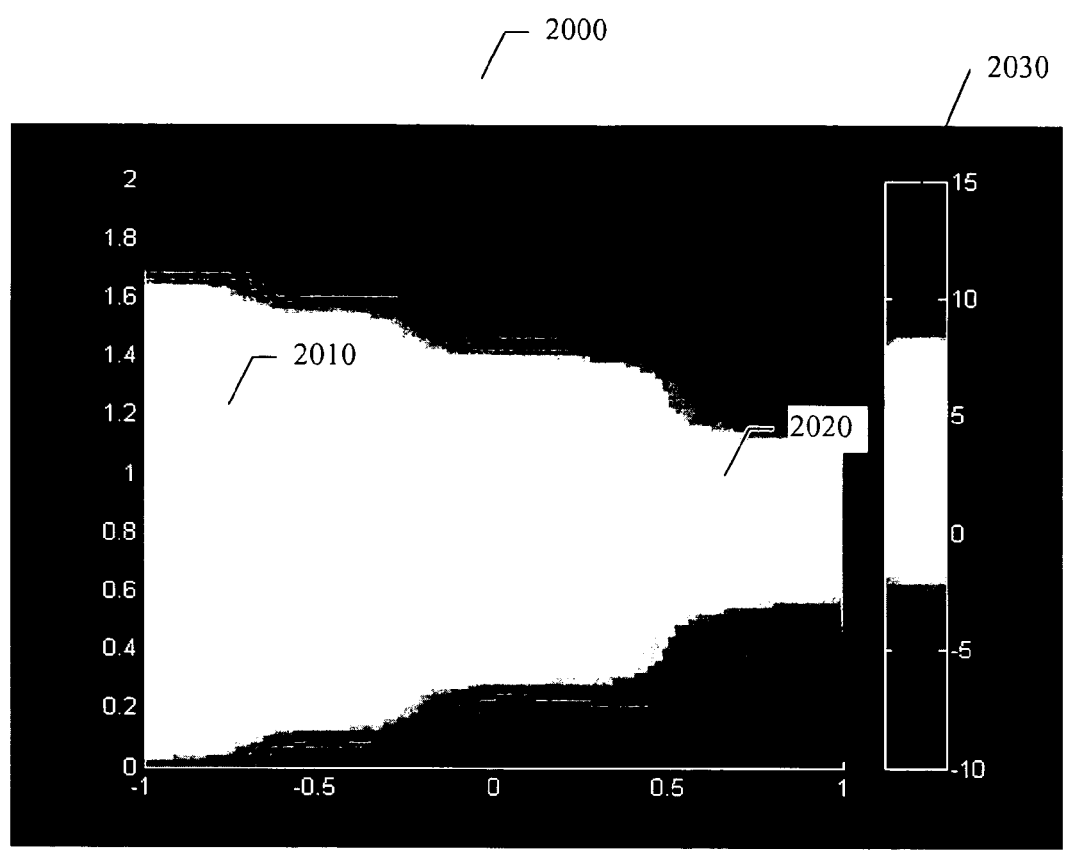
FIG. 20 illustrates the far field of a 10-element phased array.
Figure 21:
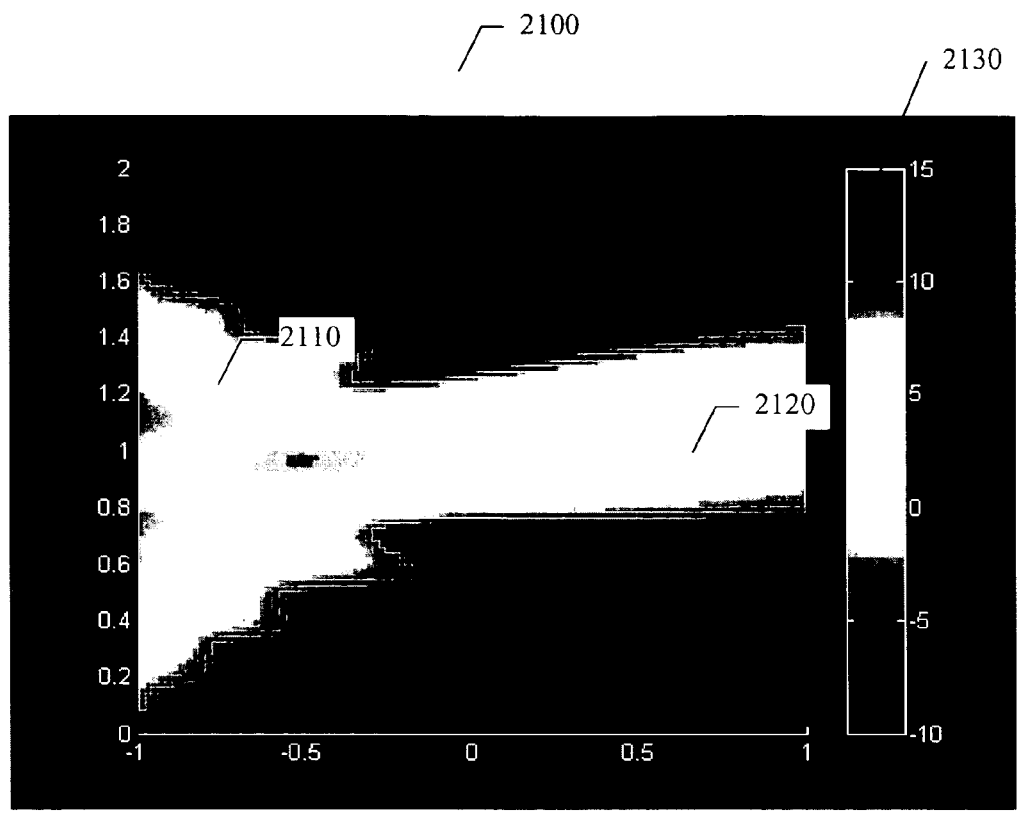
FIG. 21 illustrates the near field of a 10-element phased array.

FIG. 20 at 2000 illustrates the fields generated by a 10-element phased array focused in its far field. The bright area 2010 and 2020 represent the highest field intensity, and the darker area corresponds to the lowest intensity. 2030 represents the intensity scale. By appropriate adjustment of the phase of each antenna element, the antenna beam 2110 can be formed in such a way that the majority of the electromagnetic energy may be concentrated in the near field of the antenna, as shown in FIG. 2 at 2100. The high intensity-narrow beam 2120 is capable of penetrating deeper into products that contain liquids and activating an RFID tag. 2130 represents the intensity scale. This antenna system allows the beam to scan, not only in the plane perpendicular to the direction of propagation, but also at different distances (in the axial direction) from the antenna. This may be accomplished by applying different phases to the elements of the phased array.

In order to increase the reading capability even further, the aforementioned active scanning antenna may be used with power amplifier. A power amplifier may be placed at the input port of the transmit antenna, or multiple power amplifiers may be placed before each antenna element. In either embodiment, the electromagnetic energy delivered to the tags will be increased by the amount of power amplifier gain, and hence more difficult tags may be read.

Figure 22:
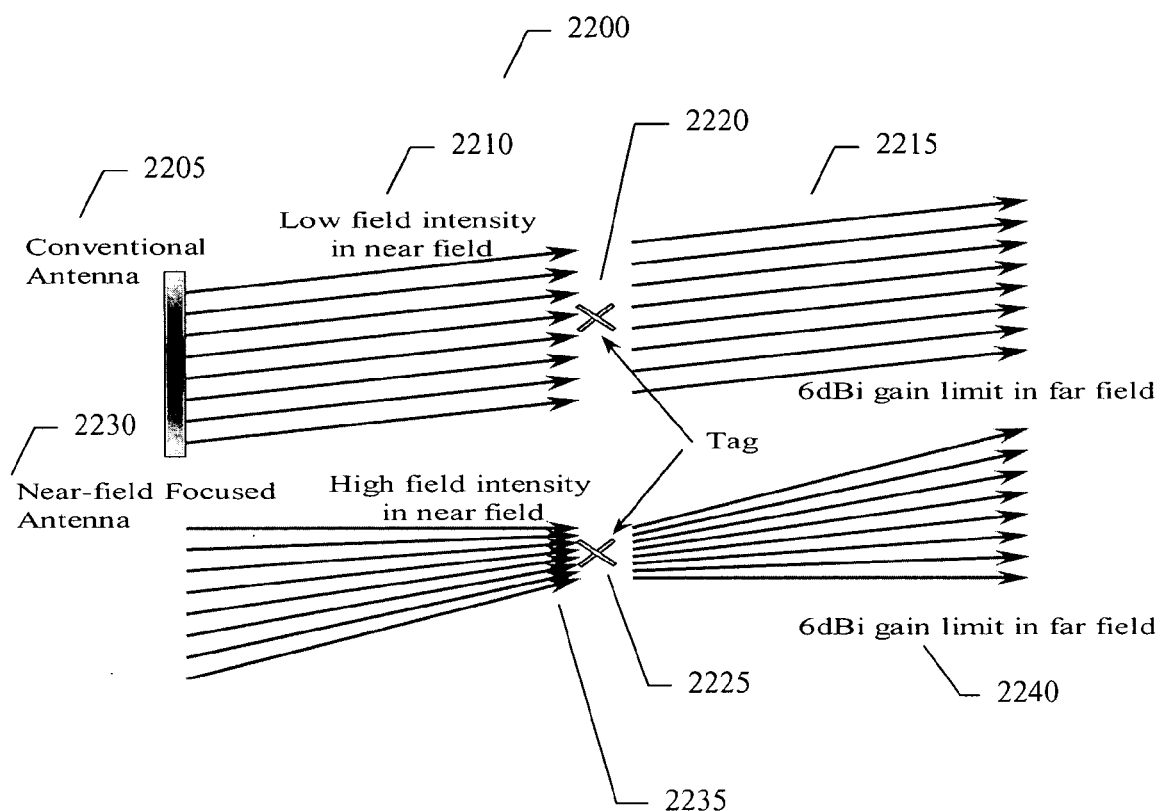
FIG. 22 depicts a near field focused scanning antenna array as compared to a conventional antenna.

Turning now to FIG. 22, at 2200 illustrates how the electromagnetic energy, in a near-field focused antenna 2230, will be concentrated near the antenna (near field) 2235, and in the far field 2240 it will be reduced considerably. The tag 2225 in this embodiment is shown in the near field, thus enabling more energy at the tag 2225. This assists in the compliance with FCC regulations, where normally the concern may be to limit the electromagnetic radiations in the environment. Even though in the near field 2235 the electromagnetic field intensity is high, because it is confined within a limited space it is more controlled and less harmful. This is in contrast to a conventional antenna 2205 with low field intensity in the near field 2210 near tag 2220, which is similar to the intensity level in the far field 2215.

Figure 23:
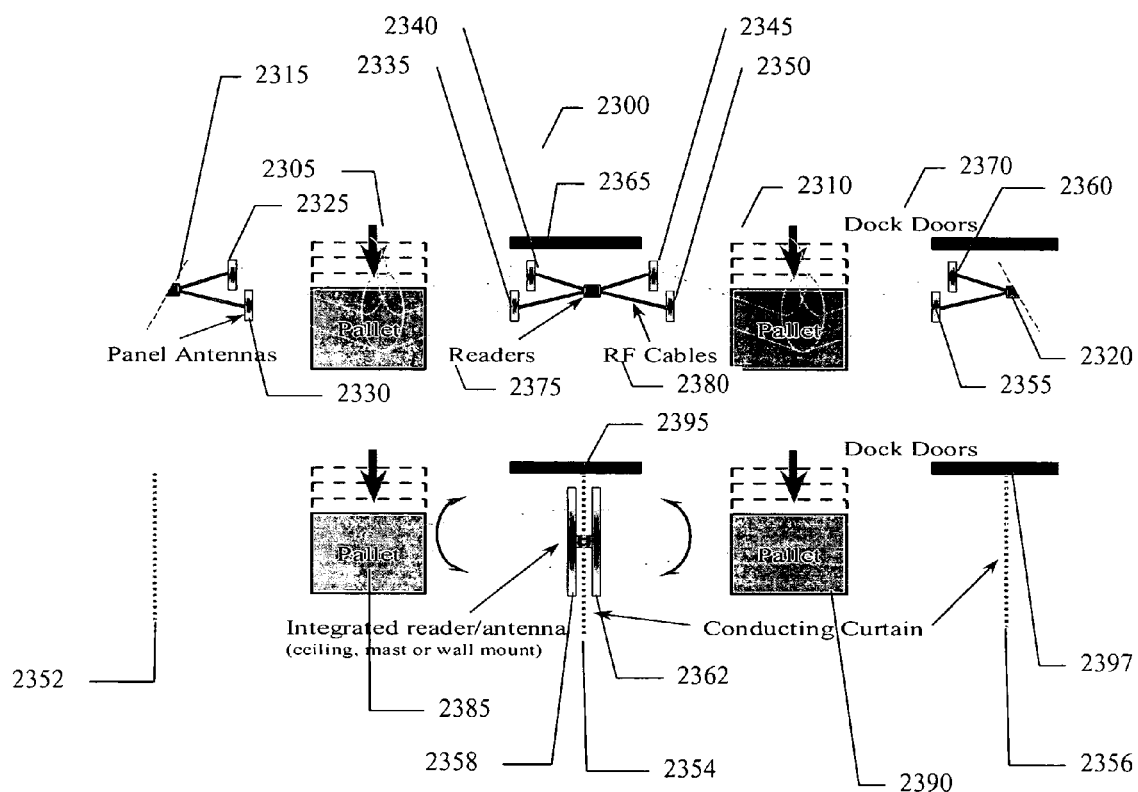
FIG. 23 illustrates an improved portal using near field-focused antenna and conducting curtain of an embodiment of the present invention.

As shown in FIG. 23, at 2300, in another embodiment of the present invention, by placing reflective curtains 2352, 2354 and 2356 in the opposite wall or other places in a portal area, such as near dock doors 2395 and 2397 (although a portal area with dock doors 2395 and 2397 is used in an embodiment of the present invention, it is meant merely as an illustrative example and it is understood that a wide variety of environments can benefit from the use of conducting curtains), a controlled multi-path effect can be created which may further improve the capability of reading tags placed on the far side of the pallet from the antenna. This will allow one antenna to read all the tags in entire pallets 2385 and 2390 (although it is understood that the present invention is not limited to use in pallets). In addition, the use of reflective curtains may reduce further the radiations outside the portal area. An integrated reader/antenna 2358 and 2362 may be associated with curtain 2354 in an embodiment of the present invention (although the present invention is not limited in this respect).

Another embodiment of the present invention is shown without the use of conducting curtains 2352, 2354 and 2356, thereby needing more antennas such as panel antennas 2325, 2330, 2335, 2340, 2345, 2350, 2355 and 2360. The panel antennas 2325, 2330, 2335, 2340, 2345, 2350, 2355 and 2360 are associated (in one embodiment associated by the use of cables 2315, 2380, although the present invention is not limited to cables to associate readers with antennas) with readers 2375 and 2320 and may read inventory information from pallets 2310 and 2305 which may have entered through dock doors 2365 and 2370. It can be readily seen that adding reflective curtains may greatly reduce the number of antennas and readers, such as one reader per dock vs. 4 antennas, 1 reader and 4 RF cables per dock (lower total cost). Further, because of part count reduction may have less probability of damage. The use of diverging beams in the far-field will allow the reader/antenna to meet FCC requirements while still providing much higher field strength at a pallet and reduced multipath interference (tag contention) and nulls.

Still further, a near field focused receive beam may be less sensitive to far-field interference.

As mentioned above, although one embodiment of the present invention has been illustrated for a portal application, all types of RFID environments could potentially use the elements of near field focus and installation such as, but not limited to, conveyor belts, fork lifts, smart shelf etc. Also the invention applies not only to a scanning antenna array but any antenna that can create a near-field/far field described above.

Further, as described in more detail above, due to the angular diversity present and the ability of the antenna to track the pallet using multiple sweeps and having the information based on the angle of incidence, additional information on tag location and further improvements in read will be possible.

Figure 24:
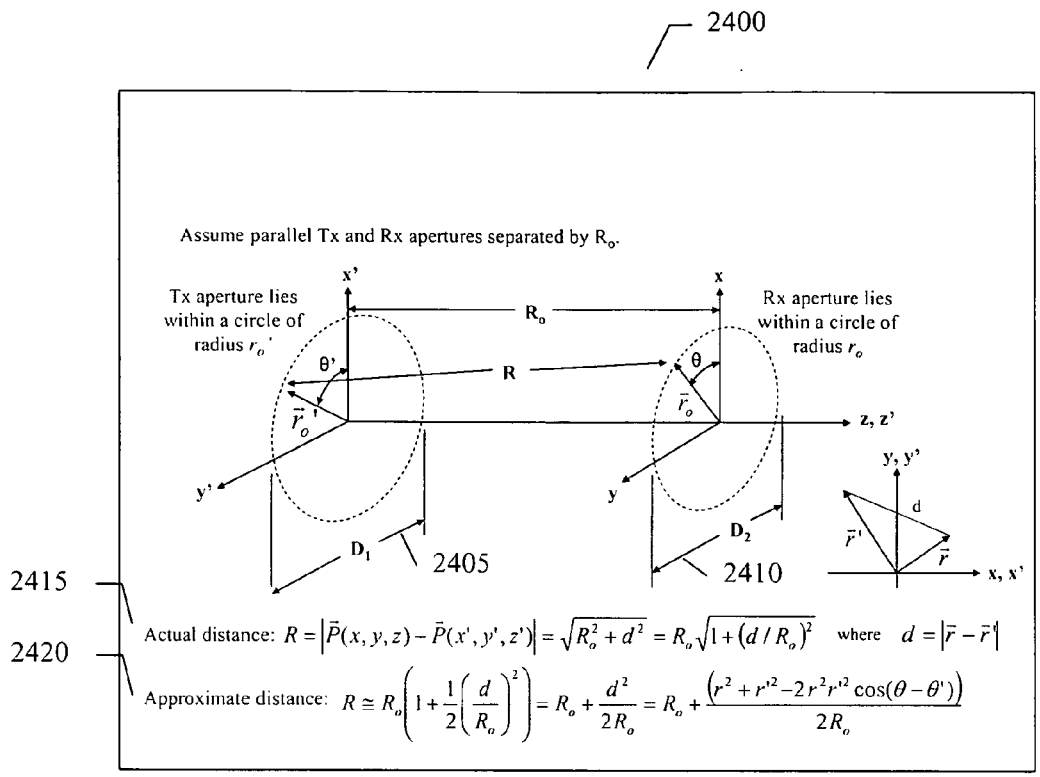
FIG. 24 illustrates the geometry for understanding the near-field gain of aperture antennas.

Turning now to FIG. 24, shown generally at 2400 is an illustration of the geometry for near-field gain of aperture antennas. Consider a planar radiating aperture that lies in the x'y' plane, and that is circumscribed by a circle of radius D1 2405. The radiated fields are evaluated in a planar receiving aperture of diameter D2 2410 which is located parallel to the radiating aperture and separated by a distance of Ro. The exact distance 2415 between source point P(x',y',z') and observation point P(x,y,z) is Ro*sqrt(1+(d/Ro)^2) where d is the cylindrical distance between source and observation points if the xy plane is collapsed onto the x'y' plane. The square root function for R can be expanded in an infinite Binomial series which can be approximated 2420 accurately with only two terms if (d/Ro) is sufficiently small. The term d^2/(2Ro) in the Binomial approximation is the quadratic phase term in the radiation integral. This term defines the Fresnel region because it causes significant phase deviations for the radiated field.

Figure 24A:
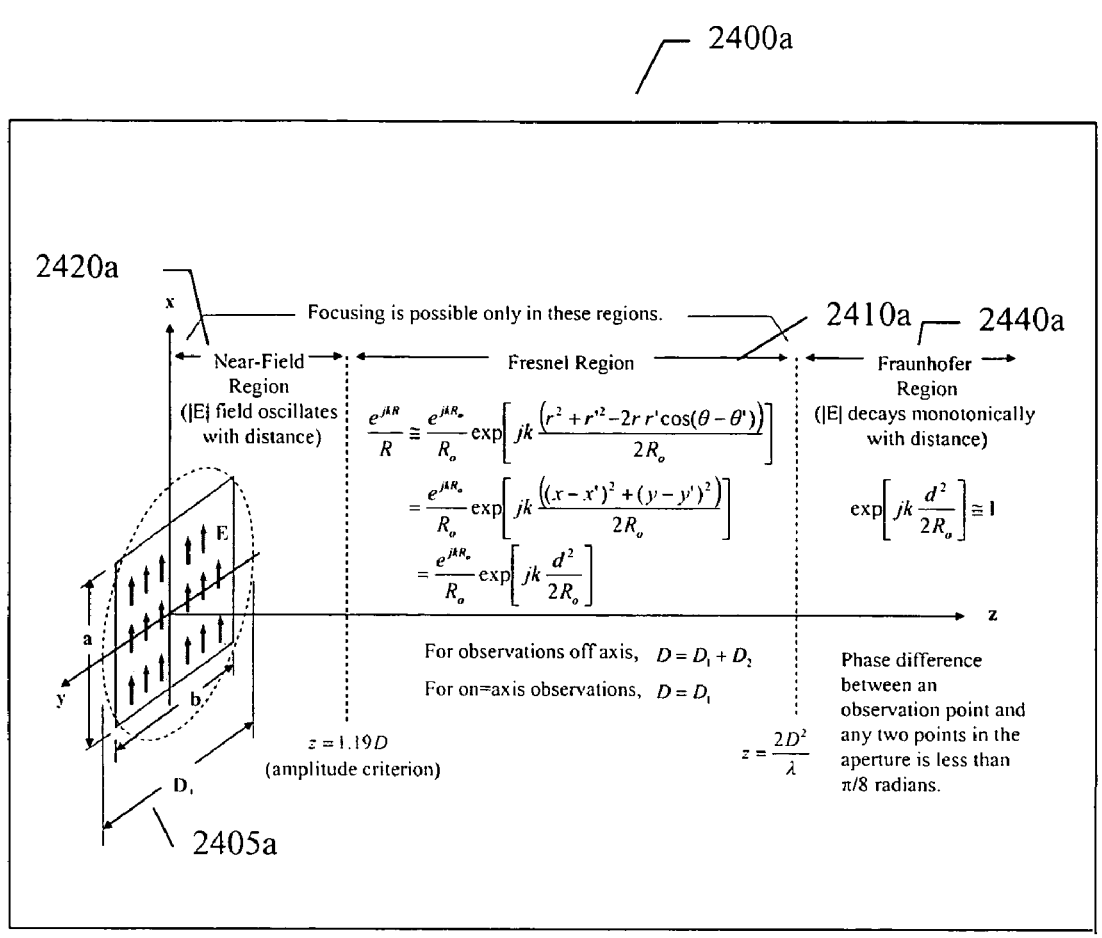
FIG. 24a shows the definition of Fresnel region boundaries for the near-field gain of aperture antennas of an embodiment of the present invention.

FIG. 24a at 2400a shows the definition of Fresnel region boundaries for the near-field gain of aperture antennas of an embodiment of the present invention and illustrates the three classic radiation regions 2410a, 2420a, and 2440a in front of an aperture. In the near field 2420a, the magnitude of the radiated field oscillates rapidly with distance R. In the Fresnel region 2410a, the quadratic phase term exp(jk(d^2/(2Ro))) causes significant phase deviations with lateral distances in x and y. In the Fraunhofer (far-field) region 2440a, this quadratic phase term asymptotically approaches unity and becomes a non-factor in the radiation integral. The boundary between the Fresnel 2410a and Fraunhofer 2440a regions is classically defined as 2D^2/lambda where D 2405a is defined as D1+D2, and lambda is the free space wavelength.

Figure 24B:
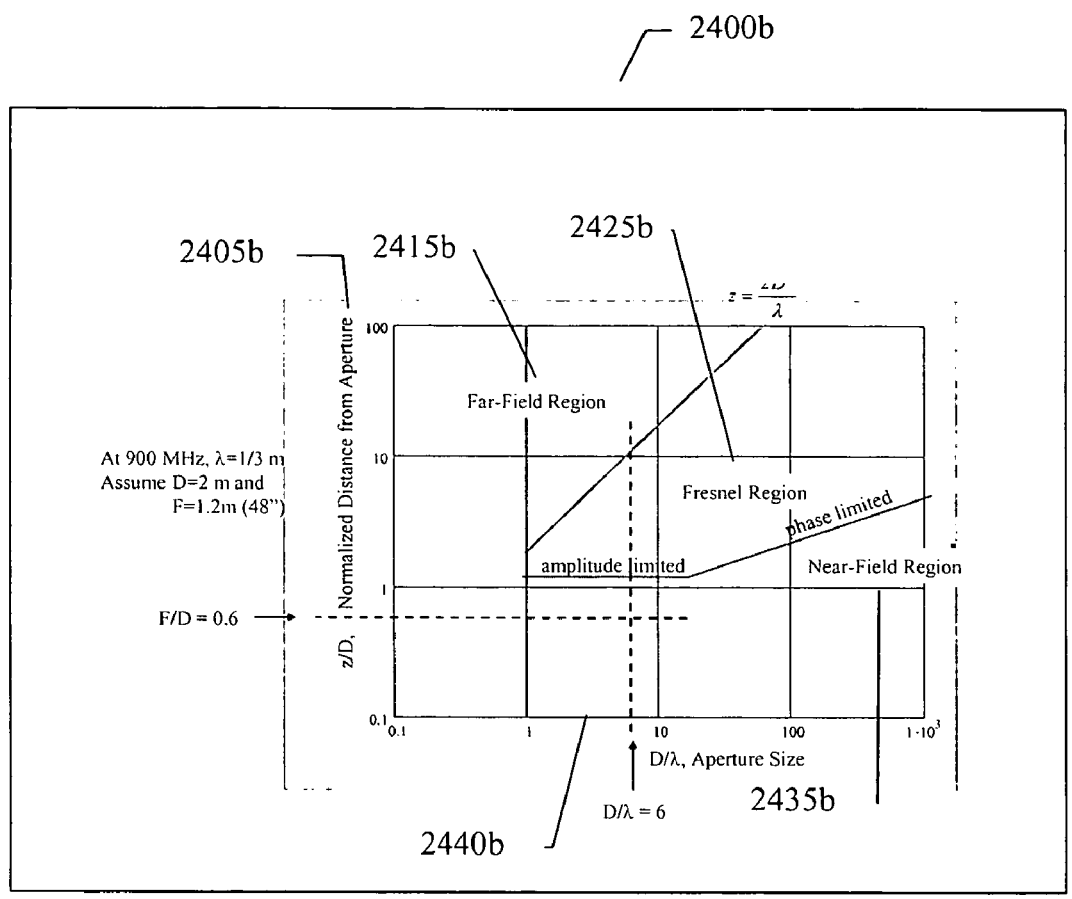
FIG. 24b shows the actual Fresnel region boundaries for the near-field gain of aperture antennas of an embodiment of the present invention.

FIG. 24b shows at 2400b illustrates the Fresnel region boundaries for the near-field gain of aperture antennas of an embodiment of the present invention and more specifically shows boundaries between near-field 2435b, Fresnel 2425b, and far-field regions 2415b. The horizontal axis 2440b is the aperture size D normalized in wavelengths. The vertical axis 2405b is the observation distance from the aperture along the z axis, normalized by the aperture size. For the 900 MHz NFA, the focus F is found inside the near field region, and the linear array has an aperture size about 6 wavelengths in length 2440b. When the term "near-field" is used in general in to describe the inventions shown here, we intend this term to address antenna systems that focus energy in both the formally defined near-field region as well as the Fresnel region.

In the log plot of FIG. 24b it may be apparent that the boundary of the Fresnel and far-field regions is a strong function of aperture size: 2D^2/lambda. Since focusing may possibly be only in the Fresnel 2425b and near-field 2435b regions, then it is clear that the focal region can be expanded by increasing the aperture size D. Furthermore, the aperture size may, although not limited in this respect, be sufficiently large to allow the near field 2435b and Fresnel 2425b regions to encompass the region of space where RFID tags are expected to be found. Thus, for a near field focusing array, the near field antenna (NFA) should have an aperture dimension of D>Sqrt(R*lambda/2) where R is the maximum read range anticipated. This is a conservative estimate for D, and in practice the NFA may often be 2 to 4 times as large, although the present invention is not limited in this respect.

Figure 25:
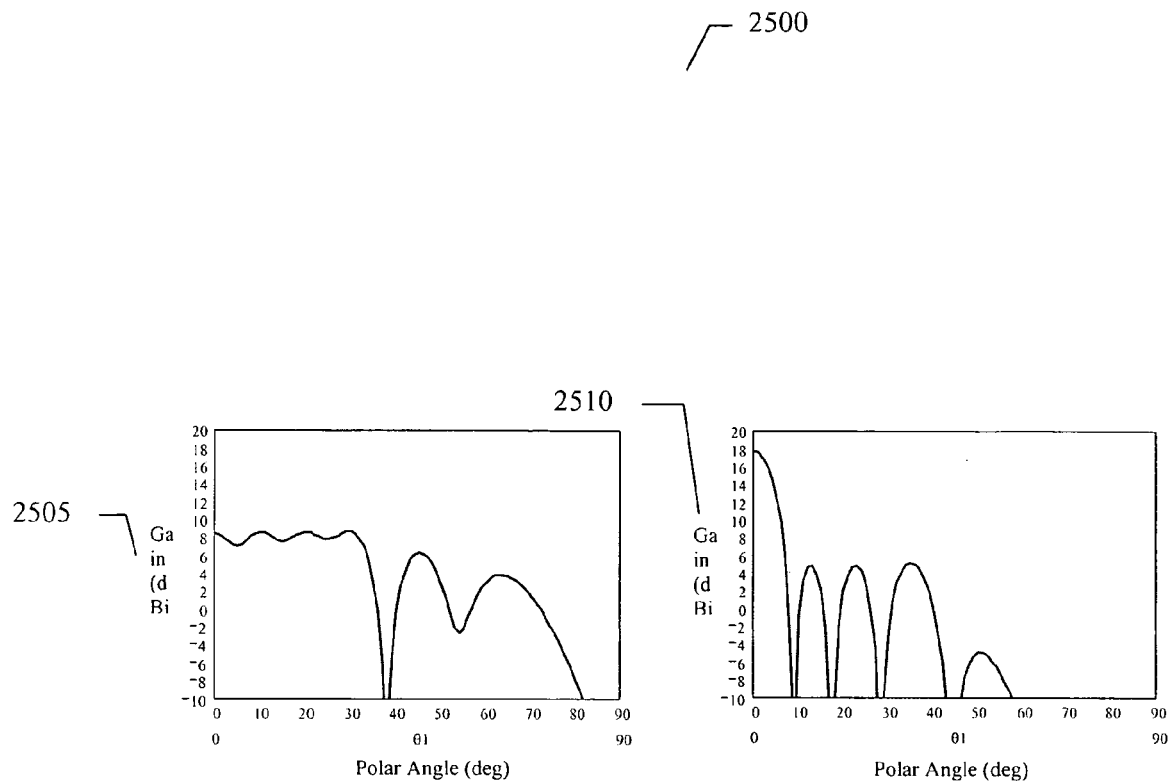
FIG. 25 graphically depicts a comparison of Far Field Gain for a near field antenna array vs. a conventional array.

Turning now to FIG. 25 is graphically depicted at 2500 a comparison of Far Field Gain with a near field antenna vs. a conventional array. One difficulty with increasing the percentage of read/write operations of passive RFID tags may be that given a fixed amount of RF power, it must be sufficiently and efficiently directed to the region of the tags in space with effective cost so as to induce voltages greater than the threshold of the semi-conductor chips in the tags, especially in adverse electromagnetic environments. Conventional antennas, however, are usually designed to efficiently radiate RF energy in pre-determined angular directions in the far-fields of the antennas, where the power density varies directly with the inverse of the square of the far-field distance. An analogy to this case is a candle being placed at the center of an imaginary large sphere whose radius r is increasing indefinitely. The intensity of luminance of the surface of the sphere decreases rapidly with the far-field distance r. Typically in the far field, a high percentage of tags is not expected to be activated by the low RF power density there, unless the input RF power is increased, in which case the field strength in the far field is limited by the FCC standards. Even with maximum input power that corresponds to the FCC far-field limit, the far field energy density is still typically low for RFID purposes because of the path loss due to the inverse of the square of distance.

Thus, one embodiment of the present invention provides a near-field antenna that may be designed to focus RF energy to the near-field region. The near-field antenna may be placed so that the tags are illuminated within the near-field region of the antenna, where the power density does not depend on the inverse of the square of the distance.

The simulated far fields are compared for two linear 8-element arrays that have a uniform amplitude excitation. Again, at 2505, the far-field pattern for the present invention is a focused near-field antenna, and at 2510 is the far-field pattern of the same array but without focusing. In other words, the pattern at 2510 may be for a conventional array with a uniform phase distribution. The near-field antenna may achieve a lower peak gain of about 9 dBi, whereas the conventional array shows a peak gain of about 18 dBi, which is typical for an 8-element array. The near-field antenna may be focused at about 48 inches along its boresight, the result being a significant reduction in the far fields by about 9 dBi in this case. Both linear arrays whose gain patterns are shown in the depiction shown as 2600 have identical antenna elements and the same non-uniform spacing between elements.

Figure 26:
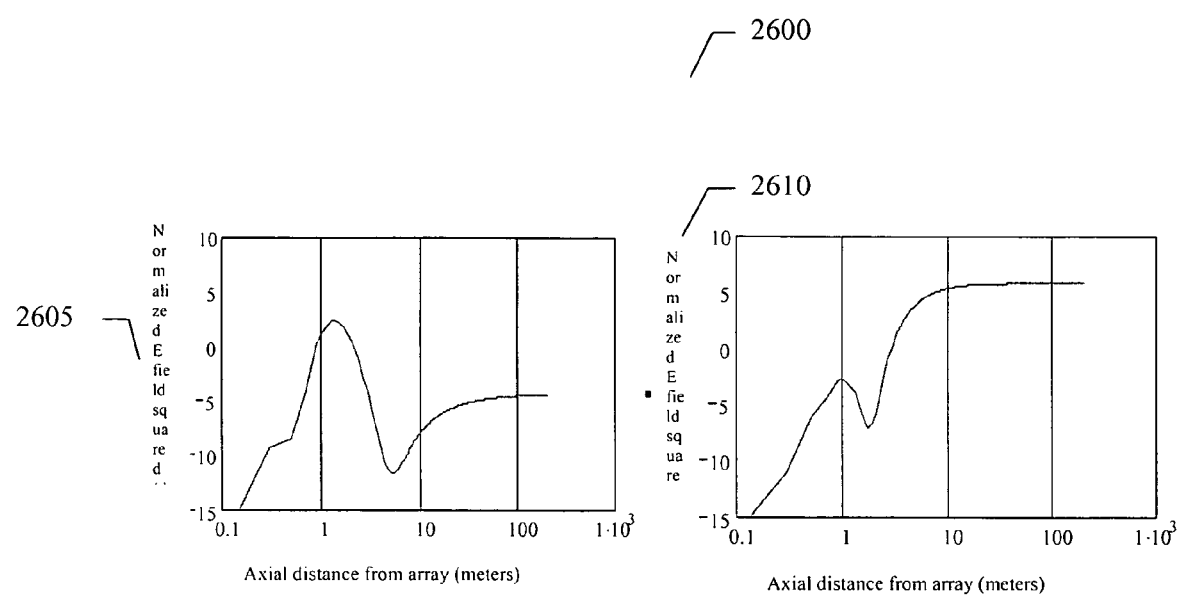
FIG. 26 graphically depicts a comparison of Near E-Field Intensity for a near field antenna array vs. a conventional array.

FIG. 26 graphically depicts at 2600 a comparison of Near E-Field Intensity with a near field antenna vs. a conventional array. In addition to the benefit of far-field power reduction by the near-field antenna on one embodiment of the present invention, another benefit may be the elevation of near-field intensity. Presently, Applicant is not aware of any antennas that offer both of these benefits that are essential for RFID applications. At 2600, the near fields are compared between a near-field antenna array of the present invention 2605 and a conventional array 2610. The electric field intensity is plotted, expressed in dB and normalized by multiplying by the axial distance. This normalized quantity reveals that the relatively high near-field strength of the near-field antenna at 48 inches relative to that of the conventional array at the same distance. The relative difference is 5 dB approximately, which is significant for RFID applications.

Figure 27:
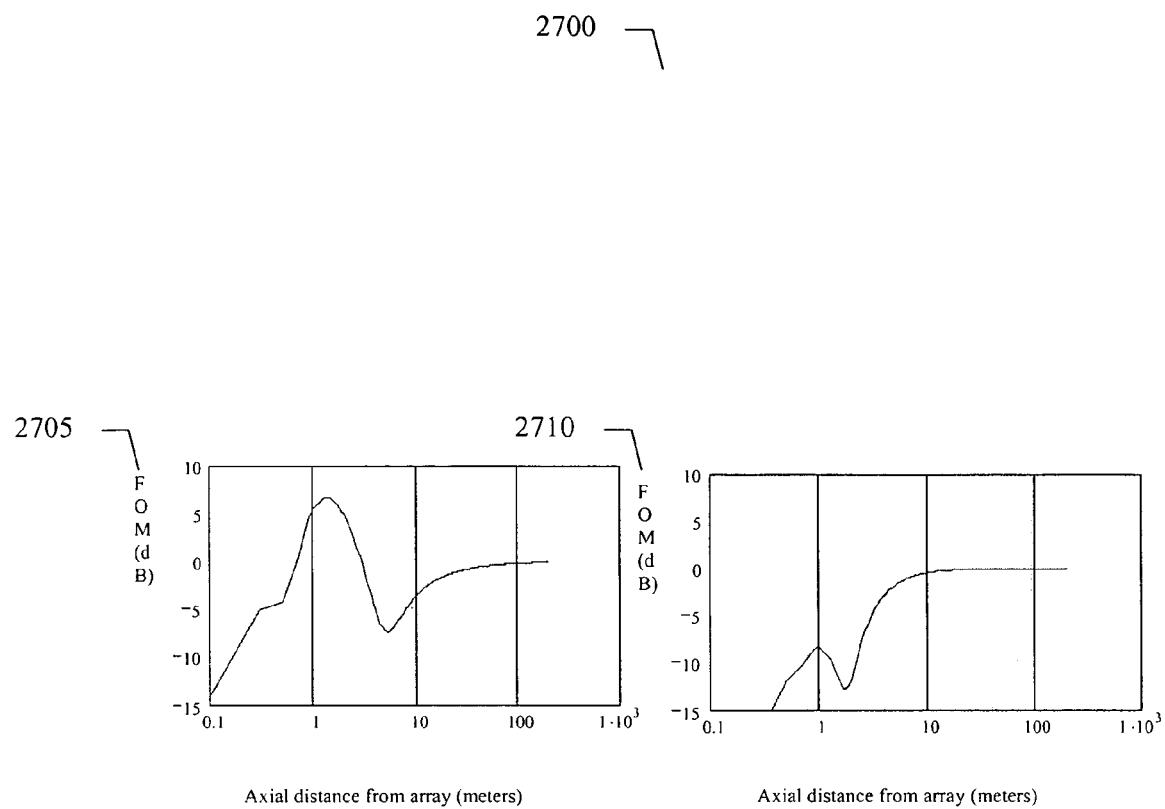
FIG. 27 graphically depicts the near field to far field directivity ratio of a near-field antenna array versus a conventional array.

FIG. 27 at 2700 graphically depicts the near field to far field directivity ratio. A near-field to far-field (NF/FF) figure of merit (FOM) may be defined to describe the ability of an antenna to focus power in the near field and also to reduce power in the far field. For the boresight direction, it is the electric field multiplied by the axial distance, divided by the this same normalized quantity in the far field, expressed in dB. The normalized electric field in the far field is simply the actual electric field multiplied by the far field distance. This FOM describes the ratio of near-field to far-field intensities and shows this FOM for the near-field focused array of the present invention 2705 and the non-focused conventional array 2710. As the axial distance tends to infinity, the FOM tends to 0 dB for both arrays. In an embodiment of the present invention, the 8-element non-uniformly spaced array, has a predicted FOM which peaks at about 7 dB, whereas the unfocused conventional array shows a peak at about −8 dB. The relative difference of about 15 dB is significant for RFID applications. Further, the present invention, although is not required to do so, may be able to achieve as high as 17 dB for this FOM.

A direct consequence of the present invention's near-field focusing for RFID applications is that it may provide a means of compliance with the FCC far-field limit. This limit is specified in FCC's document section 15.247, titled 'Operations within the bands 902–928 MHz, 2400–2483.5 MHz, and 5725–5850 MHz'. By appropriately focusing to a near-field region, the conventional antenna that does not comply may be converted into its near-field counterpart that complies. As shown in FIG. 25, about 10 dB of far-field reduction is available for compliance purposes. Energy would have been wasted had 10 dB resistive attenuators, as in prior art systems, been used to dissipate input power as a means for compliance in the far-field.

In the likely scenario that the near-field focusing technique reduces the far fields to below FCC limits, amplifiers may be used in the array to compensate for the difference—although the present invention does not require them to be used. Such power adjustment by amplification to match the FCC limit provides maximum power level in the focused region for RFID applications. For example, assuming that the conventional array 2710 exactly matches the FCC limit in the far field, the graph of the near-field antenna 2705 may thus be shifted upward by about 10 dB via application of amplifiers so that the near field power further benefits from the far-field power matching.

Figure 28:
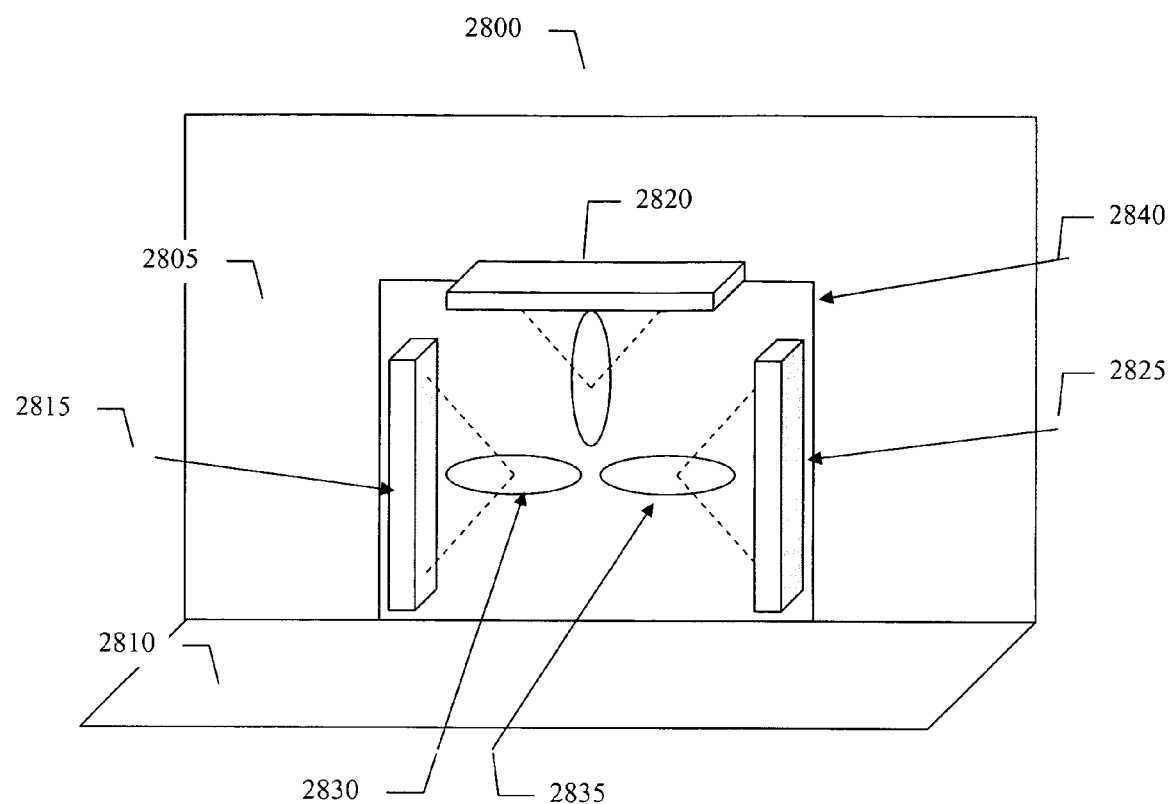
FIG. 28 illustrates a portal configuration option using a near field antenna of one embodiment of the present invention.

Turning now to FIG. 28 is illustrated at 2800 a portal configuration option using a near field antenna of one embodiment of the present invention. As just one of many potential embodiments of the present invention the portal configuration of FIG. 28 provides three near field antennas 2815, 2820 and 2825—although it is understood that any number of antennas may be used and understood to be within the scope of the present invention. The near field antennas may be placed in the perimeter of portal (doorway in this case—it should be understood that any portal is intended to be within the scope of the present invention) 2840. The portal 2840 may be associated with floor 2810 and wall 2805. Although not limited in this respect, the ability to provide near field focus is illustrated at 2830 and 2835. This portal is not limited to a fixed location, but may be part of a transportation system such as the rear doorway of a tractor trailer or a delivery van.

Figure 29:
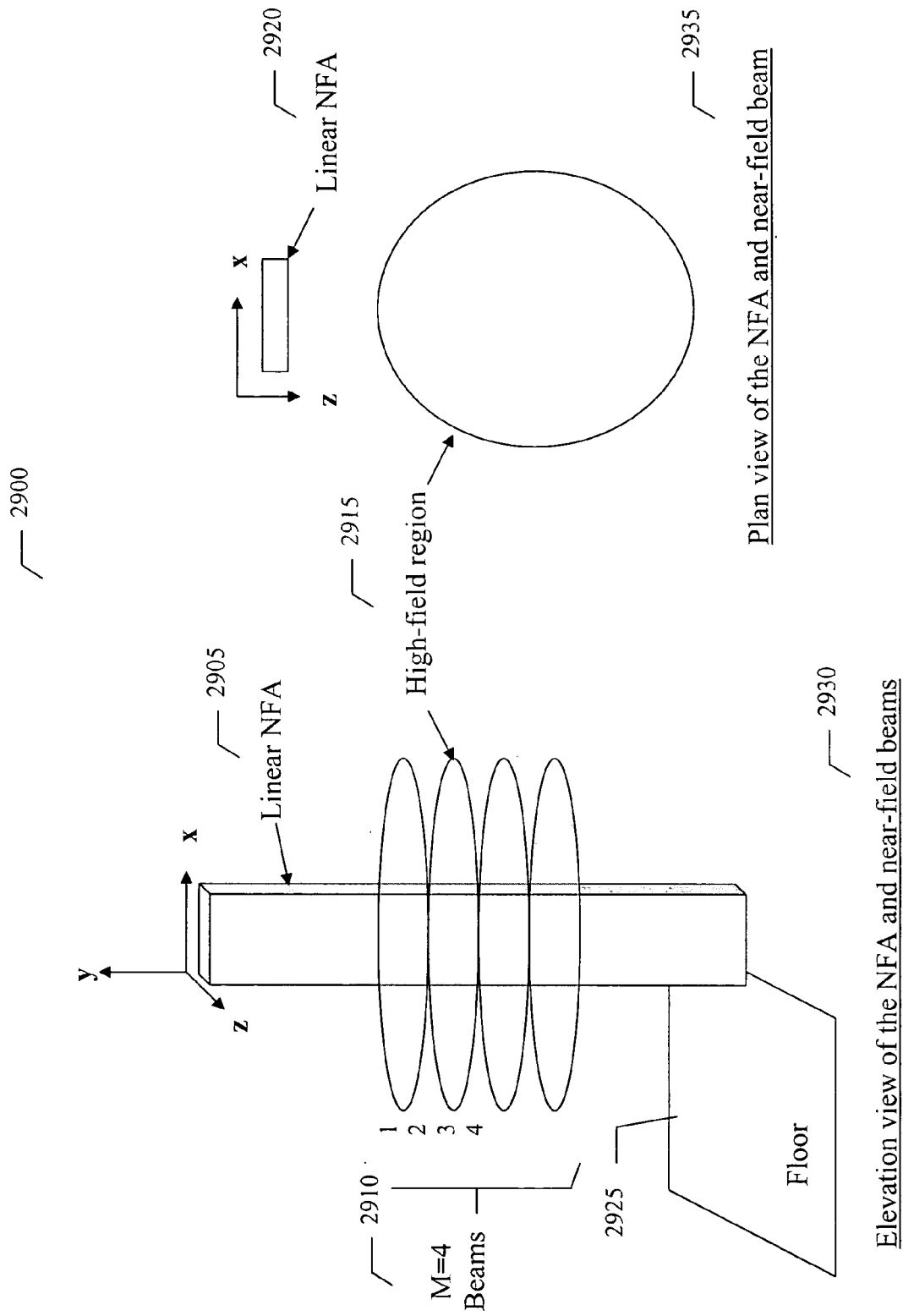
FIG. 29 illustrates beam patterns for a vertically oriented linear near field antenna system.

FIG. 29 illustrates at 2900 beam patterns for vertically oriented linear near field antennas (NFA) 2905 in an elevated view of the near field antenna and near field beams 2930. In an embodiment of the present invention as shown in FIG. 29 there may be four beams 2910 with adjacent or overlapping high field regions 2915, and the linear NFA may be substantially vertical with respect to floor 2925. At 2935 is shown a plan view of the NFA and the near-field beams, and at 2920 is another depiction of the linear NFA. The purpose of using multiple adjacent or overlapping near-field beams is to achieve a larger high field region than may be achieved using only one fixed near-field beam.

Figure 30:
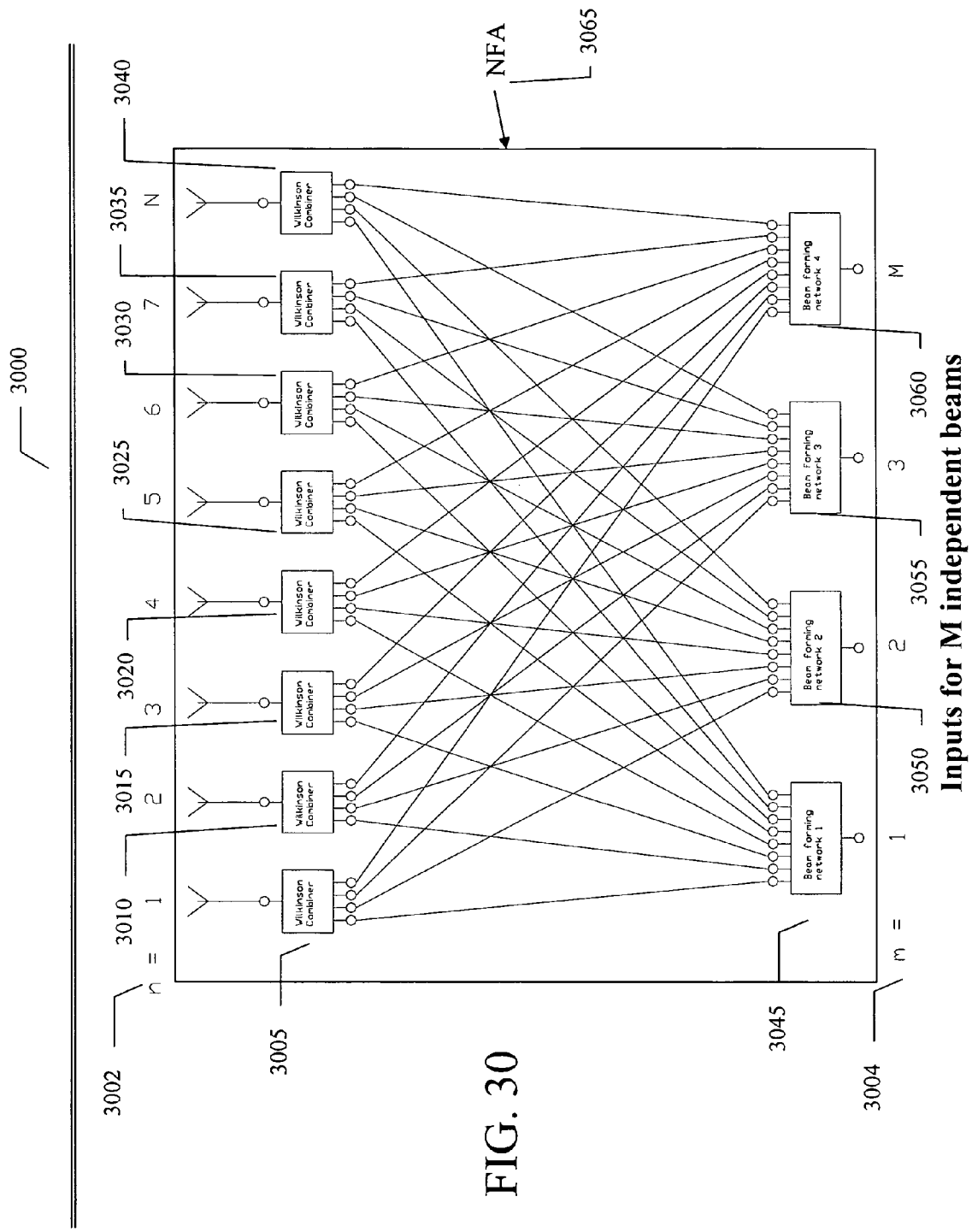
FIG. 30 depicts an embodiment of the present invention with a passive beamformer architecture for a Multi-Beam near field antenna.

FIG. 30 at 3000 depicts an embodiment of the present invention with a passive beamformer architecture for a Multi-Beam near field antenna. Among the methods of forming fixed beams, such as the crossbar beamforming using resistive networks, or the beamforming via the Blass and the Butler matrices, the architecture depicted in FIG. 30 may be most simple for near-field focusing realizations. In an embodiment of the present invention, four fixed beams 3045, 3050, 3055 and 3060 (M, 3004,=4), which may be formed one at a time or simultaneously, may be derived from the phased array having eight antenna elements 3005, 3010, 3015, 3020, 3025, 3030, 3035 and 3040 (N, 3002,=8) by the introduction of 32 (M×N) suitably calibrated transmission lines. For example, and not by way of limitation, if the input of beamforming network is energized, a corresponding beam can be formed to illuminate a desired near-field focal region 3065. Each beamforming network may be used to focus electromagnetic energy at different near-field focal regions. Thus M different near-field focal regions where RFID tags are anticipated may be illuminated one at a time by switching of inputs. In general, for N 3002 antenna elements in the phased array and for M 3004 fixed beams (or M focal regions) to form, there will be M×N transmission lines or connections between the beamforming networks and the combiners as shown in FIG. 30.

By virtue of appropriate phasing of the antenna elements through the transmission lines or through phase shifters in each beamforming network, each of M 2004 focal points may be placed as desired, along the axis of symmetry of the antenna array (i.e. along the boresight direction), or off the axis (i.e. transverse to the boresight direction). This choice of placement is particularly amenable to the RFID environment where groups of RFID tags are scattered in different regions in space.

Each beamforming network shown in FIG. 30, in its simplest form, may be power dividers with respect to its input. Although not limited in this respect, in an embodiment of the present invention, the power combiners connected to the antenna elements may be of the Wilkinson type that is characteristic of high isolation between its input ports. Amplifiers may be inserted between the antenna elements and the combiners if necessary to overcome feed network losses and to radiate the maximum power allowed by FCC limits.

Each of the M 3004 beamformers may have a unique focal point. These focal points may be located at different distances from the aperture (z-axis), or at different lateral positions (x- or y-axis) in front of the aperture, or at combinations of such positions. For example, and not by way of limitation, M, 3004,=4 focal points may be located along the x-axis to more reliably read RFID tags moving laterally in front of the NFA 3065 in the direction of the x-axis.

Figure 31:
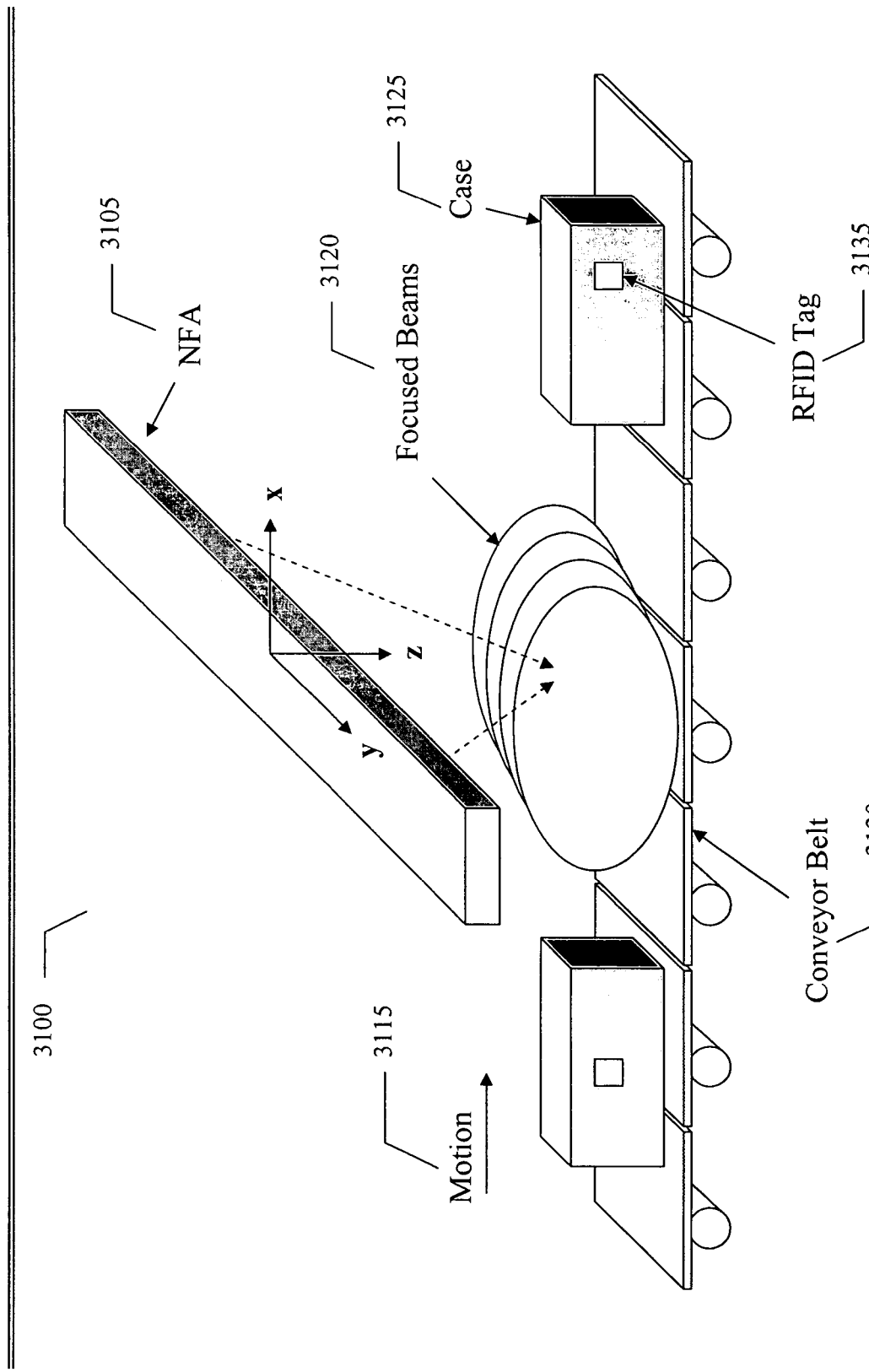
FIG. 31 illustrates an embodiment of the present invention in a conveyor near field antenna configuration.

FIG. 31, at 3100, illustrates an embodiment of the present invention in a conveyor near field antenna configuration. In this embodiment, the NFA 3105 creates multiple focused beams 3120. These beams 3120 are relatively wide in the direction of the conveyor motion 3115, but narrow in the transverse direction. The direction of conveyor motion 3115 may be parallel to the x axis. The RFID system may switch between these main beams to scan the entire volume that encompasses the case 3125 and tags 3135.

Although not limited in this respect, portions of the conveyor belt may be located in the path of the focused beams 3120 and may be fabricated from non-conductive materials to minimize undesired reflections and maintain a uniform near field region. Furthermore, again not limited in this respect, it may be desirable to place RF absorbing materials below the conveyor belt to minimize reflections.

Figure 32:
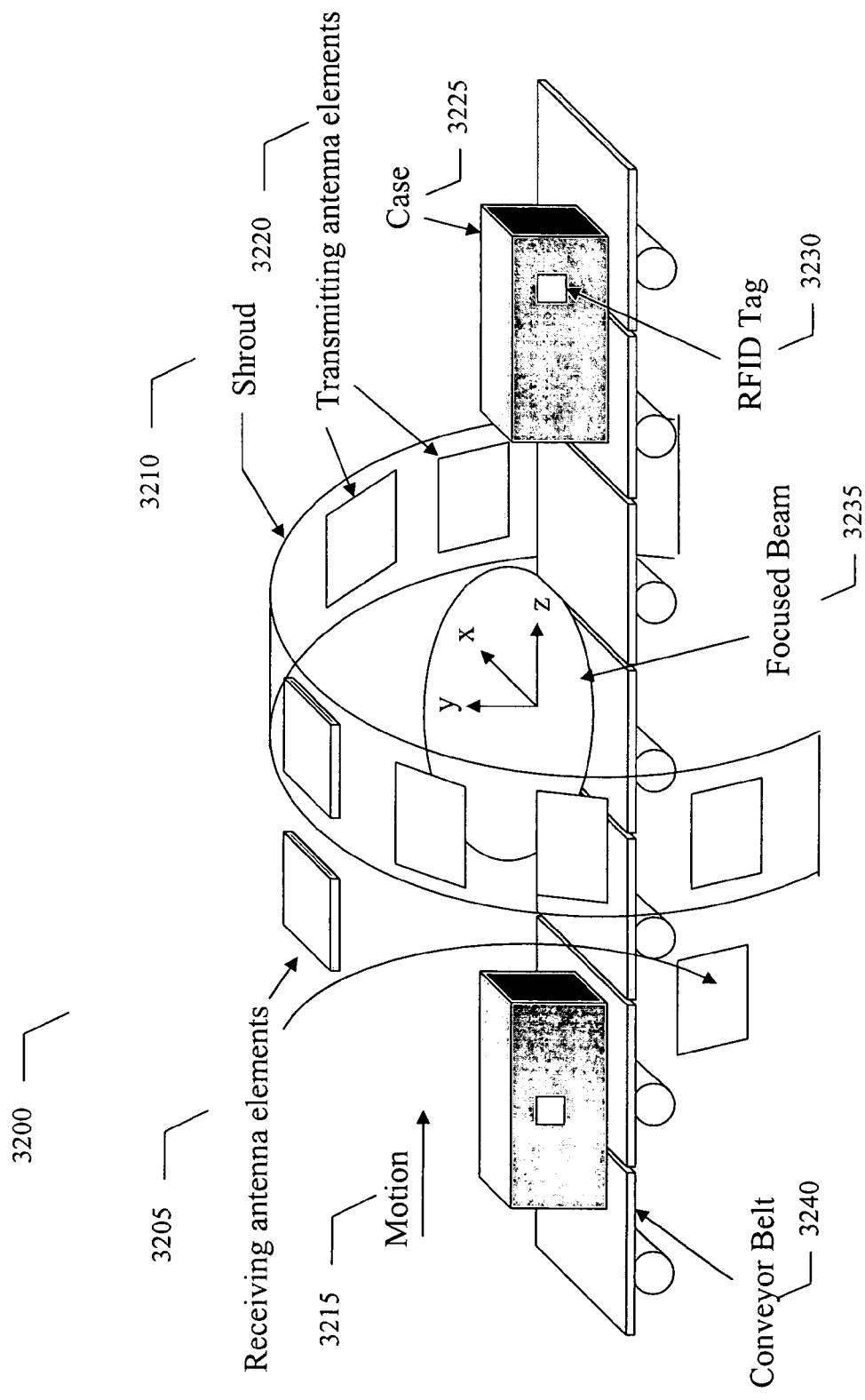
FIG. 32 illustrates a Near Field Conveyor Antenna System of one embodiment of the present invention.

Looking now at FIG. 32, illustrated at 3200 is a Near Field Conveyor Antenna System of one embodiment of the present invention. In this embodiment of the present fixed beam near-field antenna an array of transmitting elements 3220 are arranged in an arc where the main beam of each element points toward the conveyor belt 3240 with conveyor belt motion shown at 3215. A mechanical shroud 3210 may be used to support the transmitting array, although it is not required. Such a shroud 3210 may be conductive, a low-loss dielectric material, or even a lossy dielectric which may help to suppress mutual coupling between adjacent transmit elements.

At least one receive antenna element 3205 may be located near the transmitting array 3220 and may be used to receive backscattered signals from at least one RFID tag 3230 associated with at least one case 3225 as these tags pass through the high field strength region of the focused beam 3235.

Figure 33:
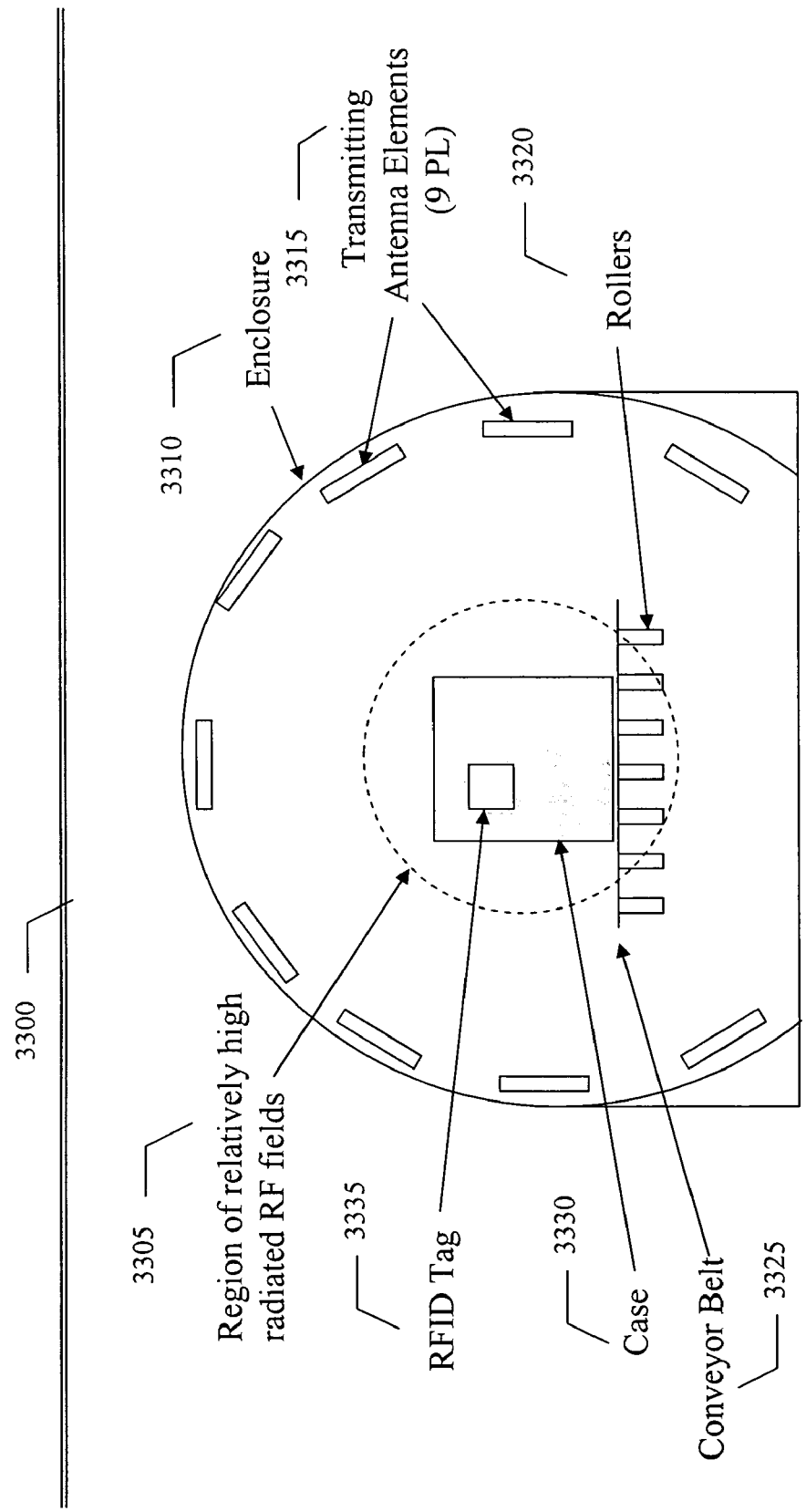
FIG. 33 illustrates a front or rear view of the Near Field Conveyor Antenna System of one embodiment of the present invention.

FIG. 33 illustrates a front view of the Near Field Conveyor Antenna System of one embodiment of the present invention. As shown generally at 3300, the present invention may create a conveyor antenna system with conveyor belt 3325 capable of reliably reading RFID tags 3335, even tags buried inside cases 3330. Antenna elements 3315 may be arranged in an arc, and each element may have a main beam that radiates toward the geometric center of the array within enclosure 3310, thus providing a region of relatively high radiated RF fields 3305. Assuming the elements are uniformly phased, the focal point may be located at the array center. Thus a relatively high RF field strength region is created in the vicinity of a case containing one or more RFID tags. Although not required for the present invention, rollers 3320 may facilitate conveyor belt 3325.

Assume that each antenna element 3315 in the array of FIG. 33 radiates in the direction broadside to its surface and toward the interior of the arc. This is an example in which the main beam of each element points in a unique direction, and that direction is essentially toward the high field region around the conveyor belt.

Figure 34:
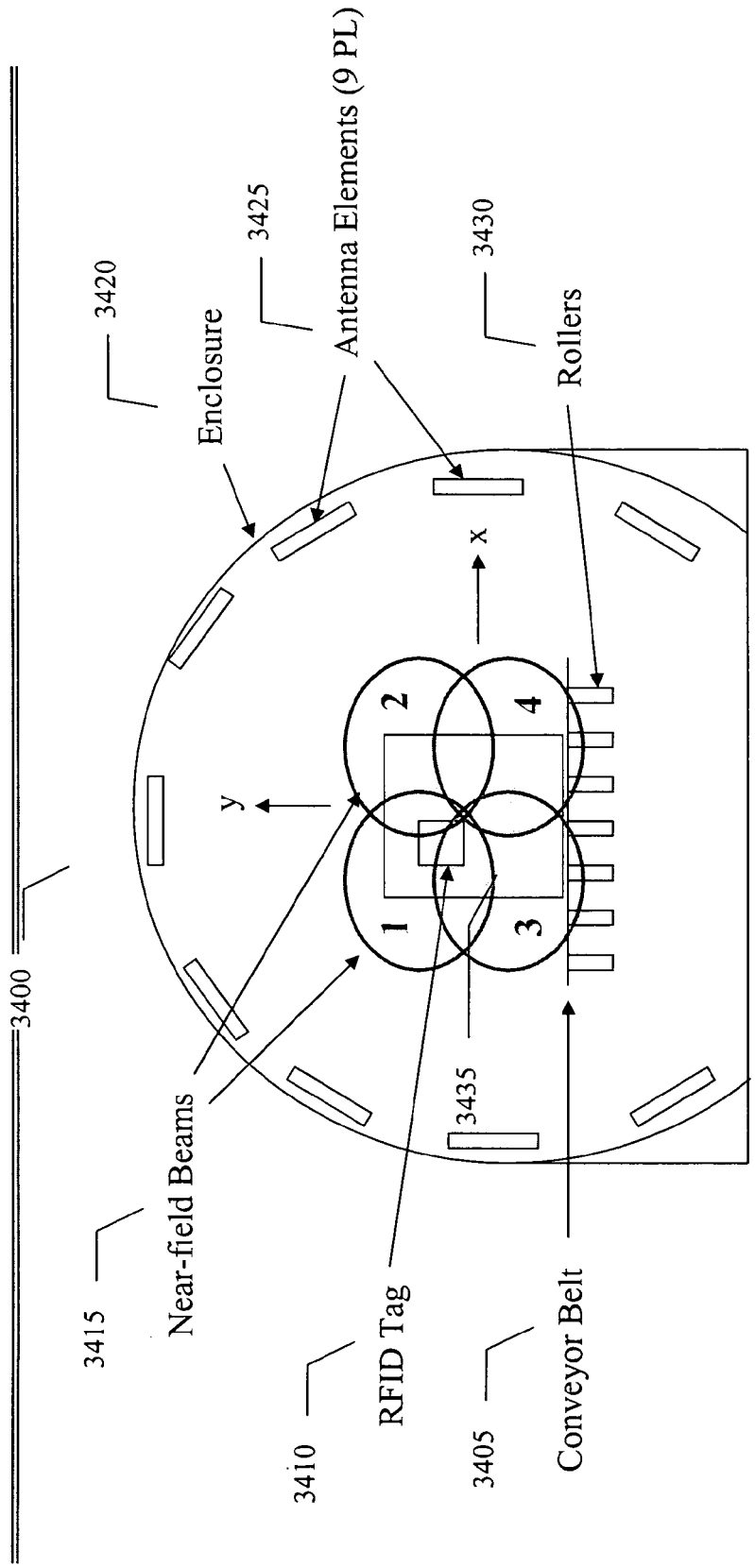
FIG. 34 illustrates a Passive Multi-Beam Antenna for Conveyor Applications of one embodiment of the present invention.

Turning now to FIG. 34 is illustrated generally at 3400 a Passive Multi-Beam Antenna for Conveyor Applications of one embodiment of the present invention. If the antenna elements 3425 in this conveyor with conveyor belt 3405 near-field antenna system are excited with unequal phases, then the high field region can be moved such that it is no longer centered on a plane of symmetry for the array (such as the y axis). Shown at 3415 are four amplitude contours labled as 1, 2, 3 and 4, associated with four independent beams. These fixed near-field beams may be formed with the same phase shifting technology as was described to form beams from linear arrays. Although the present invention is not limited in this respect as any number of conveyor type systems in any number of shapes, sizes and configurations may be used, an embodiment of the present invention may utilize conveyor belt 3405 with rollers 3430 within enclosure 3420 to facilitate motion of the RFID Tag 3410 associated with case 3435. The primary function of the enclosure 3420 is to provide mechanical support for the antenna elements in the arc array. However, it may be designed with conductors to provide shielding that lowers radiated emissions, or with good quality dielectric materials to minimize electromagnetic scattering, or with lossy dielectric materials to reduce mutual coupling between adjacent antenna elements.

Figure 35:
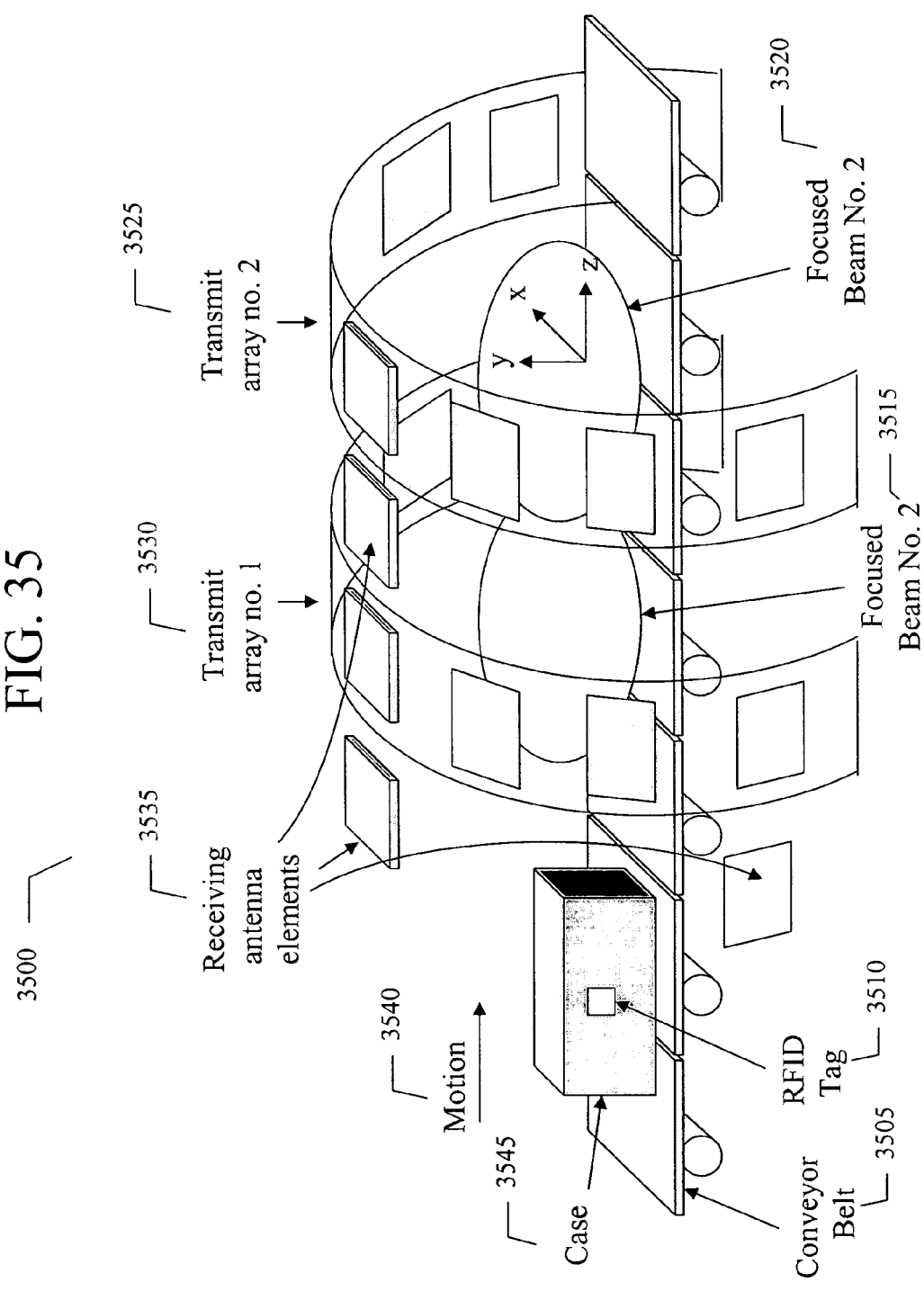
FIG. 35 illustrates a Tracking Conveyor Near-Field Antenna System of one embodiment of the present invention.

FIG. 35 illustrates generally at 3500 a Tracking Conveyor Near-Field Antenna System of one embodiment of the present invention. In this embodiment of a near-field tracking antenna system, contiguous transmit arrays 3530 and 3525 (it is understood that any number of transmit arrays may be used in the present invention) may be turned on in sequence to follow a target, with focused beams 3515 and 3520, which may be a case 3545 (although it is not required to be) containing RFID tags 3510 traversing along conveyor belt 3505 in the direction as shown by motion 3540. Each Tx array 3525 and 3530 may be comprised of a set of antenna elements arranged in an arc (it is understood that although an arc shape is used in this embodiment, any shape may be used which provides the desired coverage of conveyor belt 3505 with case 3545) surrounding the conveyor belt 3505. The arc may be, although is not required to be, in a plane that is essentially orthogonal to the direction of motion of the RFID tags 3510. Sensors (optical, weight sensing, ultrasonic, etc.) may determine the location of the case 3545 on the conveyor belt 3505 and activate the nearest transmit array 3525 or 3530. Receiving antenna elements 3535 may be located near the transmitting array 3525, 3530, either above, below, or on the side of the conveyor belt 3505, to receive backscattered signals.

Figure 36:
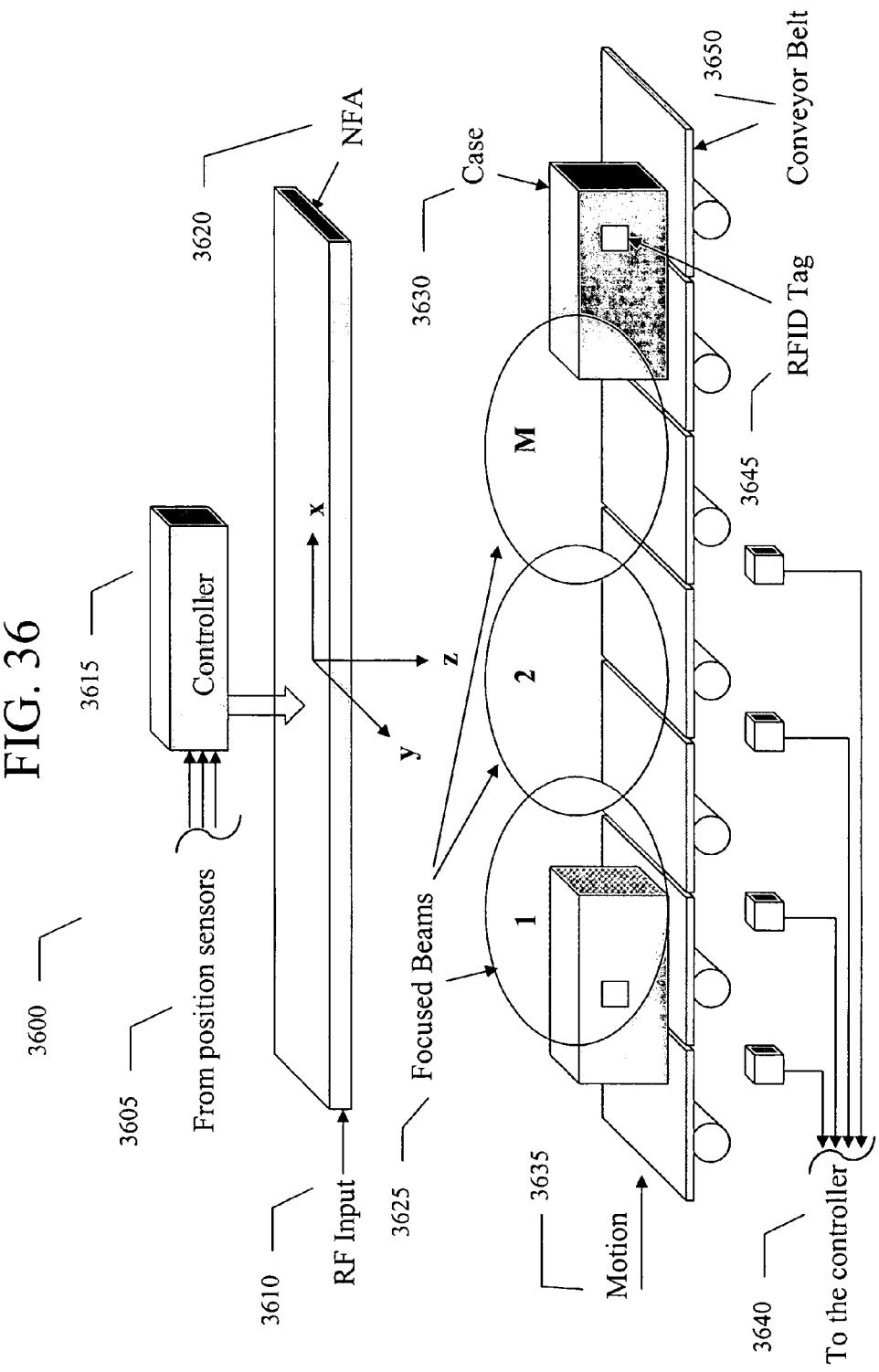
FIG. 36 illustrates a Tracking Conveyor Near-Field Antenna System of another embodiment of the present invention.

FIG. 36 at 3600 illustrates a Tracking Conveyor Near-Field Antenna System of another embodiment of the present invention wherein a linear tracking near-field antenna 3620 which may either use multiple sequential fixed beams or a continuously scanned beam with several positions shown at 3625. For the fixed beam embodiment, only a subset of all possible beams may be used at any one time. RF input 3610 may be input to NFA as shown and a controller 3615 may provide input from position sensors 3640 via 3605 to control the fixed or scanned beams 3625. Motion of conveyor belt 3650 with RFID Tag 3645 associated with case 3630 is depicted at 3635.

Figure 37:
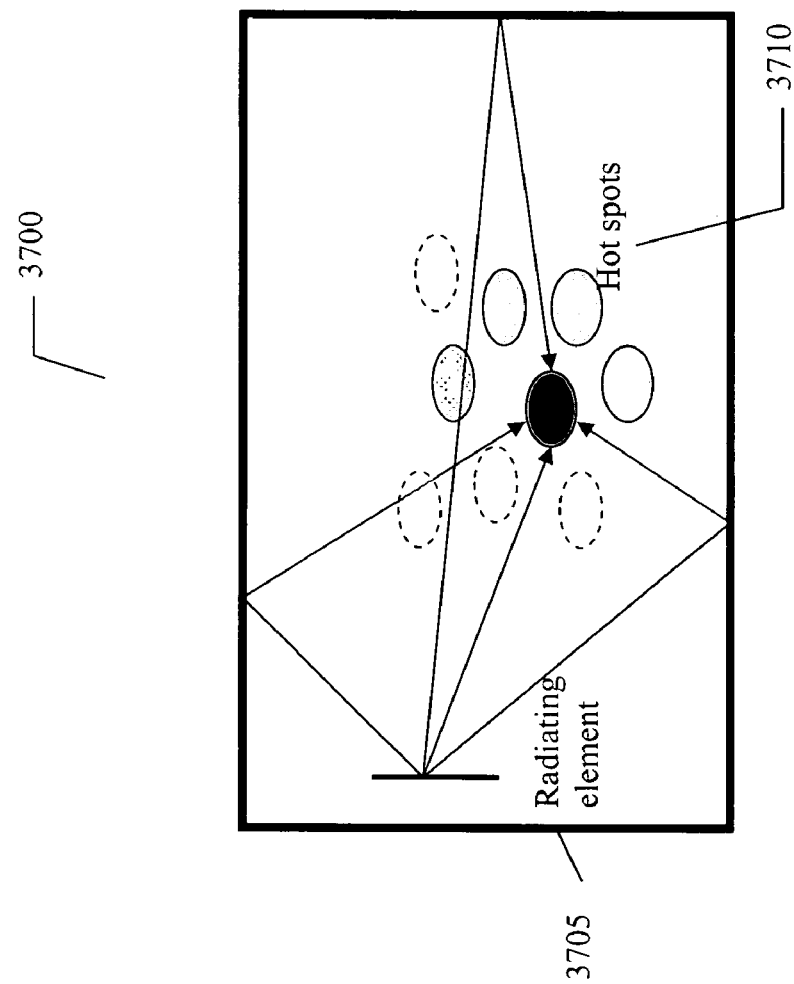
FIG. 37 illustrates an embodiment of the present invention with reflecting surfaces surrounding an active volume.

In yet another embodiment of the present invention, FIG. 37, generally at 3700, illustrates reflecting surfaces surrounding an active volume. Reflections form reflecting surfaces may interfere constructively with the directly incident wave from an RFID radiating element 3705 or antenna and with other reflections. Such constructive interference could produce field strengths typically several dB higher than the incident wave in free space, with an almost limitless theoretical maximum. These gains in field strength come at no extra cost in terms of RF power required from the RFID reader, only the cost of establishing the reflecting surfaces. Between the hot spots 3710 of constructive interference are volumes of destructive interference, which may be mitigated by the movement of the tags and/or scanning of the antenna beam.

In an embodiment of the present invention, one or more reflecting surfaces, either flat or curved may be placed on one or more sides of the volume of interest such as the active volume. The reflecting surfaces could be any solid surface covered by metal foil or conductive paint or non-solid surfaces covered by wire meshes with sufficiently dense weaving patterns. Alternatively, the reflecting surfaces could be reflective flaps that allow the movement of objects into the active volume. The tags may be moved within the active volume ensuring encounters with hot spots. Alternatively, the antenna beam may be scanned to move the hot spots relative to the tags. Alternatively, the RF phasing between radiating elements may be adjusted to move the hot spots relative to the tags. Further, the active volume may be completely shielded, thereby reducing far field emissions. This allows the power radiated by the RFID reader to be increased, in turn increasing the field strength delivered at the tags.

Figure 38:
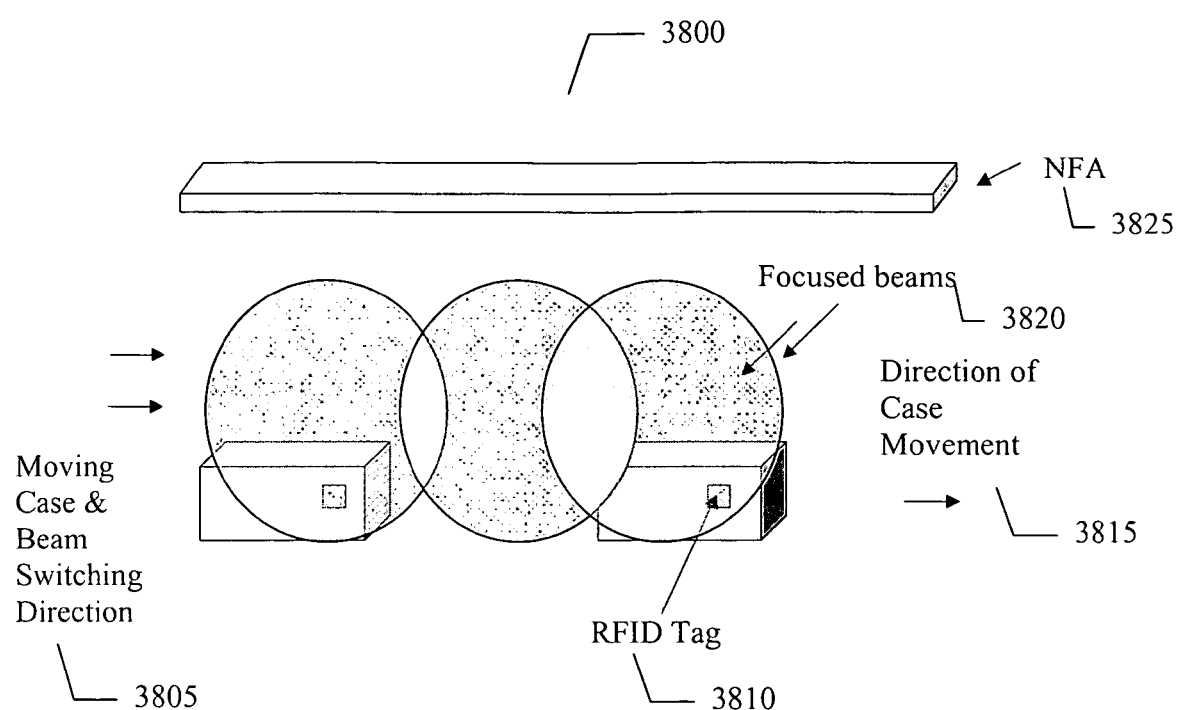
FIG. 38 illustrates an embodiment of the present invention in a Near-field Tracking Configuration.

Turning to FIG. 38 is an illustration of an embodiment of the present invention in a Near-field Tracking Configuration. Shown generally as 3800, by virtue of the multi-beamforming architecture of the near field antenna (NFA) 3825, a near-field target may be dynamically tracked by a beam or a group of contiguous beams 3820, formed one at a time (although the present invention is not limited to this), so as to increase the dwell time between the RFID Tag 3810 and the reader. A linear array may be located above a moving target with the array's longitudinal direction 3815 along the tag's direction of movement, so that M multiple beams may be sequentially formed in the same direction. Although M=3 is depicted in an embodiment of the present invention, this number is for illustration only, and can take on other values as necessary. The moving target may be set up to move through the sequential near-field focal regions corresponding to the beams 3820. By switching the beams 3820 one at a time, at least one beam may follow 3805 the case synchronously. Although not limited in this respect, optical sensors, weight sensors, or sonic detectors on the conveyor line may provide a means of informing the reader of the incoming target and its subsequent positions.

Figure 39:
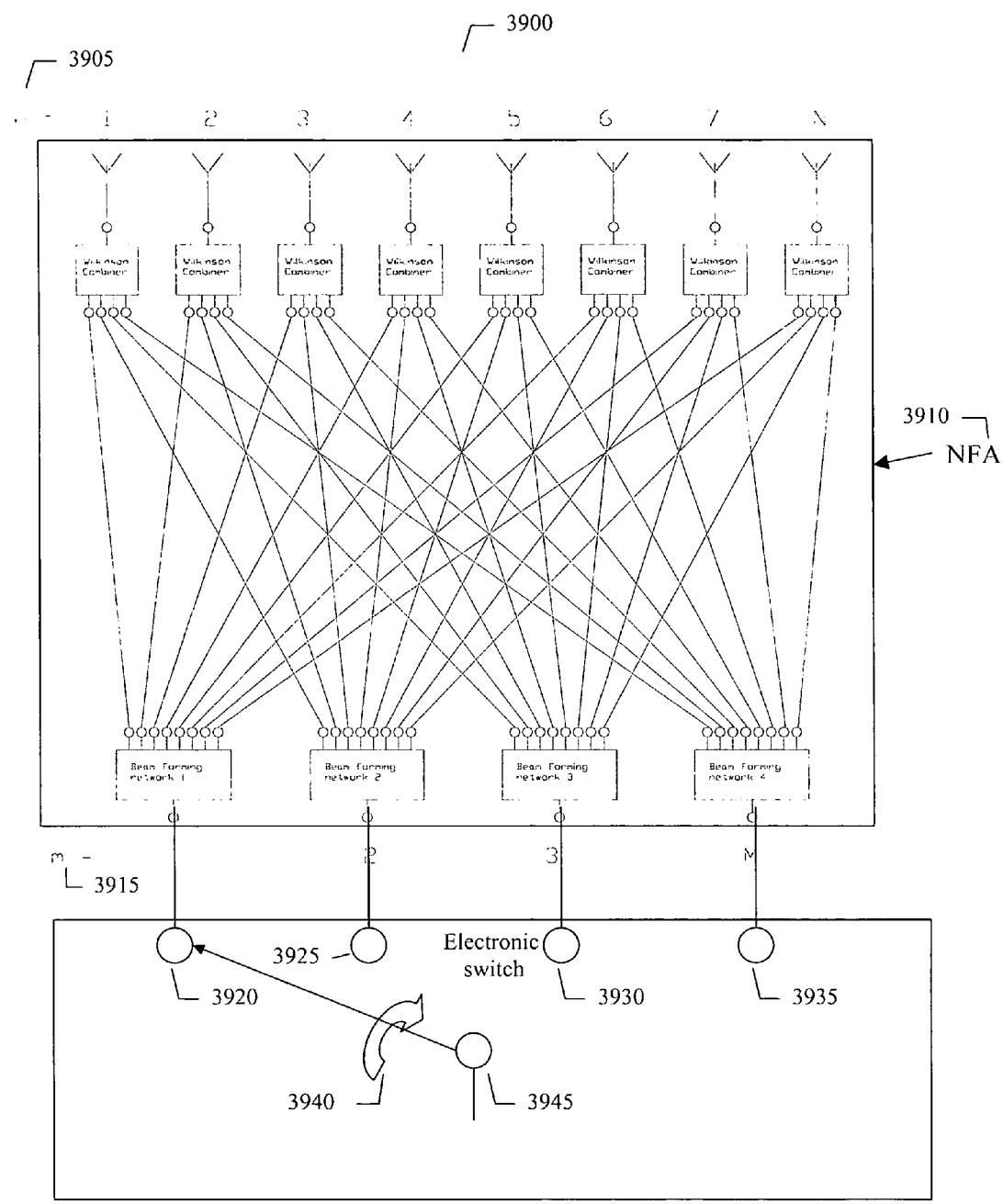
FIG. 39 illustrates sequencing M multi beams for tracking in an embodiment of the present invention.

FIG. 39 illustrates at 3900 sequencing M, 3915, multi beams for tracking in an embodiment of the present invention. Given the position information of the target to the reader, the switching intervals of the switch 3945 can be determined so that the target can be tracked with illumination synchronous with its movement. Thus, the dwell time of the target within the near-field beams 3910 is increased, thereby improving the probability of a tag read event. The switching system is illustrated by switches 3920, 3925, 3930, 3935 and 3945 with switch direction at 3940.

In an embodiment of the present invention, the near-field focused antenna 3910 system is capable of tracking a target along a predetermined path using a substantially linear array of elements 3905, and a phase shifting means to form multiple fixed beams in the near-field, and a means to sense the location of the target whereby this means may be optical, mechanical, or sonic position detection subsystems, and a controller to accept position information and to activate the proper fixed beam along the course so as to enable the near-field focused beams to track the target.

Figure 40:
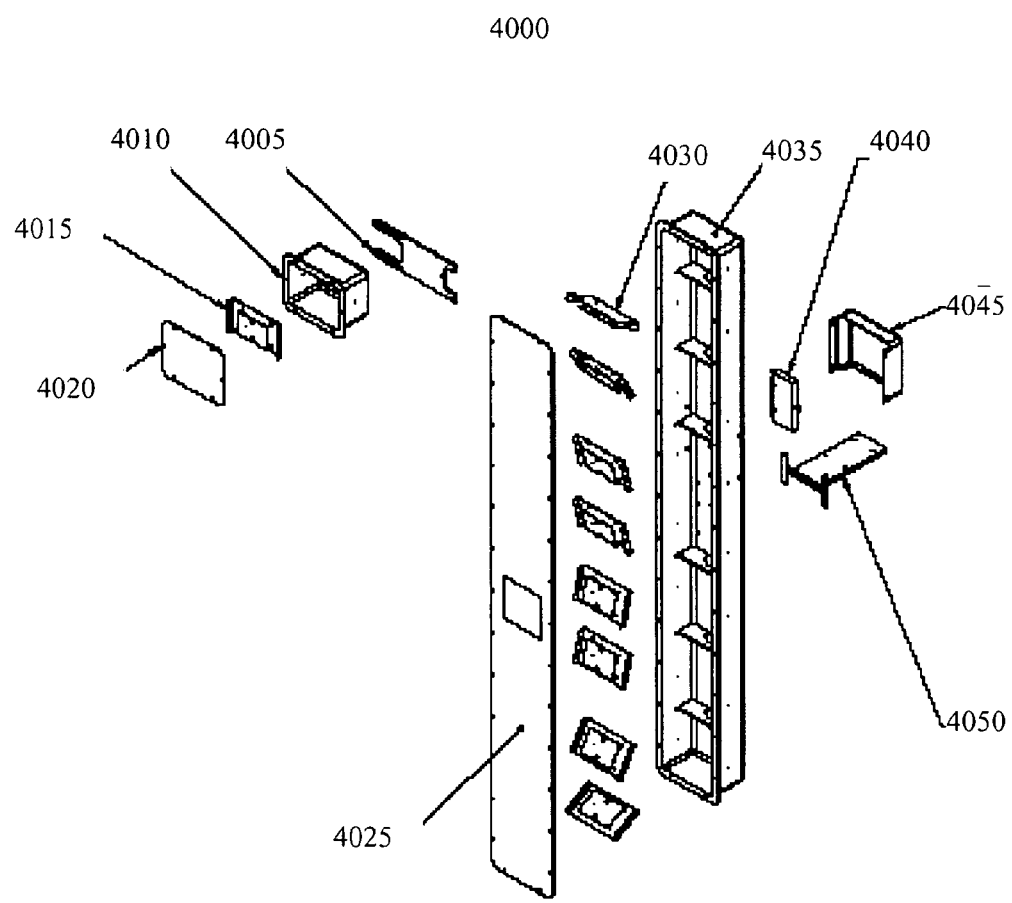
FIG. 40 is an exploded view of an embodiment of an antenna apparatus of the present invention.

Turning now to FIG. 40, depicted generally at 4000, is an exploded view of an embodiment of an antenna apparatus of the present invention with Transmit Patch Element 4014 and Ground Plane 4030. The patch element 4014 may mount to an aluminum ground plane 4030 (it is understood that aluminum or any other type of ground plane is intended to be within the scope of the present invention) using plastic (or any other type of) standoffs. The patch element and ground plane assembly may mount to transmit Element Housing 4035 using 2 mechanical fasteners which allow the assembly to spin on an axis. A set screw may be located on the ground plane 4036 which allows setting the angle of each individual element.

Transmit Element Housing 4035 may be made from 0.188" ABS and may serve as a barrier between the transmit elements 4014 and the antenna environment. The housing 4035 may also serve as a mounting structure for the individual elements 4014, external covers, mounting brackets 4050, and radome 4025.

Transmit Element Radome 4025 may be made from 0.125" ABS and may be used to enclose the elements 4014 in the housing. Receive Patch Element 4014 may mount to an aluminum ground plane 4015 using plastic standoffs. The element and ground plane assembly may mount to Receive Element Housing 4010 using 2 mechanical fasteners which allow the assembly to spin on an axis. A set screw may be located on the ground plane which allows setting the angle of the element and the ground plane assembly.

Receive Element Housing 4010 may be made from 0.188" ABS and may serve as a barrier between the receive element 4014 and the antenna environment. The housing may 4010 may also serve as a mounting structure for the receive element 4014 and ground plane 4015 assembly, mounting bracket 4010 and radome 4020. Receive Element Radome 4020 may be made from 0.125" ABS and function to enclose the element 4015 in the housing 4010. Power Divider 4040 may mount to the rear of the Transmit Element Housing 4035 and a Power Divider Cover 4045 may be made from 0.188" ABS and protects the power divider 4040.

Transmit Element Housing Mounting Bracket 4050 may be made from Aluminum and may provide a mounting structure to mount to a tripod bracket or pole, and allow mounting the antenna in a horizontal or vertical orientation. It also may allow the antenna element to pivot vertically, although the present invention is not limited in this respect with regards to any of the abilities of the mounting structure. Receive Element Housing Mounting Bracket 4005 may be made from ABS and may provide mounting structure to mount to the Transmit housing 4035 and allows distance adjustment between the transmit 4035 and receive 4010 element housings.

Figure 41:
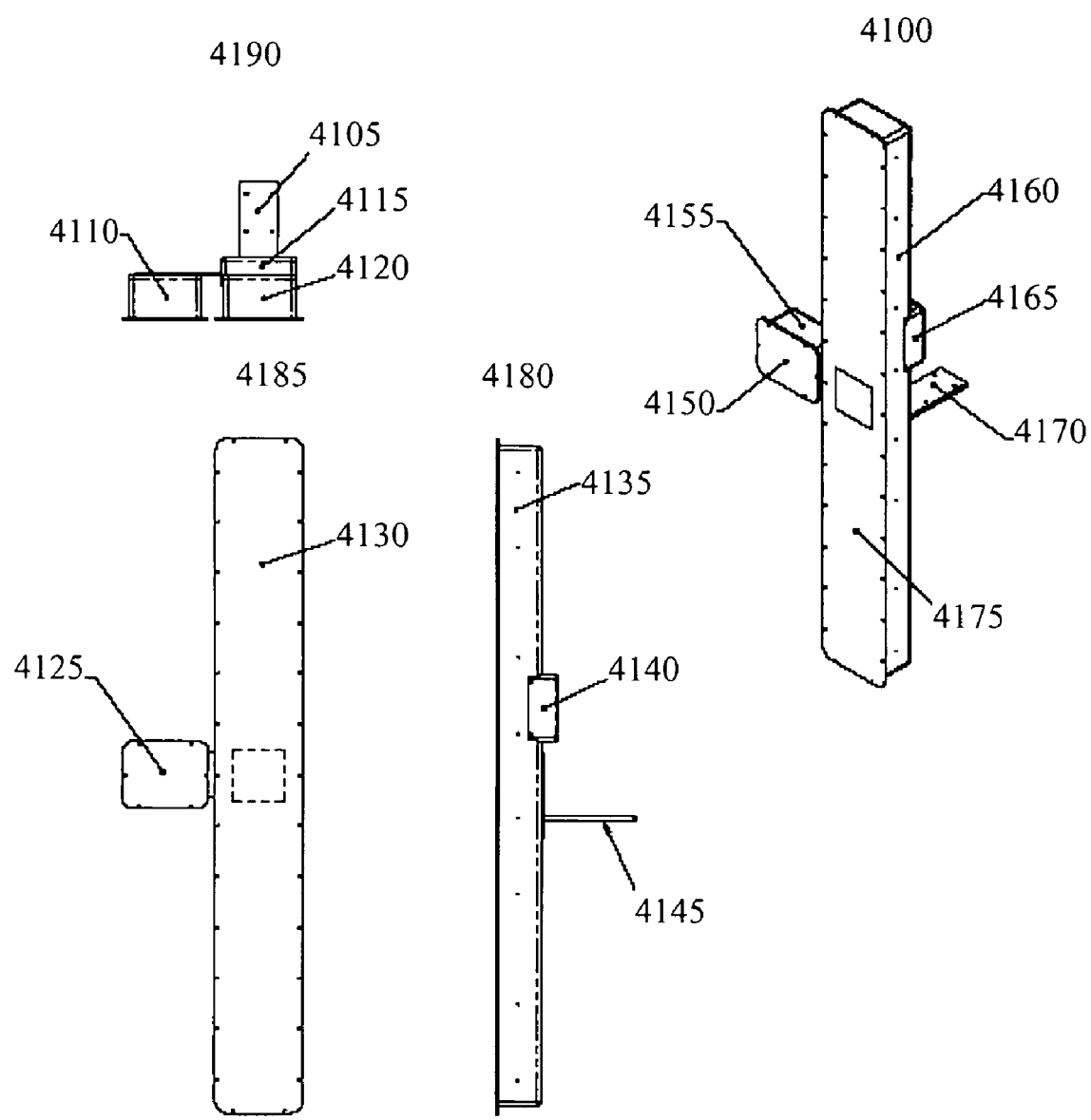
FIG. 41 is a non-exploded view of an embodiment of an antenna apparatus of the present invention.

Turning now to FIG. 41 is a non-exploded view of an embodiment of the antenna apparatus of the present invention illustrated, in angled presentation at 4100, depicts the relative construction of an embodiment of the antenna apparatus of the present invention, which includes: Transmit Element Housing 4160, receive element housing 4155, transmit element radome 4175, receive element radome 4150, power divider cover 4165, and antenna mounting bracket 4170. A side view of the present invention is illustrated at 4180 and includes: transmit element housing 4135, power divider cover 4110, and antenna mounting bracket 4145. At 4185 is depicted a front view on one embodiment of the present invention which shows transmit element housing 4130 and receive element radome 4125. At 4190 is depicted a longitudinal inverted side view of an embodiment of the present invention showing transmit element housing 4120, receive element housing 4110, power divider cover 4115 and antenna mounting bracket 4105.

Figure 42:
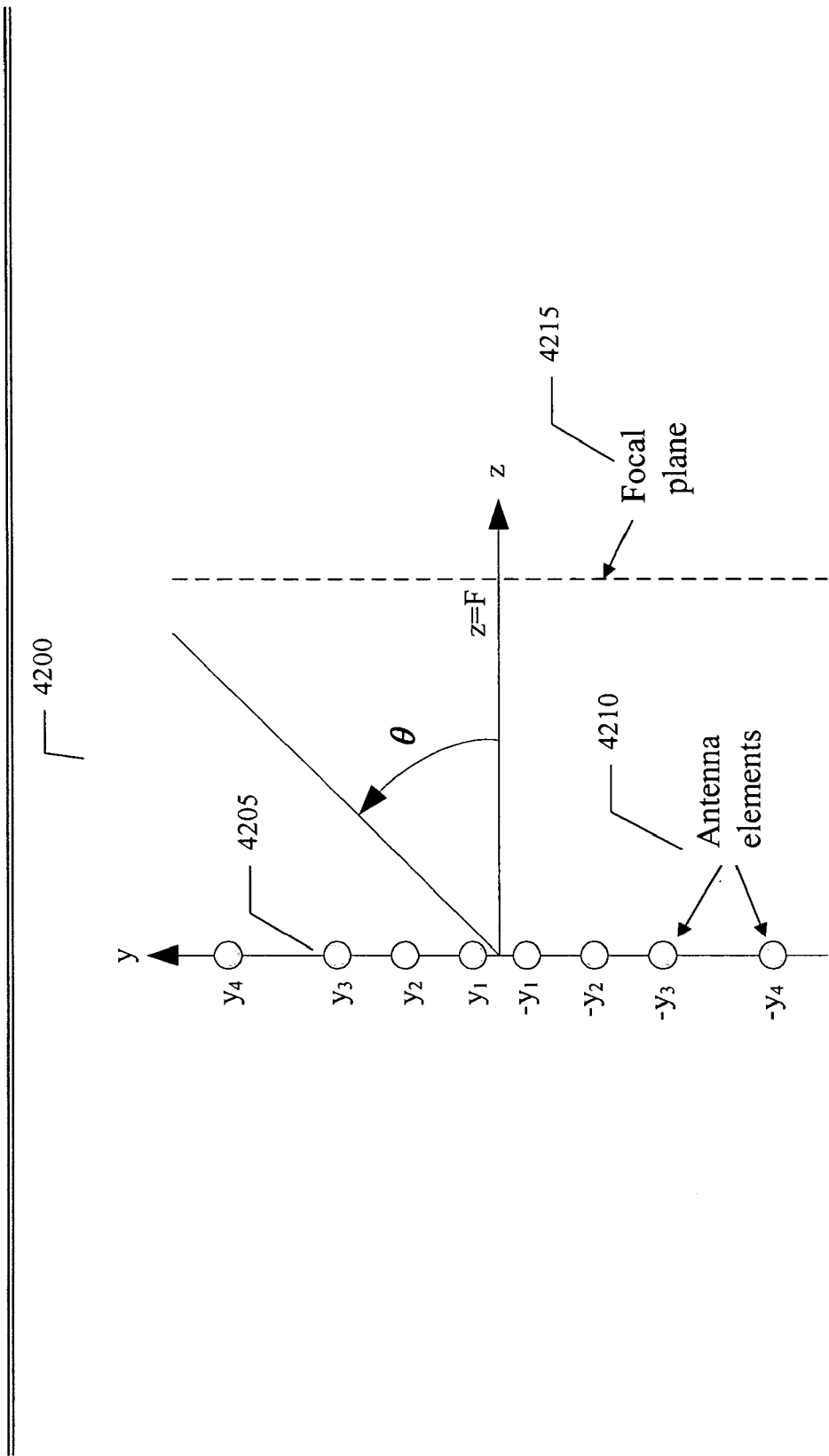
FIG. 42 illustrates a near field antenna design process including element locations of an embodiment of the present invention.

Now looking at FIG. 42, shown generally at 4200, is in an embodiment of the present invention for a design procedure for the synthesis of a near field antenna array 4205. This may be a finite array of elements phased such that the electric fields from individual elements add constructively at a focal point. The variables involved may be the element positions, the excitation amplitude of each element, and the pointing direction for the individual elements.

The design procedure, in an embodiment of the present invention, may involve numerical optimization of the design variables. A cost function may be defined in terms of the design variables, and this function may then be minimized using standard numerical methods. This works well for minimizing the far field gain. An alternate numerical approach is to define a figure of merit, such as the ratio of near-field gain to far-field gain, and then to maximize this multi-variable function using standard numerical methods.

In an embodiment of the present invention, the design process may include:

1. Assume an element pattern, pointing direction, and polarization. Calculate the radiated far-field electric field as a function of a local coordinate system centered on the individual element. Since an individual element is relatively small compared to the wavelength, this element electric field function will be accurate beyond a distance of d away from the antenna where d is the largest element dimension in the xy plane.

2. Assume an initial location in space for the elements, or specifically for their phase centers. This may be a linear array (1D), a planar array (2D), or a conformal array that lies on a curved surface.

3. Assume an initial set of element excitation magnitudes, or equivalently, an amplitude taper.

4. Assume an initial set of element beam pointing angles.

5. Calculate the element phase distribution required to achieve focusing at the desired focal point. This may be an explicit function of geometry only.

6. Using superposition, sum the radiated electric fields from each element, in a vector fashion, to determine the total electric field radiated from the array. This sum will be done in terms of a global coordinate system, and it will be valid for all three regions with respect to the array: near field, Fresnel, and far-field.

7. Using the total radiated field expression, calculate the radiated power density, and then integrate this power density over the upper hemisphere to compute antenna directivity.

8. Define a figure of merit (FOM) to be the ratio of peak near field directivity at the focal point to the peak far field directivity (at any observation angle). This may also be the same ratio as near-field gain to far field gain since the ratio of directivity to gain is simply the antenna efficiency, a constant. Note that this FOM is a multi-variable function.

9. Optimize the above defined FOM as a function of element position and/or amplitude taper and/or beam pointing angle by using conventional numerical optimization routines found in Matlab, Mathcad, Mathematica, or any other scientific programming tool.

10. For the beamformer design, determine the transmission line lengths that carry signals from the power divider to the individual elements. This is based on the minimum distance required to route the signals from a power divider to the outside elements, and then add an additional length of transmission line needed to achieve the proper phase delay or time delay to each interior element depending on the desired focal point.

Again, consider the linear array 4205 with antenna elements 4210 shown in FIG. 42. Assume that a linear array 4205 of 2N identical antenna elements 4210 is located such that the phase center of each element lies in the xy plane. Furthermore, assume these elements are symmetrically located on the y axis, although they are not necessarily uniformly spaced. Hence the geometric center of this linear array may be located at the origin of a global coordinate system that may be expressed in standard Cartesian or spherical coordinates.

In this example the elements 4210 may have a uniform amplitude excitation. This excitation may easily be achieved using standard power dividers with equal ratios for power splits.

The array 4205 may be designed to have a phase distribution such that focusing may occur in a focal plane located at $z=z_F$, 4215. The element excitation phase may be computed as $$\varphi_n = \frac{2\pi}{\lambda}\sqrt{(y_n - y_F)^2 + z_F^2}$$

where n=1,2, . . . N , and the focal point may be located at Cartesian coordinates of (0, $y_F$, $z_F$).

Antenna elements 4210 may have independent beam pointing directions. However, practical embodiments may either have 1) all of the main beam pointing directions directed parallel to the z axis, or 2) each element will have its main beam pointed at a focal point defined to be on the z axis. If it is assumed that each element has a broadside beam that is pointed in the +z direction (no tilt), than in one embodiment the variables to be optimized are the element positions $y_n$.

Furthermore, let the elements 4210 be microstrip patch antennas that polarized to radiate an electric field in the x direction. Model the element pattern as Elem($\theta$)=[cos($\theta$)]$^p$ where the exponent p is typically between 1 and 2 for patch elements. Since the elements 4210 are oriented in a uniform direction in this example, the far-field can be calculated as the product of an element factor and an array factor. The array factor is simply $$A(\theta, y_1, y_2, y_3, y_4) = \sum_{n=1}^{N} e^{j\varphi_n}\cos(k\,y_n\sin(\theta)),$$

and the normalized far-field gain as a linear function is given as $$G(\theta,y_1,y_2,y_3,y_4,Nc)=N_c\left[|A(\theta,y_1,y_2,y_3,y_4)|^2 \cdot |\text{Elem}(\theta)|^2\right]$$

where $N_c$ is a positive valued normalization constant to make the peak far-field gain equal to unity. To optimize the far-field pattern for minimum peak gain, it is necessary to spread the radiated power evenly over as broad of a solid angle as possible. So we can define a cost function to be minimized:

(JF, this cost function has been edited and corrected)

$$\text{Cost}(\theta, y_1, y_2, y_3, y_4, N_c) = \sum_{i=0}^{6} |G((5i)deg, y_1, y_2, y_3, y_4, N_c) - 1| + \sum_{i=1}^{4} G((30+10i)deg, y_1, y_2, y_3, y_4, N_c)$$

The first term on the RHS of the cost function corresponds to the broad main beam region where gain is evaluated at polar angles of $\theta$=0, 5,10, . . . , and 30 degrees. The second term on the RHS corresponds to the sidelobe region where gain is evaluated at polar angles of $\theta$=40, 50, 60, and 70 degrees.

Next one must define the constraints on the element locations. For instance, let $$y_1 > \lambda/6, y_2 > y_1 + \lambda/3, y_3 > y_2 + \lambda/3, y_4 > y_3 + \lambda/3$$

Then, after proving an initial guess for the element positions, the cost function is minimized using standard numerical routines found in Matlab, Mathematica, Mathcad, or other general purpose scientific programming languages. Such routines may use Powell's method, conjugate gradient methods, the simplex method and others including hybrid approaches, although it is understood that the present invention is not limited in this respect. The output of these routines may be an array of y coordinates and the value of $N_c$. An example of an optimized, but no longer normalized, gain function is shown in FIG. 25. Note that the main beam is actually a broad shaped beam with its nulls filled in. Assuming a focal point is specified at (0,0,48) inches, the y coordinates are optimized to be ($y_1$, $y_2$, $y_3$, $y_4$)=(5.29 in., 14.85 in., 27.71 in., 35.61 in.)

The near-field to far-field figure of merit (FOM) may also be optimized. First express the near field axial pattern (in the boresite direction) as the sum of electric fields radiated from each element:

$$NF(z, y_1, y_2, y_3, y_4) = \sum_{n=1}^{N} e^{j\varphi_n}\frac{e^{-jk\sqrt{y_n^2+z^2}}}{\sqrt{y_n^2+z^2}}\text{Elem}\left(\tan^{-1}\left(\frac{y_n}{z}\right)\right).$$

The first factor listed in the sum is the element phase. The second factor listed is the simply the spherical wave factor $e^{-jkR}/R$, and the third factor is the element factor which, in the near field, is no longer independent of element position. Examples of near field plots along the boresite axis are shown in FIG. 26.

We have assumed the focal point lies on the z axis such that the xz plane is a plane of symmetry. The FOM can be expressed in dB as $$FOM(y_1, y_2, y_3, y_4) = 20\log\left[\frac{|NF(z_F, y_1, y_2, y_3, y_4)|z_F}{|NF(1000x_F, y_1, y_2, y_3, y_4)|1000z_F}\right] \text{ (dB)}.$$

The numerator of this ratio is the product of the magnitude of the total electric field at the focal point multiplied by the distance to the focal point. This product is proportional to directivity. Hence, the denominator in the FOM function is the directivity evaluated at a distance of 1000 focal lengths from the array; a safe distance to assume the observation point is in the far-field region. Again, this is a multi-variable function. Examples of FOM plots are shown in FIG. 27. The FOM function may be numerically maximized using standard numerical routines found in Matlab, Mathematica, Mathcad, or other general purpose scientific programming languages.

However, it is often the case that a null in far-field directivity will occur at boresite. This means the peak far-field directivity is not found at $\theta$=0, but at some other angle off boresite. So we perform a search in polar angle for the peak gain, and then determine the depth of the boresite null, if it exists. The true FOM is then the expression given above, but derated by the depth of the null at boresite. A typical FOM for a well-designed, eight-element linear array is about +6 dB to +8 dB.

Finally, the transmission line lengths for the beamformer that distribute transmitted signals from the power splitter to the individual elements may be calculated from $$L_n = \text{Fixed Length} + \Delta_n$$

where $\Delta_n=0$ for n=N=4 in this example, and $\Delta_n=|\phi_N-\phi_n|/\beta$ for n'=1,2,...,N-1. The variable $\beta$ is the phase constant for the transmission line: $\beta=2\pi f/v_p$ where f is frequency and $v_p$ is the phase velocity on the transmission line.

While the present invention has been described in terms of what are at present believed to be its preferred embodiments, those skilled in the art will recognize that various modifications to the disclose embodiments can be made without departing from the scope of the invention as defined by the following claims. Further, although a specific scanning antenna utilizing dielectric material may be described in an embodiment of the present invention, it is understood that any scanning antenna can be used with any type of reader any type of tag and not fall outside of the scope of the present invention.

What is claimed:

1. An apparatus for tracking a RFID Tag comprising:
at least one near-field focused antenna comprising an array of element and a beamformer to form multiple fixed beams in the near-field, wherein said beamformer includes at least one phase shifter that includes a voltage tunable dielectric capacitor for focusing beams:
a sensor adpapted to sense the position of said Tag; and
a controller adpapted to accept position information and adapted to activate the proper fixed beam along a course so as to enable the near-field focused beams to track said Tag.

2. The apparatus of claim 1, wherein said array of elements is substantially linear.

3. The apparatus of claim 1, wherein said sensor is one or more selected from the following group: optical, mechanical, thermal, or sonic position detection subsystems.

4. The apparatus of claim 1, wherein said controller controls a plurality of switches which activate at least one beam forming network.

5. The apparatus of claim 1, wherein said tracking occurs along a predetermined course.

6. The apparatus of claim 5, wherein said predetermined course is along a conveyor line.

7. An apparatus adapted to tracking a RFID Tag comprising:
an array of elements;
a beamformer adapted to form multiple fixed beams in the near-field, wherein said beamformer includes at least one phase shifter that includes a voltage tunable dielectric canacitor for focusing said beams:
a sensor adapted to sense the location of said Tag; and
a controller adapted to accept location information and activate the proper fixed beam so as to enable near-field focused beams to track said Tag.

8. The apparatus of claim 7, wherein said tracking occurs along a predetermined course.

9. The apparatus of claim 7, wherein said sensor is one or more selected from the following group: optical, mechanical, thermal, or sonic position detection subsystems.

10. The apparatus of claim 7, wherein said array of elements is substantially linear.

11. A system for tracking a RFID Tag comprising:
at least one near-field focused antenna comprising a set of transmit arrays, wherein each array includes a set of elements arranged substantially in an arc, wherein said are lies in a plane substantially normal to the direction of motion of said Tag:
a beemform for each transmit array adapted to form at least one fixed beam in us near-field, wherein said beamformer includes at least one phase shifter that includes a voltage tunable dielectric capacitor for focusing beams;
a sensor adapted to determine the position of said Tag; and
a controller adapted to accept positiam information and adapted to activate the proper fixed beam so as to enable the near-field flied beams to track the Tag.

12. The apparatus of claim 11, wherein said sensor is one or more selected from the following group: optical, mechanical, thermal, or sonic position detection subsystems.

13. The apparatus of claim 11, wherein said target is at least one RFID tag.

14. The apparatus of claim 11, wherein said tracking occurs along a predetermined course.

15. The apparatus of claim 14, wherein said predetermined course is along a conveyor line.

16. A method of tracking a RFID Tag comprising:
forming multiple fixed beams in the near-field with at least one near-field focused antenna comprising an array of elements and a phase stifter, wherein the formation of beams involves the use of at least one said phase shifter that includes a voltage tunable dielectric capacitor for focusing beams:
sensing the location of said Tag with a sensor; and
accepting location information by a controller adapted to activate the proper fixed beam along a course so as to enable the near-field focused beams to track said Tag.

17. The method of claim 16, further comprising placing said array of elements in a substantially linear manner.

18. The method of claim 16, further comprising selecting said sensor from the following group: optical, mechanical, thermal, or sonic position detection subsystems.

19. The method of claim 16, further comprising controlling by said ontroller a plurality of switches which activate at least one beam forming network.

20. The method of claim 16, further comprising tracking along a predetermined course.

21. A system for tracking a RFID Tag comprising:
a conveyor adapted to move staid Tag within a near field focused antenna comprising an are of transmit antenna arrays, wherein said are lies in a plane substantially normal to the direction of motion of said Tag;
a beamformer for each transmit array adapted to form at least one fixed beam in its
near-field, wherein said beamformer includes at least one phase shifter that includes a
voltage tunable dielectric capacitor for focusing beams;
a sensor adapted to determine the position of said Tag; and
a controller adapted to accept position information and adapted to activate the proper fixed beam so as to enable the near-field focused beams to track the Tag.

* * * * *